(12) United States Patent
Li

(10) Patent No.: US 12,148,157 B1
(45) Date of Patent: Nov. 19, 2024

(54) PLATFORMS, SYSTEMS, AND METHODS FOR IDENTIFYING AND MONITORING CELL STATES

(71) Applicant: Stately Bio, Inc., Palo Alto, CA (US)

(72) Inventor: Frank Li, Palo Alto, CA (US)

(73) Assignee: STATELY BIO, INC., Palo Alto, CA (US)

( * ) Notice: Subject to any disclaimer, the term of this patent is extended or adjusted under 35 U.S.C. 154(b) by 0 days.

(21) Appl. No.: 18/310,235

(22) Filed: May 1, 2023

(51) Int. Cl.
 *G06T 7/00* (2017.01)
 *G06V 20/69* (2022.01)

(52) U.S. Cl.
 CPC .......... *G06T 7/0012* (2013.01); *G06V 20/698* (2022.01); *G06T 2207/10056* (2013.01); *G06T 2207/20081* (2013.01); *G06T 2207/30024* (2013.01)

(58) Field of Classification Search
 CPC ......... G06T 7/0012; G06T 2207/10056; G06T 2207/20081; G06V 20/698
 See application file for complete search history.

(56) References Cited

U.S. PATENT DOCUMENTS

| | | | |
|---|---|---|---|
| 9,971,966 B2 | 5/2018 | Nelson et al. | |
| 10,134,131 B1 | 11/2018 | Ando et al. | |
| 10,366,324 B2 | 7/2019 | Riley et al. | |
| 10,467,754 B1 | 11/2019 | Ando et al. | |
| 10,692,001 B2 | 6/2020 | Nelson et al. | |
| 10,761,011 B2 | 9/2020 | Ota et al. | |
| 10,769,501 B1 | 9/2020 | Ando et al. | |
| 11,205,113 B2 | 12/2021 | Riley et al. | |
| 11,334,770 B1 | 5/2022 | Ando et al. | |
| 11,423,256 B2 | 8/2022 | Marie-Nelly et al. | |
| 11,443,190 B2 | 9/2022 | Nelson et al. | |
| 11,875,506 B1* | 1/2024 | Marie-Nelly | G01N 15/1429 |
| 2012/0112098 A1* | 5/2012 | Hoyt | G06T 5/50 |
| | | | 250/459.1 |
| 2013/0183707 A1* | 7/2013 | Mangoubi | G16B 40/20 |
| | | | 702/19 |

(Continued)

FOREIGN PATENT DOCUMENTS

| | | |
|---|---|---|
| EP | 3292493 A1 | 3/2018 |
| EP | 3420495 A1 | 1/2019 |

(Continued)

OTHER PUBLICATIONS

Chen, et al. Exploring simple siamese representation learning. arXiv preprint arXiv:2011.10566 (2020).

(Continued)

*Primary Examiner* — Vu Le
*Assistant Examiner* — Winta Gebreslassie
(74) *Attorney, Agent, or Firm* — WILSON SONSINI GOODRICH & ROSATI

(57) ABSTRACT

Systems, methods, and platforms for identifying and monitoring cell states are described. In one example, a computer-implemented method includes receiving cell imaging data comprising at least one transmitted light micrograph, generating a cell imaging dataset comprising time course data of transmitted light micrographs collected at an interval over a time, applying a machine learning model configured to analyze the cell imaging dataset to build a plurality of profiles of cell states, and identifying a cell state based on the plurality of profiles.

34 Claims, 41 Drawing Sheets

(56) References Cited

U.S. PATENT DOCUMENTS

| | | | |
|---|---|---|---|
| 2017/0052106 A1* | 2/2017 | Hennig | G06V 20/698 |
| 2019/0180420 A1* | 6/2019 | Gutiérrez Medina | G06T 5/73 |
| 2020/0027020 A1 | 1/2020 | Kamesawa et al. | |
| 2020/0150022 A1 | 5/2020 | Ugawa et al. | |
| 2021/0110536 A1 | 4/2021 | Akazawa | |
| 2021/0133963 A1 | 5/2021 | Takahashi et al. | |
| 2021/0190762 A1* | 6/2021 | Boehm | G01N 33/5026 |
| 2022/0284574 A1 | 9/2022 | Wagner et al. | |
| 2023/0266221 A1* | 8/2023 | Johnson | G01N 15/1429 |
| | | | 382/133 |
| 2023/0281825 A1* | 9/2023 | Johnson | G02B 21/008 |
| | | | 382/128 |

FOREIGN PATENT DOCUMENTS

| | | |
|---|---|---|
| EP | 3605406 A1 | 2/2020 |
| WO | WO-2017040001 A1 | 3/2017 |
| WO | WO-2017146813 A1 | 8/2017 |
| WO | WO-2021231978 A1 | 11/2021 |
| WO | WO-2022178095 A1 | 8/2022 |
| WO | WO-2022261241 A1 | 12/2022 |
| WO | WO-2023091970 A1 * | 5/2023 |
| WO | WO-2023092108 A2 * | 5/2023 |

OTHER PUBLICATIONS

Christiansen, et al. In Silico Labeling: Predicting Fluorescent Labels in Unlabeled Images. Cell. Apr. 19, 2018;173(3):792-803.e19. doi: 10.1016/j.cell.2018.03.040. Epub Apr. 12, 2018.

Martin, et al. Improving the safety of human pluripotent stem cell therapies using genome-edited orthogonal safeguards. Nat Commun. Jun. 1, 2020;11(1):2713. doi: 10.1038/s41467-020-16455-7.

Ounkomol, et al. Label-free prediction of three-dimensional fluorescence images from transmitted-light microscopy. Nat Methods. Nov. 2018; 15(11):917-920. doi: 10.1038/s41592-018-0111-2. Epub Sep. 17, 2018.

Patsch, et al. Generation of vascular endothelial and smooth muscle cells from human pluripotent stem cells. Nat Cell Biol. Aug. 2015; 17(8):994-1003. doi: 10.1038/ncb3205. Epub Jul. 27, 2015.

Zhang, et al. Directed Differentiation of Notochord-like and Nucleus Pulposus-like Cells Using Human Pluripotent Stem Cells. Cell Rep. Feb. 25, 2020;30(8):2791-2806.e5. doi: 10.1016/j.celrep.2020.01. 100.

* cited by examiner

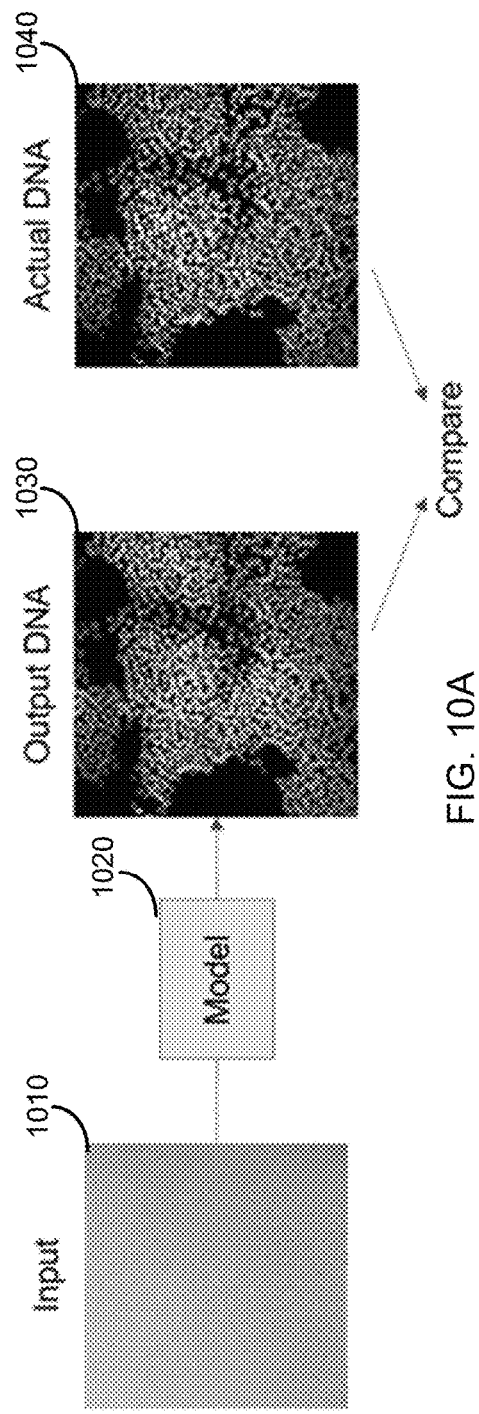
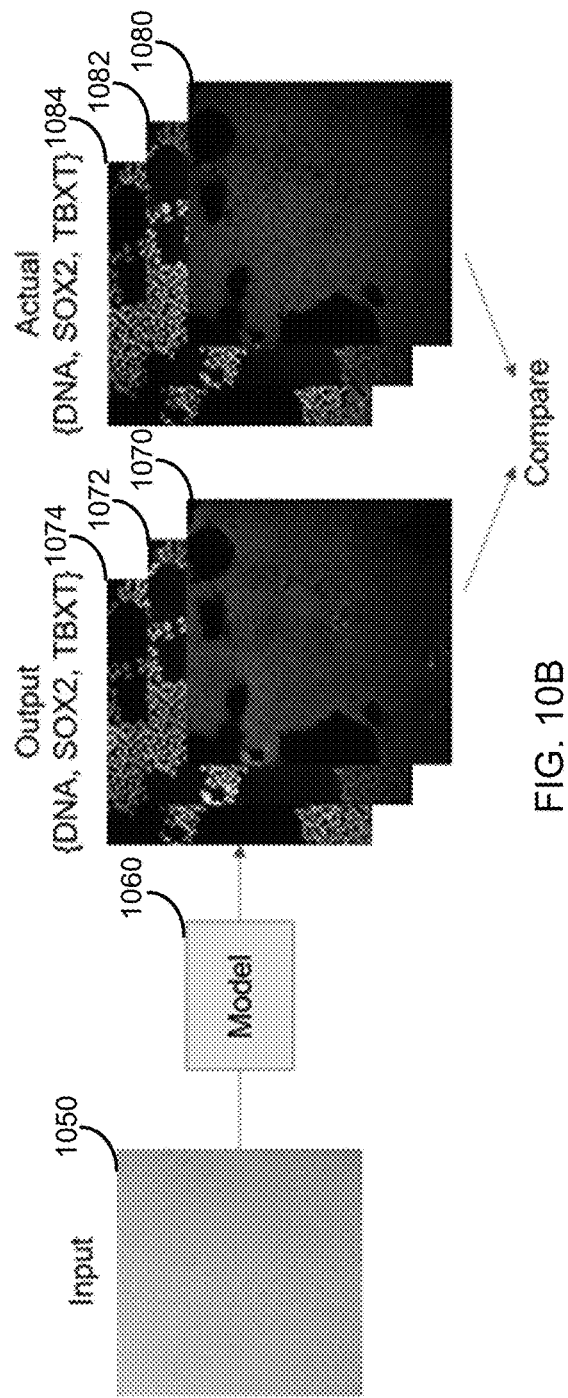
FIG. 10A
FIG. 10B

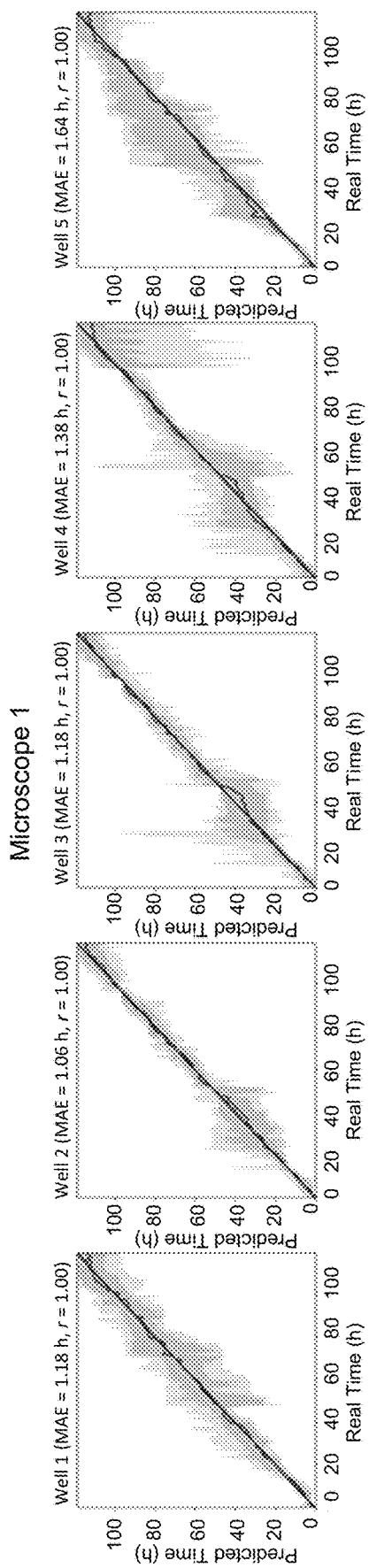
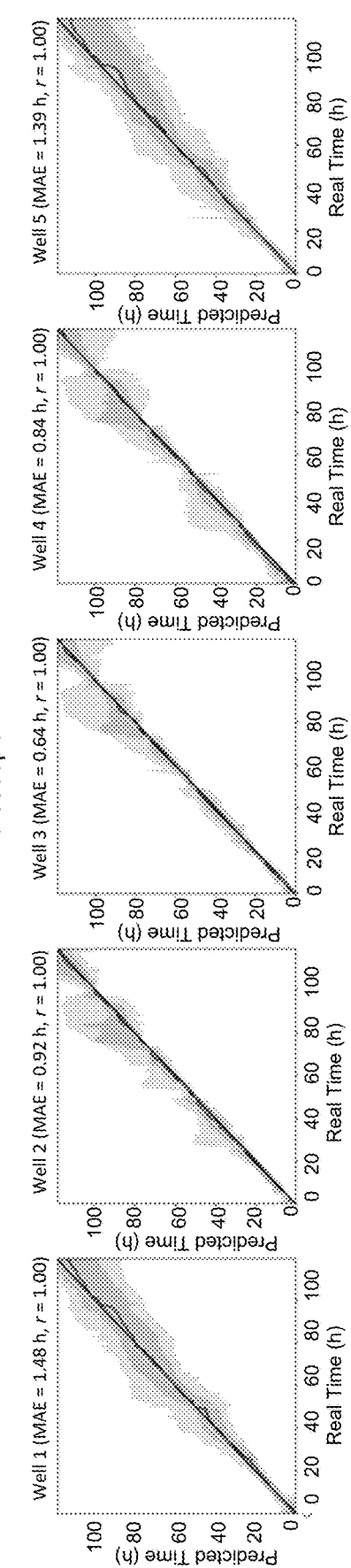
FIG. 12A
FIG. 12B

PLATFORMS, SYSTEMS, AND METHODS FOR IDENTIFYING AND MONITORING CELL STATES

BACKGROUND

Existing methods of visualizing cellular structures include adding fluorescent dyes or dye-conjugated antibodies to stain specific cellular constituents. By analyzing the stained cells, scientists can identify the characteristics of the cells, including their types and states. However, fluorescent labeling has drawbacks, including batch-to-batch variability caused by antibody cross-activity and limitations in the number of simultaneous labels due to spectral overlap. Additionally, labeling protocols can kill cells, and even labeling protocols for live cells can be phototoxic, which makes real-time live cell monitoring a challenge. Genetic engineering, e.g., with green fluorescent protein (GFP), is an alternative approach for fluorescent labeling. However, this approach has limitations including time consumption and higher cost in engineering the cells, not to mention phototoxicity and photobleaching over time.

SUMMARY

The challenges in visualizing cellular structures especially in live cells, also brings difficulty in monitoring and identifying cell states and dynamics. Cells states are often characterized by the presence or absence of specific proteins (e.g., cell markers) in the cell or on the cell surface. Fluorescence-activated cell sorting (FACS) is commonly used for sorting a heterogeneous mixture of cells based on the specific light scattering and fluorescent characteristics of each cell. While FACS is live-cell compatible, its application is limited to cell surface markers. In addition, it requires sophisticated instrument and regular maintenance by skilled engineers.

There is a need for a reliable, convenient, and cost-effective approach for live cell imaging. Live cell imaging allows the observation of cell morphologies, internal structures, and cellular processes in real time and across an expanded time course. More importantly, as cells under imaging are cultured in their normal physiological conditions, live cell imaging can be less prone to experimental artifacts and thus, can provide reliable information of cell states and dynamics.

Disclosed are systems and methods for cell imaging and characterization of cell states. The systems and methods described herein utilize one or more machine learning models to process cell images captured via transmitted light microscopy, generate output images with pseudo-stains of cellular structures and/or cell markers at corresponding fluorescent channels, identify and monitor cell states, as well as classify cell types. The systems and methods described herein provide an approach of monitoring cells in their normal conditions without experimental artifacts and identifying states and dynamics of the cells in a reliable and accurate manner.

In one aspect, disclosed herein is a computer-implemented method. The method comprises receiving cell imaging data comprising at least one transmitted light micrograph, generating a cell imaging dataset comprising time course data of transmitted light micrographs collected at an interval over a time period, applying a machine learning model configured to analyze the cell imaging dataset to build a plurality of profiles of cell states, and identifying a cell state based on the plurality of profiles.

In some embodiments, the cell imaging data may comprise live-cell imaging data, and the cell imaging dataset may comprise a live-cell imaging dataset.

In some embodiments, the method may further comprise sending one or more instructions to a transmitted light microscopy apparatus.

In some embodiments, the transmitted light micrographs may comprise one or more brightfield micrographs. In other embodiments, the transmitted light micrographs may comprise one or more phase contrast micrographs.

In some embodiments, the interval may be about 10 minutes, 20 minutes, 30 minutes, 40 minutes, 50 minutes, 60 minutes, 70 minutes, 80 minutes, 90 minutes, 100 minutes, 110 minutes, 120 minutes, 130 minutes, 140 minutes, 150 minutes, 160 minutes, 180 minutes, 240 minutes, 300 minutes, 360 minutes, 420 minutes, 480 minutes, 600 minutes, 720 minutes, 960 minutes, 1200 minutes, or 1440 minutes, including increments therein.

In some embodiments, the time period may be about 1 day, 2 days, 3 days, 4 days, 5 days, 6 days, 7 days, 8 days, 9 days, or 10 days, including increments therein.

In some embodiments, the machine learning model may comprise a featurizer model. In some embodiments, featurizer model may be applied to each micrograph of the cell imaging dataset to generate an embedding specific to a cell state.

In some embodiments, the method may further comprise evaluating the embeddings qualitatively and quantitatively. The qualitative evaluation may comprise dimensionality reduction and visualization. The quantitative evaluation may comprise predicting time elapsed in the time course.

In some embodiments, the method may further comprise applying a classifier to classify a cell type of the cells.

In some embodiments, the cell state may be a phase of a stem cell differentiation process.

In some embodiments, the method may further comprise predicting cell progress through phases of the stem cell differentiation process.

In some embodiments, predicting cell progress may comprise generating a synthetic image of at least one subsequent phase in the stem cell differentiation process. In some embodiments, predicting cell progress may comprise predicting nuclei of the cells. In some embodiments, predicting cell progress may comprise predicting presence and distribution of one or more biomarkers of the cells. In other embodiments, predicting cell progress may comprise predicting a cell type classification of the cells.

In some embodiments, the method may further comprise monitoring the cell state.

In some embodiments, the method may further comprise monitoring cell progress through phases of the stem cell differentiation process.

In some embodiments, the method may further comprise recommending a cell culture condition based on the cell state.

In some embodiments, the method may further comprise recommending a stem cell differentiation protocol based on the cell state.

In some embodiments, the method may further comprise optimizing a stem cell differentiation protocol based on the cell state.

In some embodiments, the method may not kill or alter the cells.

In some embodiments, the method may not comprise fluorescence activated cell sorting (FACS), fluorescent tagging, or immunofluorescence staining.

In another aspect, disclosed herein is a computer-implemented system comprising at least one processor and instructions executable by the at least one processor to perform operations comprising receiving cell imaging data comprising at least one transmitted light micrograph, generating a cell imaging dataset comprising time course data of transmitted light micrographs collected at an interval over a time period, applying a machine learning model configured to analyze the cell imaging dataset to build a plurality of profiles of cell states, and identifying a cell state based on the plurality of profiles.

In another aspect, disclosed herein is a non-transitory computer-readable storage media encoded with instructions executable by one or more processors to create an application comprising a software module configured to receive cell imaging data comprising at least one transmitted light micrograph, a software module configured to generate a cell imaging dataset comprising time course data of transmitted light micrographs collected at an interval over a time period, a software module configured to apply a machine learning model configured to analyze the cell imaging dataset to build a plurality of profiles of cell states, and a software module configured to identify a cell state based on the plurality of profiles.

In another aspect, disclosed herein is a platform comprising an automated transmitted light microscopy apparatus, and a computing system, communicatively coupled to the automated transmitted light microscopy apparatus, and comprising at least one processor configured to perform operations. The performed operations comprise receiving, from the automated transmitted light microscopy apparatus, cell imaging data comprising at least one transmitted light micrograph, generating a cell imaging dataset comprising time course data of transmitted light micrographs collected at an interval over a time period, applying a machine learning model configured to analyze the cell imaging dataset to build a plurality of profiles of cell states, and identifying a cell state based on the plurality of profiles.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

Each patent, publication, and non-patent literature cited in the application is hereby incorporated by reference in its entirety as if each was incorporated by reference individually.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 10A shows a non-limiting example of training a machine learning model to generate an output image of pseudo-stained cells corresponding to a given fluorescent channel, in accordance with some embodiments;

FIG. 10B shows a non-limiting example of training the machine learning model to generate a plurality of output images of pseudo-stained cells corresponding to a plurality of fluorescent channels, in accordance with some embodiments;

FIG. 12A is a non-limiting example of correlation between the actual time measured for cell differentiation progress using a test dataset of iPSC cells and predicted time generated from the machine learning model, where the input images are captured using microscope 1, in accordance with some embodiments;

FIG. 12B is a non-limiting example of correlation between the actual time measured for cell differentiation progress using a test dataset of iPSC cells and predicted time generated from the machine learning model, where the input images are captured using microscope 2, in accordance with some embodiments;

DETAILED DESCRIPTION

Figure 1:
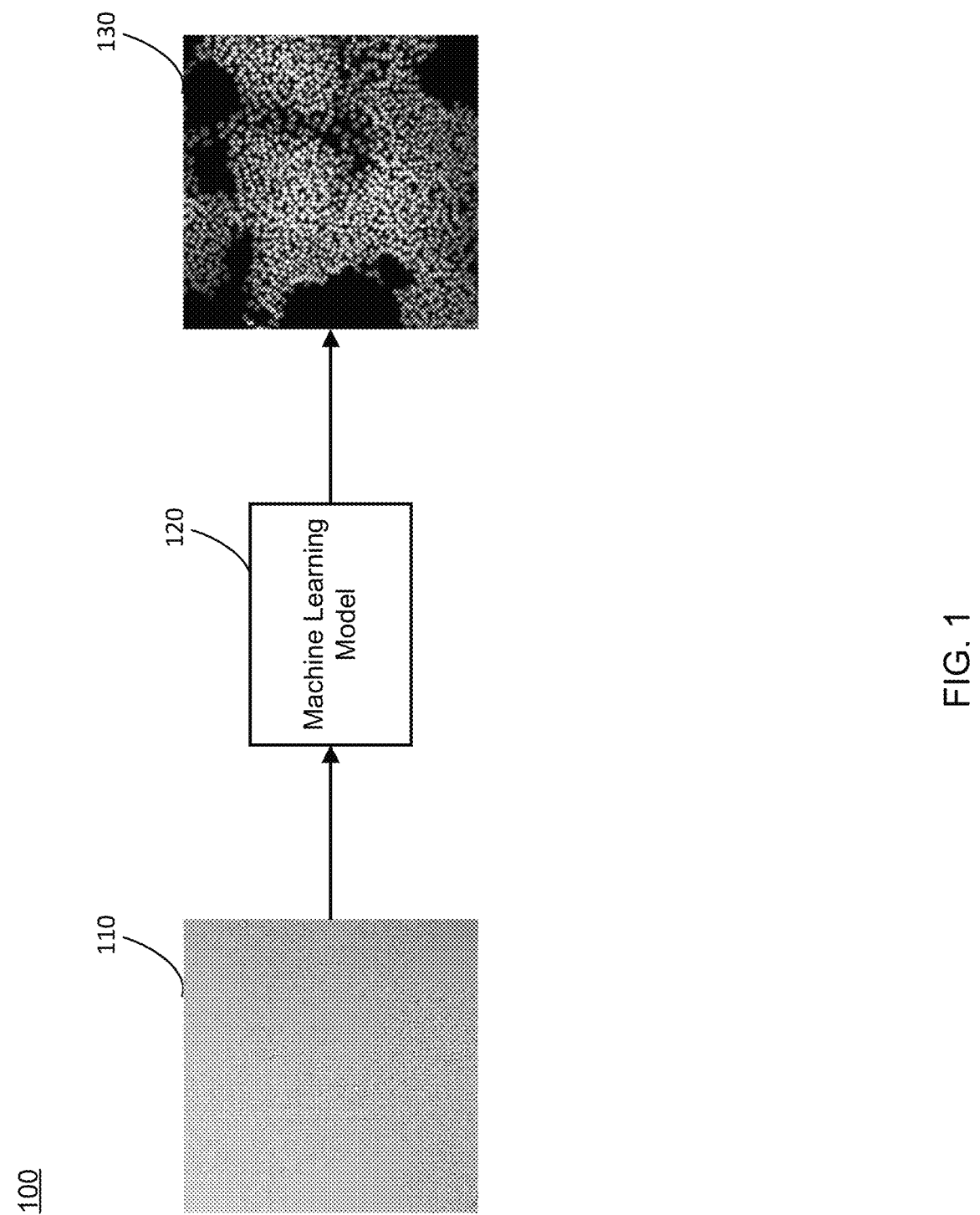
FIG. 1 shows a non-limiting example of system for processing cell images, in accordance with some embodiments.

Described herein, in certain embodiments, is a computer-implemented method comprising receiving cell imaging data comprising at least one transmitted light micrograph, generating a cell imaging dataset comprising time course data of transmitted light micrographs collected at an interval over a time period, applying a machine learning model configured to analyze the cell imaging dataset to build a plurality of profiles of cell states, and identifying a cell state based on the plurality of profiles.

Also described herein, in certain embodiments, is a computer-implemented system comprising at least one processor and instructions executable by the at least one processor to cause the at least one processor to perform operations comprising receiving cell imaging data comprising at least one transmitted light micrograph, generating a cell imaging dataset comprising time course data of transmitted light micrographs collected at an interval over a time period, applying a machine learning model configured to analyze the cell imaging dataset to build a plurality of profiles of cell states, and identifying a cell state based on the plurality of profiles.

Also described herein, in certain embodiments, is non-transitory computer-readable storage media encoded with instructions executable by one or more processors to create an application comprising a software module configured to receive cell imaging data comprising at least one transmitted light micrograph, a software module configured to generate a cell imaging dataset comprising time course data of transmitted light micrographs collected at an interval over a time period, a software module configured to apply a machine learning model configured to analyze the cell imaging dataset to build a plurality of profiles of cell states, and a software module configured to identify a cell state based on the plurality of profiles.

Also described herein, in certain embodiments, is a platform comprising an automated transmitted light microscopy apparatus, and a computing system, communicatively coupled to the automated transmitted light microscopy apparatus, and comprising at least one processor configured to perform operations. The operations comprise receiving, from the automated transmitted light microscopy apparatus, cell imaging data comprising at least one transmitted light micrograph, generating a cell imaging dataset comprising time course data of transmitted light micrographs collected at an interval over a time period, applying a machine learning model configured to analyze the cell imaging dataset to build a plurality of profiles of cell states, and identifying a cell state based on the plurality of profiles.

The systems, methods, computer-readable storage media, and platforms described herein provide a reliable, cost-effective, and non-destructive approach of cell (e.g., live cells) imaging and more importantly, monitoring cell states throughout an expanded time course, for example, cell differentiation process. Compared to fluorescence activated cell sorting (FACS), fluorescent tagging, and immunofluorescence staining, here, live cells can be monitored under transmitted light microscope without fluorescent labeling. The machine learning model can be trained to process transmitted light micrographs depicting unstained live cells or clusters of cells and generate an output image with predicted fluorescence labeling of cellular features (e.g., nuclei, cell-surface marker, and intracellular markers) at corresponding fluorescent channels. The generated output images of pseudo-stained cells resemble fluorescently labeled cells, yet do not require any staining or washing steps. Hence, it allows continuous real-time monitoring of cells without altering or damaging the cells.

In addition, the machine learning model can be trained to identify a current cell state, distinguish subtle cell state difference, and predict a future cell state of live cells in real time, by processing time course data of transmitted light micrographs collected over a time period. As cells can be differentiated into specific cell types using different protocols, the systems, methods, computer-readable storage media, and platforms described herein also provide an approach of changing the current manual trial-and-error for identifying differentiation protocols to automated protocol recommendations and optimizations.

The systems, methods, computer-readable storage media, and platforms described herein allow real-time monitoring of cell states and transitions among cell states. Cell states are often defined by the presence or absence of specific molecules (e.g., proteins) within or on the surface of cells. During transitions among cell states, a multitude of parameters may change, including proteins that are expressed and modified. Cells often adopt different shapes during the transition, alter their motility and change their reliance on cell-cell junctions or adhesion. Currently, the monitoring of cell states still relies on fluorescent labeling of the cell markers (e.g., proteins) within or on the surface of the live cells. For example, fluorescence-activated cell sorting (FACS) purifies specific cell populations based on phenotypes detected by flow cytometry. Although live-cell compatible, FACS is limited to cell surface markers. Fluorescent tagging and immunofluorescence (IF) staining enable the identification of markers in the nucleus and cytoplasm, but each has its disadvantages. Fluorescent tagging requires complex genetic engineering and is susceptible to photobleaching concerns. IF staining only works on dead cells, and both IF staining and FACS are limited to those markers that have a corresponding antibody with high binding affinity and specificity.

The machine learning model described herein may analyze time course data of transmitted light micrographs of unstained and live cells over a time period, build a plurality of profiles of cell states, and identify a cell state and transition of cell states. The machine learning model described herein may build profiles corresponding to different cell states, transitions among cell states and different stages of the transitions, thereby predict how far a cell is along the trajectory of the transition from one cell state to another. The machine learning model allows automated screening of differentiation protocols with scale and reliability, which reduces variability involved with manual handling and allows for high-throughput experimentation. Moreover, the machine learning model allows recommendation and optimization of differentiation protocols for clinically relevant cell types and change the trial-and-error to an effective and efficient cell programming platform.

Overview

FIG. 1 shows a non-limiting example system 100 for processing cell images. The system 100 comprises a trained machine learning model 120 that processes cell images as input 110 and generates output images 130 of cells. The input 110 may comprise one or more images of a single cell or a plurality of cells. The cells may be unstained live cells. The input images 110 may comprise transmitted light micrographs, for example, brightfield micrographs, phase contrast micrographs, and differential interference contrast (DIC) micrographs. Transmitted light images make it challenge to visualize cellular structures especially when down to a subcellular level. Therefore, cell staining is commonly used despite the known drawbacks. For example, nuclear staining uses one or more dyes (e.g., Hoechst stains) that bind to nucleic acids within the cell nuclei, such that the cell nuclei can be visualized under a fluorescent microscope. The present disclosure resolves this challenge by processing transmitted light images of unstained cells using a trained machine learning model 120. The model 120 generates an output image 130, where the cells may be pseudo-stained at corresponding fluorescent channels. Images of pseudo-stained cells may refer to synthetic images comprising predicted fluorescent labeling to cellular features generated from the machine learning model. The output image 130 with predicted fluorescent labeling at corresponding fluorescent channels may resemble fluorescent images of cells that are actually stained with a dye that emits light under a fluorescent microscope.

In some embodiments, the transmitted light micrographs as input to the machine learning model may include time course data of transmitted light micrographs collected at an interval over a time period. In some embodiments, the interval may be about 10 minutes, 20 minutes, 30 minutes, 40 minutes, 50 minutes, 60 minutes, 70 minutes, 80 minutes, 90 minutes, 100 minutes, 110 minutes, 120 minutes, 130 minutes, 140 minutes, 150 minutes, 160 minutes, 180 minutes, 240 minutes, 300 minutes, 360 minutes, 420 minutes, 480 minutes, 600 minutes, 720 minutes, 960 minutes, 1200 minutes, or 1440 minutes, including increments therein. The time period may be about 1 day, 2 days, 3 days, 4 days, 5 days, 6 days, 7 days, 8 days, 9 days, or 10 days, including increments therein. During the time period, cells may be cultured under normal conditions and have different cell states and dynamics. The transmitted light micrographs that are captured during the time period may depict cells with a variety of different cell features including cell types, health conditions, states, transition of states, proliferation, differentiation, etc.

Figure 2:
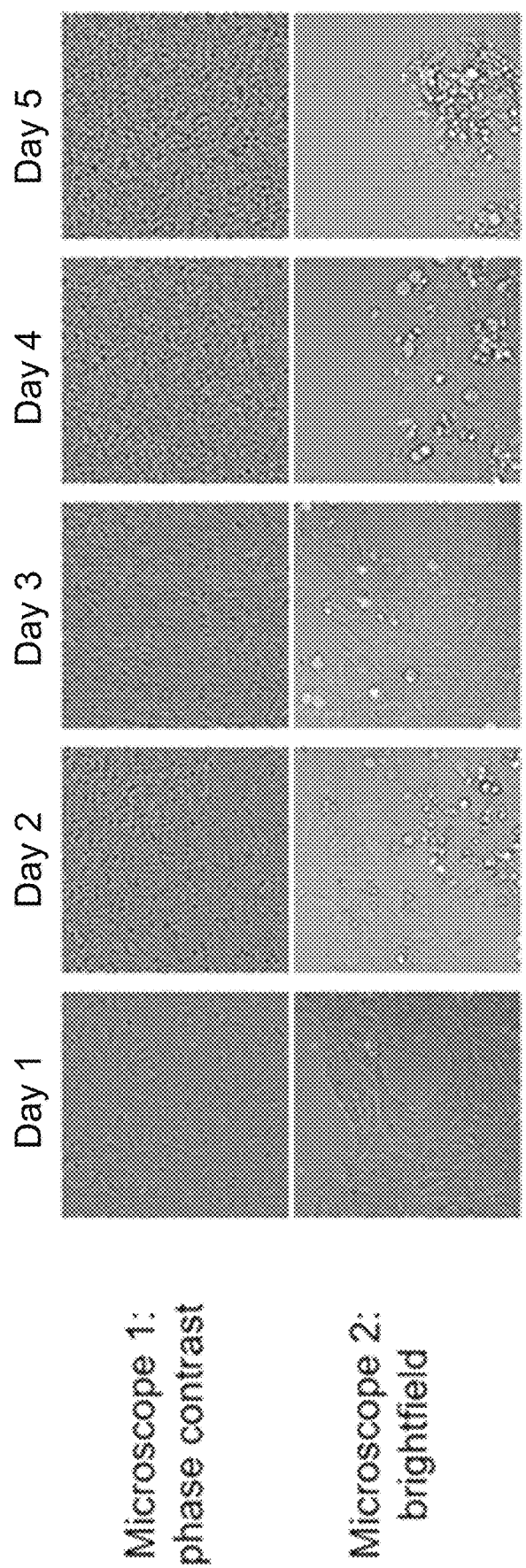
FIG. 2 shows a non-limiting example of time course data of transmitted light micrographs of cells collected over a time period, in accordance with some embodiments.

FIG. 2 shows a non-limiting example of time course data of transmitted light micrographs of cells collected over a time period. Induced pluripotent stem cells (iPSC) are cultured and under differentiation for five days. Two microscopes are configured to capture phase contrast micrographs and brightfield micrographs of iPSC cells every 60 minutes over the course of five days. Both the phase contrast and brightfield micrographs can be used as input to the machine learning model 120. As illustrated, iPSC cells may undergo morphological changes during the differentiation, which are captured in the phase contrast micrographs and brightfield micrographs.

In some embodiments, the output may include an image of pseudo-stained cells corresponding to a particular type of fluorescent stain. In some embodiments, the output 130 may include a plurality of images of pseudo-stained cells, each corresponding to a particular type of fluorescent stain or a particular fluorescent channel. For example, output images may predict cell nuclei, and/or presence and distribution of one or more cell markers. For example, the output may include a first image of cells with pseudo stains corresponding to Hoechst nuclei stains, and a second image corresponding to a fluorescent stain for pluripotency marker SRY-Box Transcription Factor 2 (SOX2).

Figure 3:
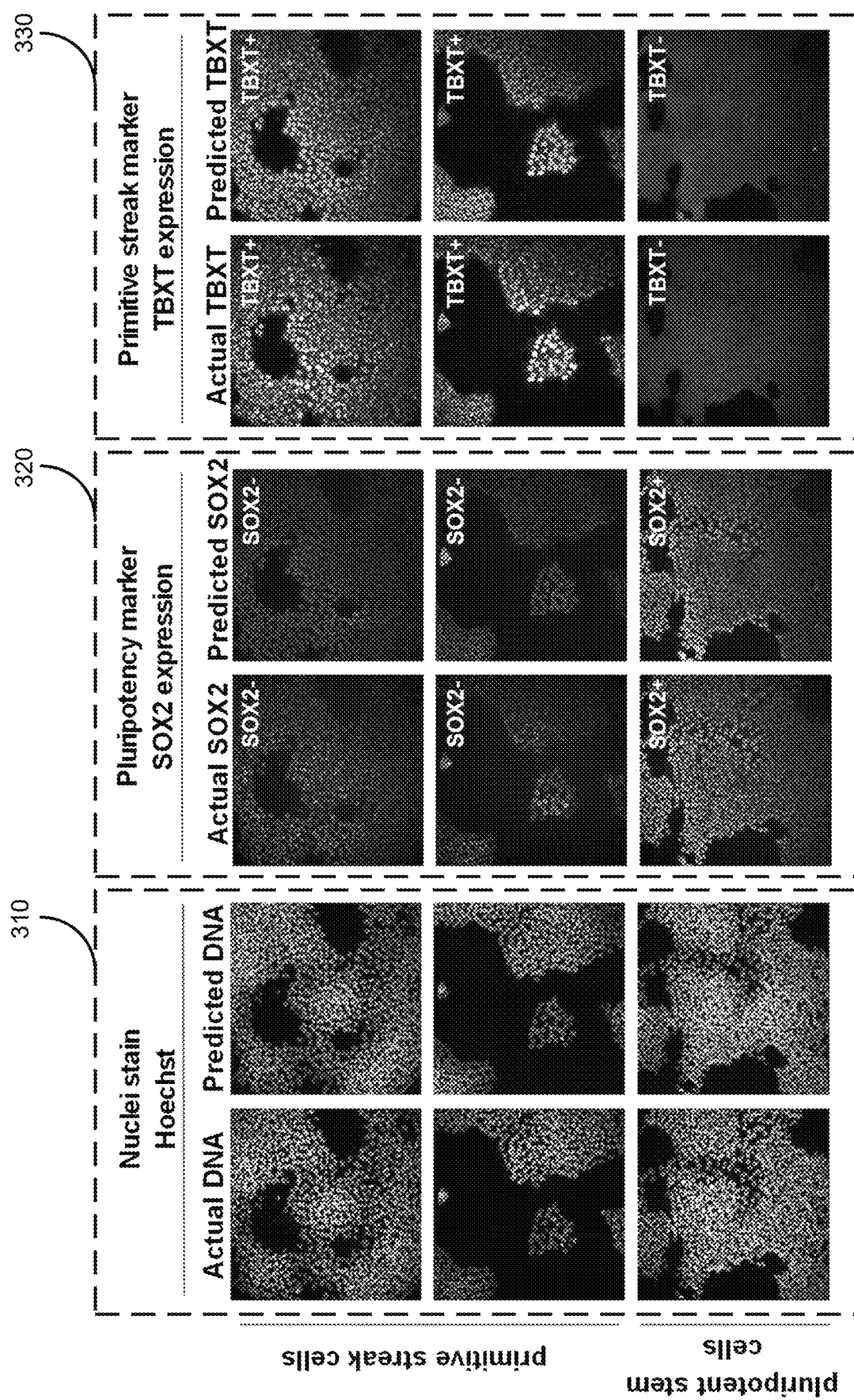
FIG. 3 shows a non-limiting example of output images of pseudo-stained cells generated from the machine learning model, in accordance with some embodiments.

FIG. 3 shows a non-limiting example of output images of pseudo-stained cells generated from a trained machine learning model. Human pluripotent stem cells (hPSCs or hPSC cells) are differentiated to primitive streak cells with APS and AMPS conditions, respectively, according to an existing differentiation protocol (Martin, R. M., Fowler, J. L., Cromer, M. K. et al. Improving the safety of human pluripotent stem cell therapies using genome-edited orthogonal safeguards. Nat Commun, 11, 2713 (2020), incorporated herein by reference.) During the differentiation of hPSC cells towards primitive streak cells, the expression level of cell markers (e.g., proteins) may change, as summarized in Table 1. For example, hPSC cells at E8 condition express a high level of a nuclear-localized pluripotency marker SRY-Box Transcription Factor 2 (SOX2), and a low or minimum level of nuclear-localized primitive streak marker T-box transcription factor T (TBXT), On the other hand, primitive streak cells with APS and AMPS conditions express a low or minimum level of SOX2 and a high level of TBXT.

TABLE 1

Expression of cell markers during cell differentiation.

| Cell type | Condition | SOX2 | TBXT |
| --- | --- | --- | --- |
| Primitive streak cell | AMPS | Low | High |
| Primitive streak cell | APS | Low | High |
| Pluripotent stem cell | E8 | High | Low |

The time course data of transmitted light micrographs of hPSC cells during the differentiation process towards primitive streak cells may be collected. The machine learning model as described herein may process the time course data and generate a plurality of output images corresponding to Hoechst nuclear staining, SOX2 staining, and TBXT staining, respectively.

As illustrated in FIG. 3, panel 310 comprises a comparison between output images generated from the machine learning model corresponding to Hoechst nuclear staining ("predicted DNA" in the right column of panel 310) and fluorescent images of nuclear stained cells ("actual DNA" in the left column of panel 310). The top two rows of images are directed to primitive streak cells and the bottom row of images directed to hPSCs prior to the differentiation. The output images of Hoechst nuclear staining of both hPSCs and primitive streak cells resemble the fluorescent images of stained cells. Panel 320 comprises a comparison between output images generated from the machine learning model corresponding to SOX2 staining ("predicted SOX2" in the right column of panel 320) and fluorescent images of stained cells ("actual SOX2" in the left column of panel 320). Consistent with the SOX2 expression level summarized in Table 1 and fluorescent images of stained cells in the left column, the machine learning model accurately predicts the high expression level of SOX2 in hPSCs ("SOX2+") and low/minimum expression level of SOX2 in primitive streak cells ("SOX2-"). Panel 330 comprises a comparison between predicted output images generated from the machine learning model, corresponding to TBXT staining ("predicted TBXT" in the right column of panel 330) and images of stained cells ("actual TBXT" in the left column of panel 330). Consistent with the TBXT expression level summarized in Table 1 and fluorescent images of stained cells in the left column, the machine learning model accurately predicts the low/minimum expression level of TBXT in hPSCs ("TBXT-") and high expression level of TBXT in primitive streak cells ("TBXT+").

In some embodiments, the characteristics of the input images and output images may be similar. For example, for each pixel in each input image, the machine learning model may generate a corresponding pixel in a corresponding output image. In some embodiments, the characteristics of the input images and output images may be different. As a result, each pixel in each input image may not have a one-to-one correspondence with a respective pixel in a corresponding output image. For example, the size and/or resolution of the input and output images may be different. The output image may comprise pixels representing linear or non-linear transformations of one or more pixels in the input image, creating a many-to-many correspondence. The output image may comprise pixels that represent an encoding of non-image features such as uncertainty estimates, such that the input and output images are of different domains and not comparable. The input may be pre-processed to alter the size and/or resolution. The machine learning model 120 may process the pre-processed input and generate an output with high quality/clarity and different size.

Examples of Machine Learning Model

The machine learning model 120 may implement one or more machine learning algorithms. Machine learning may generally involve identifying and recognizing patterns in existing data to facilitate making predictions for subsequent data. Machine learning, whether analytical or statistical in nature, may provide deductive or abductive inference based on real or simulated data. The machine learning model 120 may be a trained model. For example, the machine learning model 120 may be a trained model that is trained through supervised learning (e.g., various parameters are determined as weights or scaling factors). Machine learning may comprise one or more of regression analysis, regularization, classification, dimensionality reduction, ensemble learning, meta learning, association rule learning, cluster analysis, anomaly detection, deep learning, or ultra-deep learning. Machine learning may comprise, but is not limited to: AdaBoosting, artificial neural networks, auto-encoders, Bayesian belief networks, Bayesian networks, boosted decision trees, boosting, bootstrap aggregation, canonical correlation analysis, conditional decision trees, contrastive learning, convolutional neural networks, decision trees, decoders, deep belief networks, deep Boltzmann machines, deep convolutional neural networks, deep recurrent neural networks, encoders, ensemble averaging, factor analysis, feedforward neural networks, Gaussian naïve Bayes, generative adversarial networks, gradient boosted decision trees, gradient boosting, hidden Markov models, hierarchical hidden Markov models, independent component analysis, k-means, k-means clustering, k-nearest neighbors, learning vector quantization, least absolute shrinkage and selection operation (LASSO), least angle regression, least squares regression, linear discriminant analysis, linear regression, logistic regression, long short-term memory, long short-term memory networks (LSTM), masked auto-encoders, multi-layer perceptrons, multidimensional scaling, multinomial naïve Bayes, multivariate adaptive regression splines, naïve Bayes, non-linear regression, non-negative matrix factorization, partial least squares regression, perceptrons, principal component regression, principal components analysis, principal coordinates analysis, projection pursuit, random forests, recurrent neural networks, ridge regression, Sammon mapping, Siamese neural networks, stacked auto-encoders, stacked generalization, stepwise regression, support vector machines, t-distributed stochastic neighbor embedding, transformers, vision transformers, etc.

The systems, methods, computer-readable storage media, and platforms described herein may implement one or more computer vision techniques. Computer vision is a field of artificial intelligence that uses computers to interpret and understand the visual world at least in part by processing one or more digital images and videos. In some embodiments, computer vision may use deep learning models (e.g., convolutional neural networks). Bounding boxes and tracking techniques may be used in object detection techniques within computer vision.

The systems, methods, computer-readable storage media, and platforms described herein may implement one or more deep-learning techniques. Deep learning is an example of machine learning that may be based on a set of algorithms that attempt to model high-level abstractions in data by using multiple processing layers, with complex structures or otherwise, composed of multiple non-linear transformations. In some embodiments, a drop out method may be used to reduce overfitting. At each training stage, individual nodes are either "dropped out" of the net (e.g., ignored) with a probability 1-$p$ or kept with probability p, so that a reduced network is left;

incoming and outgoing edges to a dropped-out node may also be removed. In some embodiments, the reduced network may be trained on the data in that stage. The removed nodes may then be reinserted into the network with their original weights.

The systems, methods, computer-readable storage media, and platforms described herein may implement one or more vision transformer (ViT) techniques. A ViT is a transformer-like model that handles vision processing tasks. While CNNs use convolution, a "local" operation bounded to a small neighborhood of an image, ViTs use self-attention, a "global" operation, since the ViT draws information from the whole image. This allows the ViT to capture distant semantic relevance in an image effectively. Advantageously, ViTs may be well-suited catching long-term dependencies. In some cases, ViTs may be a competitive alternative to convolutional neural networks as ViTs may outperform the current state-of-the-art CNNs by almost four times in terms of computational efficiency and accuracy. ViTs may be well-suited to object detection, image segmentation, image classification, and action recognition. Moreover, ViTs may be applied in generative modeling and multi-model tasks, including visual grounding, visual-question answering, and visual reasoning. In some embodiments, ViTs may represent images as sequences, and class labels for the image are predicted, which allows models to learn image structure independently. Input images may be treated as a sequence of patches where every patch is flattened into a single vector by concatenating the channels of all pixels in a patch and then linearly projecting it to the desired input dimension. For example, a ViT architecture may include the following operations: (A) split an image into patches; (B) flatten the patches; (C) generate lower-dimensional linear embeddings from the flattened patches; (D) add positional embeddings; (E) provide the sequence as an input to a standard transformer encoder; (F) pretrain a model with image labels (e.g., fully supervised on a huge dataset); and (G) finetune on the downstream dataset for image classification. In some embodiments, there may be multiple blocks in a ViT encoder, with each block comprising three major processing elements: (1) Layer Norm; (2) Multi-head Attention Network; and (3) Multi-Layer Perceptrons. The Layer Norm may keep the training process on track and enable the model to adapt to the variations among the training images. The Multi-head Attention Network may be a network responsible for generating attention maps from the given embedded visual tokens. These attention maps may help the network focus on the most critical regions in the image, such as object(s). The Multi-Layer Perceptrons may be a two-layer classification network with a Gaussian Error Linear Unit at the end. The final Multi-Layer Perceptrons block may be used as an output of the transformer. An application of softmax on this output can provide classification labels (e.g., if the application is image classification).

The systems, methods, computer-readable storage media, and platforms described herein may implement one or more masked autoencoder (MAE) techniques. MAEs are scalable self-supervised learners for computer vision. The MAE leverages the success of autoencoders for various imaging and natural language processing tasks. Some computer vision models may be trained using supervised learning, such as using humans to look at images and created labels for the images, so that the model could learn the patterns of those labels (e.g., a human annotator would assign a class label to an image or draw bounding boxes around objects in the image). In contrast, self-supervised learning may not use any human-created labels. One technique for self-supervised image processing training using an MAE is for before an image is input into an encoder transformer, a certain set of masks are applied to the image. Due to the masks, pixels are removed from the image and therefore the model is provided an incomplete image. At a high level, the model's task is to now learn what the full, original image looked like before the mask was applied.

In other words, MAE may include masking random patches of an input image and reconstructing the missing pixels. The MAE may be based on two core designs. First, an asymmetric encoder-decoder architecture, with an encoder that operates on the visible subset of patches (without mask tokens), along with a lightweight decoder that reconstructs the original image from the latent representation and mask tokens. Second, masking a high proportion of the input image, e.g., 75%, may yield a nontrivial and meaningful self-supervisory task. Coupling these two core designs enables training large models efficiently and effectively, thereby accelerating training (e.g., by 3× or more) and improving accuracy. MAE techniques may be scalable, enabling learning of high-capacity models that generalize well, e.g., a vanilla ViT-Huge model. As mentioned, the MAE may be effective in pre-training ViTs for natural image analysis. In some cases, the MAE uses the characteristic of redundancy of image information to observe partial images to reconstruct original images as a proxy task, and the encoder of the MAE may have the capability of deducing the content of the masked image area by aggregating context information. This contextual aggregation capability may be important in the field of image processing and analysis.

Training of Machine Learning Model

The present disclosure further provides systems, methods, computer-readable storage media, and platforms for constructing a machine learning model for processing live cell images. In some embodiments, the machine learning model 120 may be trained by way of supervised learning. A data set of cell images may be divided into a training set, a test set, and, in some cases, a validation set. In supervised learning, training dataset and validation dataset may be annotated with ground truth labels. During the training process, training dataset may be repeatedly presented to the machine learning model 120, and for each sample presented during training, output generated by the machine learning model 120 may be compared with the corresponding ground truth labels. The difference between the ground truth and the predicted output may be calculated, and the machine learning model 120 may be modified to cause the output to more closely approximate or predict the ground truth. In some embodiments, a backpropagation algorithm may be utilized to cause the output to more closely approximate the ground truth. During many training iterations, the machine learning may generate outputs that progressively match the corresponding ground truth labels. Subsequently, when new and previously unseen input is presented, the machine learning model may generate an output classification value indicating which of the categories the new sample is most likely to fall into. In other words, the machine learning model may "generalize" from its training to new, previously unseen input.

In some embodiments, the machine learning model 120 may be validated using a validation dataset (e.g., distinct from training data set) to determine accuracy and robustness of the model. Such validation may include applying the model to the validation dataset to make predictions derived from the validation dataset. The machine learning model 120 may then be evaluated to determine whether the performance is sufficient based upon the derived predictions. The sufficiency criteria applied to the machine learning model 120 may vary depending upon the size of the training data set available for training, the performance of previous iterations of trained models, or user-specified performance requirements. If the machine learning model 120 does not achieve sufficient performance, additional training may be performed. Additional training may include refinement of the model or retraining on a different training dataset, after which the newly trained model may again be validated and assessed. When the machine learning model 120 has achieved sufficient performance, in some cases, the machine learning model 120 may be stored for present or future use. The model may be stored as sets of parameter values or weights for analysis of further input (e.g., further relevant parameters to use as further predicted variables, further explanatory variables, further user interaction data, etc.), which may also include analysis logic or indications of model validity. In some embodiments, a plurality of machine learning models may be stored for generating predictions under different sets of input data conditions. In some embodiments, the plurality of machine learning models may be stored in a database (e.g., associated with a server).

Figure 4:
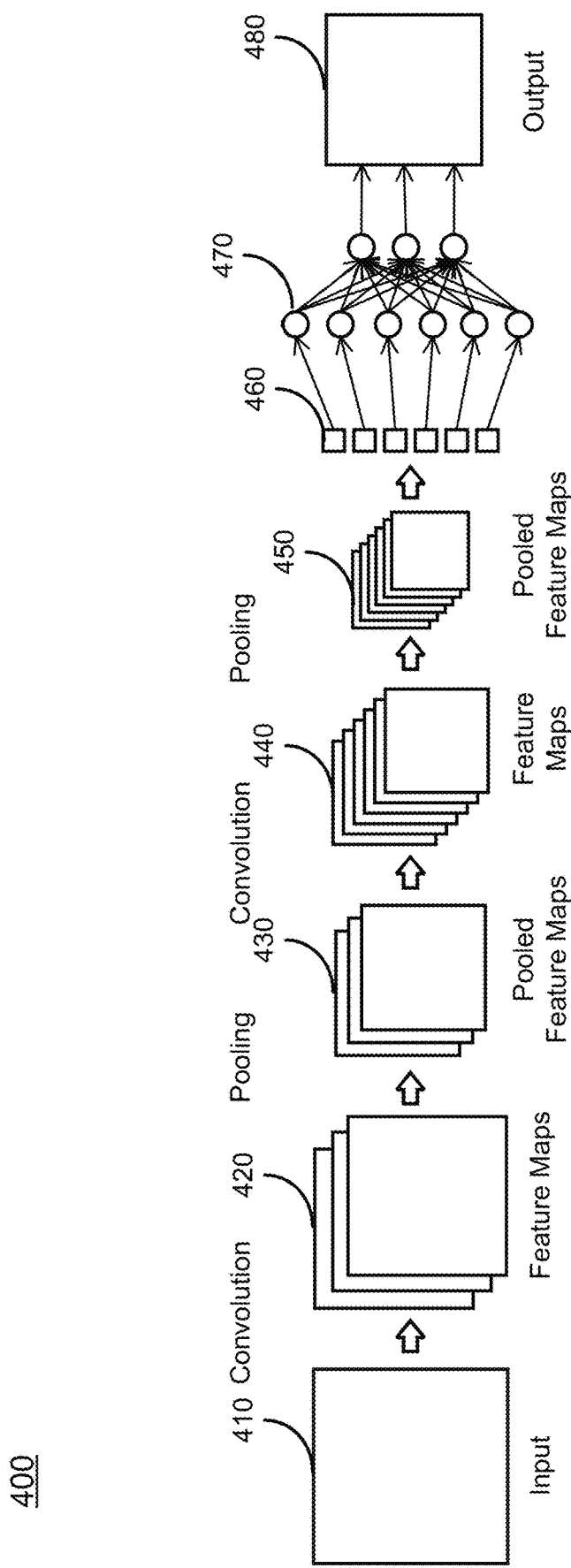
FIG. 4 shows a non-limiting example of a convolutional neural network, in accordance with some embodiments.

FIG. 4 is a block diagram of a convolutional neural network 400 for processing cell images, in accordance with some embodiments. The convolutional neural network 400 comprises a deep learning algorithm that takes in input 410 (e.g., transmitted light micrographs of cells) and generates a precited output 480. The convolutional neural network 400 may have one or more of convolution layers and pooling layers. The convolution layers may perform convolution operations between the input 410 values and convolution filters (matrix of parameters) that are learned over many gradient update iterations during the training. Convolutions operate over 3D tensors, called feature maps, with two spatial axes (height and width) as well as a depth axis (i.e., channel axis). For an RGB image, the dimension of the depth axis may be 3, because the image has three color channels (red, green, and blue). For a black-and-white picture, the depth may be 1 (levels of gray). The convolution operation may extract patches from its input feature map and applies the same transformation to all of these patches, producing an output feature map. This output feature map may be a 3D tensor: it has a width and a height. Its depth may be arbitrary, because the output depth is a parameter of the layer, and the different channels in that depth axis no longer stand for specific colors as in RGB input; rather, they stand for filters that encode specific aspects of the input 410.

A pooling layer may operate a pooling function that divides input into non-overlapping two-dimensional spaces. For example, the feature maps 420 and 440 may comprise output generated from previous convolution operations and used as input to subsequent pooling layers, respectively. A filter with a size of 2×2 is slid over the feature maps using a stride of 2. For a receptive field with a size of 2×2 (e.g., the part of the feature maps 420 and 440 under the filter), an average pooling operation may produce an average value of the four pixels in the receptive field, whereas a maximum pooling operation may select a maximum value of the four pixels in the receptive field. As such, pooling operations may consolidate the features learned by the convolutional neural network 400 and gradually reduce the spatial dimension of the feature maps to minimize the numbers of parameters and computations in the network.

As illustrated in FIG. 4, input 410 is processed via a convolution operation to generate feature maps 420, which in turn are processed by a pooling operation to generate pooled features maps 430. As the convolutional neural network 400 may comprise a plurality of convolution layers and pooling layers where output from a previous layer may be input to a next layer, the convolution and pooling operations may repeat, thereby generating feature maps 440 and pooled feature maps 450, respectively. In some embodiments, the pooled feature maps 450 which are 2-dimensional arrays, may be processed via a flattening operation, which generates a 1-dimensional vector 460. The vector may be processed via a fully connected layer 470, which generates predicted output 480.

In some embodiments, the convolutional neural network 400 may be scaled to construe machine learning models with better accuracy and efficiency. For example, one or more of depth, width, resolution of the convolutional neural network 400 may be scaled. Depending on the input, the convolutional neural network 400 may be scaled in a single dimension or multiple dimensions. For example, for higher resolution input data, the width and depth of the convolutional neural network 400 may be scaled, such that larger receptive fields are able to capture similar features that include more pixels in larger images.

It should be noted that FIG. 4 is a non-limiting example of convolutional neural network for illustrative purposes. The number of convolution layers, pooling layers, flattening layers and fully connected layers may be adjusted without deviating from the scope of the disclosure herein.

Figure 5:
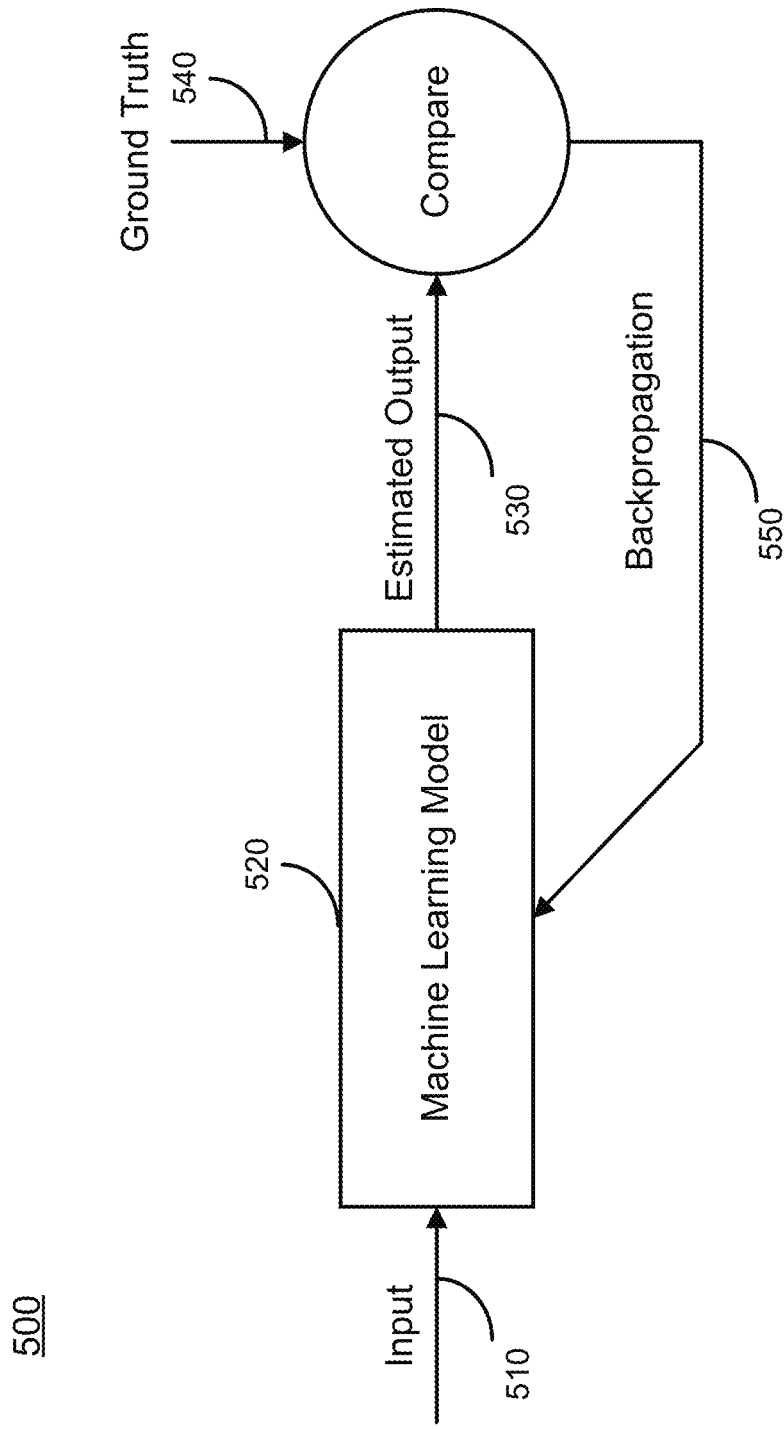
FIG. 5 is a block diagram of training a machine learning model, in accordance with some embodiments.

FIG. 5 is a block diagram of training a machine learning model, in accordance with some embodiments. In a training process 500, weight parameters in each layer of the machine learning model 520 are optimized using backpropagation 550 based on comparison between the estimated/predicted output 530 and the ground truth 540 until the estimated output 530 progressively matches or approaches the ground truth 540. A single cycle of the optimization process is organized as follows. First, given a training dataset as input 510, the forward pass sequentially computes the output in each layer and propagates the function signals forward through the machine learning model 520. In the final output layer, an objective loss function measures an error between the estimated output 530 and given labels (e.g., ground truth 540) of the training data. To minimize the training error, the backward pass 560 uses the chain rule to backpropagate error signals and compute gradients with respect to all weights throughout the neural network. Finally, the weight parameters are updated using optimization algorithms based on stochastic gradient descent (SGD). Several optimization algorithms stem from stochastic gradient descent. For example, the Adagrad and Adam training algorithms perform stochastic gradient descent while adaptively modifying learning rates based on update frequency and moments of the gradients for each parameter, respectively. Following training, the machine learning model can be used to analyze new data that the model has never encountered.

In some embodiments, the machine learning model may comprise a featurizer model. The featurizer model may be applied to each transmitted light micrograph of cells or clusters of cells to generate embedding(s). The generated embedding(s) may comprise a mathematical vector representation of the input. Alternatively, the embedding(s) may comprise a latent cell state representation at cell level or cell population-level. The embedding(s) may be highly specific to a cell state and/or different phases of cell differentiation and thus, they may be used to predict the progress of cell differentiation. The generated embedding(s) may be evaluated qualitatively and/or quantitatively. The qualitative evaluation may comprise dimensionality reduction and visualization. The quantitative evaluation may comprise predicting time elapsed in the time course, for example, the time elapsed since the beginning of cell differentiation.

In some embodiments, when the generated embedding(s) comprises a latent cell state representation, it may be used by another machine learning model (e.g., forecaster model) to predict a latent vector. For example, the featurizer model may process the time course data of transmitted light micrographs of live cells captured at timestamp 0, 1, 2, . . . , T, over a time period of cell differentiation, and generate a latent representation for each timestamp. A forecaster model may analyze these latent representations and predict a latent representation at a future timestamp T'. By comparing the latent representations at timestamps T and T', the forecaster model may predict a future state of cell differentiation, and whether and/or when the differentiation process should be terminated. In some embodiments, the forecaster model may be trained autoregressively.

In some embodiments, the machine learning model may recommend and/or optimize differentiation protocols. For example, the machine learning model may comprise a combiner model that has access to a database of experimental results of cell differentiation under various experimental conditions. At least some of the different experimental results of cell differentiation may be caused by difference in single reagents. The combiner model may process the experimental conditions and corresponding results, as well as the latent representations generated by the forecaster model, and predict experimental results. For example, the combiner model may process experimental results on single reagents and generate predicted experimental results on when the single reagents are combined in use.

In some embodiments, the machine learning model may comprise a progress predictor model that predicts the progress of transitions of cell states. For a cell (e.g., stem cell) that undergoes differentiation, a cell state may refer to a phase of a cell differentiation process. The progress predictor model may predict cell progress through phases of cell differentiation at single cell-level or cell population-level. In other embodiments, the progress predictor model may predict the time elapsed in the time course, for example, the time elapsed from the beginning of cell differentiation. The progress predictor model may process embedding(s) of profiles representing cell states generated from the featurizer model and generate a progress bar that quantifies how far a cell is along a temporal trajectory from one cell state to another.

In some embodiments, the machine learning model may comprise the featurizer model, the progress predictor model, and the forecaster model. The featurizer model may process the time course data of transmitted light micrographs of live cells captured at timestamp 0, 1, 2, . . . , T, over a time period of cell differentiation, and generate a latent representation for each timestamp. A forecaster model may analyze these latent representations and predict a latent representation at a future timestamp T'. The latent representation at the future timestamp T' may be processed by the progress predictor model for predicting the progress of transitions of cell states. The forecaster model improves the performance of the progress predictor model because an estimate of the state T'-T steps can be rolled out into the future, and non-linear dynamics can be modeled.

In some embodiments, the machine learning model may comprise a recommendation model that utilizes one or more of the outputs generated from the featurizer model, the progress predictor model, the forecaster model, and the combiner model, and predict optimized experimental conditions. Based on the time course data of transmitted light micrographs of live cells, generated embeddings specific to cell states and different phases of cell differentiation, as well as the database comprising a variety of experimental configurations and results, the recommendation model may predict optimized differentiation protocols with experimental conditions (e.g., reagents, timing, imaging device setup). For example, the recommendation model may generate a candidate set of experimental conditions (e.g., reagent combinations), score each experimental condition and select top scoring candidates as optimized experimental conditions.

In some embodiments, instructions comprising optimized conditions may be sent to imaging devices (e.g., transmitted light microscope), such that the device can capture live cell images with preferred timing, frequency, and other configurations.

In some embodiments, the machine learning model may comprise a classifier that classifies a cell type of the live cells. For example, the classifier may process the input images (e.g., transmitted light micrographs) depicting live cells or clusters of cells and/or generated embedding(s), and classify types of cells in the input images. Cell can be classified into different types based on morphology, physiology, and location. Traditionally, cell sorting and microscopic techniques have been extensively used to isolate cell types, followed by molecular profiling of the sorted cells using, for instance, mRNA or protein measurements. The machine learning model, e.g., a classifier, may extract cell features from the input images or utilize profiles of cell states generated from other models, and predict a probability of the cells in the input images being a specific cell type. Hence, it allows an efficient, accurate and reliable prediction of cell progress without going through cell sorting and molecular profiling.

Figure 6:
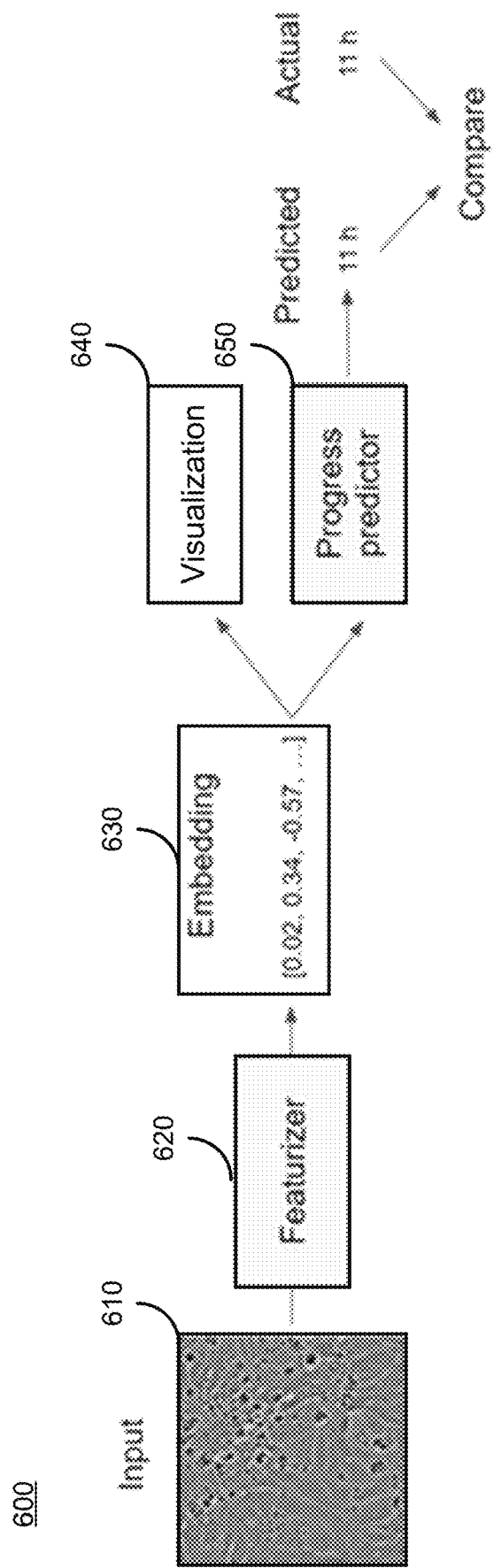
FIG. 6 shows a non-limiting example of machine learning model, in accordance with some embodiments.

FIG. 6 shows a non-limiting example of machine learning model 600. The machine learning model 600 comprises a featurizer model 620 and a progress predictor model 650. The featurizer model 620 may analyze input 610 and convert it into a vector representation, for example, an embedding(s) 630. The input 610 may comprise time course data of transmitted light micrographs of cells collected at an interval over a time period. For example, the input 610 may comprise time course data of transmitted light micrographs of cells that are under differentiation. The input 610 may include fluorescent images of stained live cells. The generated embedding(s) 630 may be a low-dimensional representation of the input 610. For example, the embedding(s) 630 may be latent vectors or latent cell state representation. The embedding(s) 630 may be used for visualization process 640. In some embodiments, the visualization may comprise dimensionality reduction. In other embodiments, the visualization may comprise using the embedding 630 to generate plots in a visual or graphical way to non-quantitatively assess the quality of the embedding 630. For example, the visualization may comprise generating plots with dimensionality reduction, via e.g., principal component analysis (PCA) that transforms a large set of variables into smaller ones, t-distributed stochastic neighbor embedding (t-SNE) that visualizes high-dimensional data, and Uniform Manifold Approximation and Projection (UMAP). The progress predictor 650 receives the image embedding(s) 630 as input and predicts the progress of cell differentiation at single cell-level or cell population-level, for example, how much time has elapsed since the beginning of cell differentiation.

Figure 7:
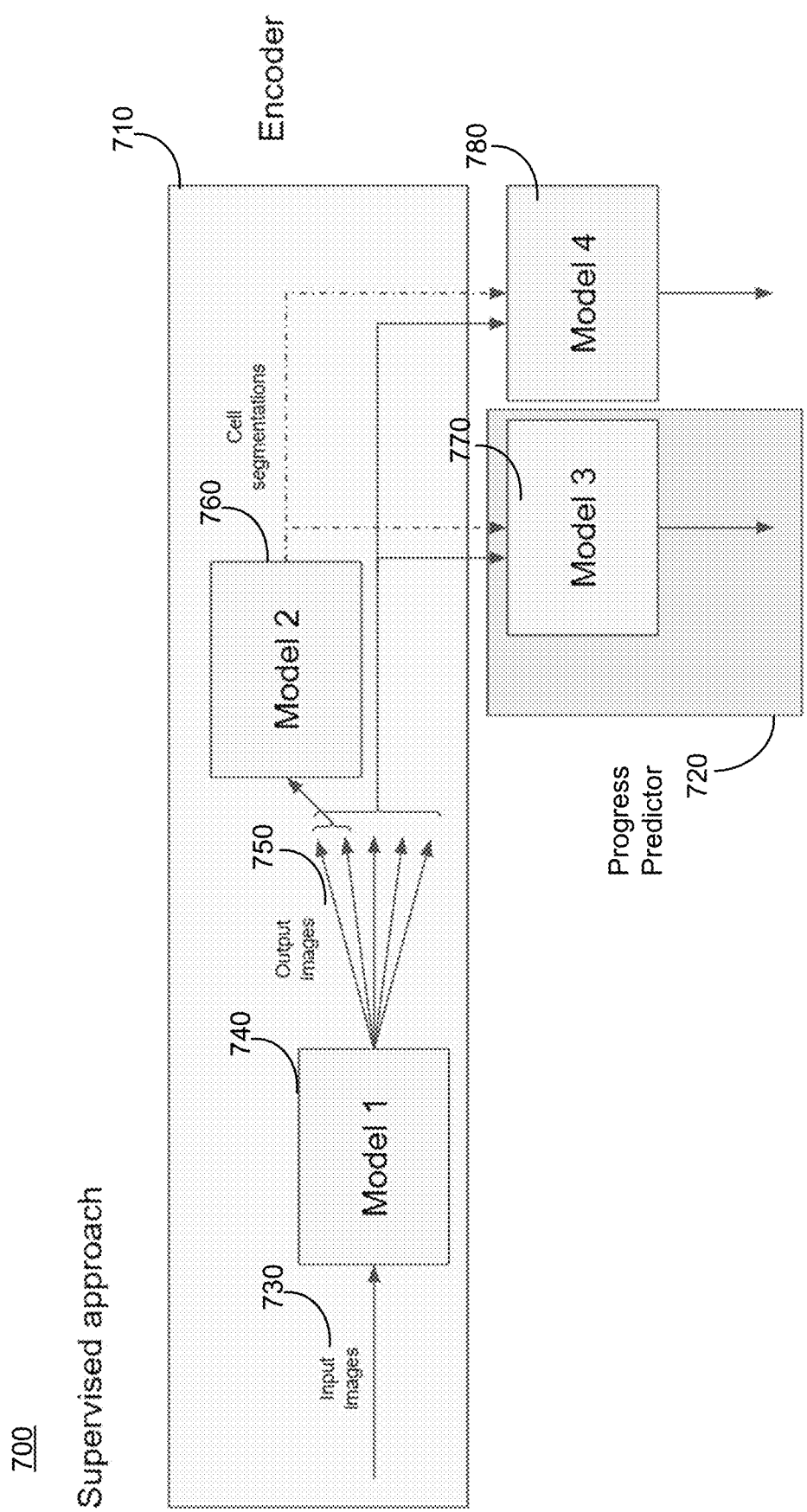
FIG. 7 shows a non-limiting example of machine learning model, in accordance with some embodiments.

FIG. 7 shows a non-limiting example of machine learning model 700. The machine learning model 700 comprises an encoder 710, a progress predictor 720, and a classifier 780. The encoder 710 further comprises two machine learning models 740 (model 1) and 760 (model 2). The model 740 may process input 730 and generate embedding(s) 750. The input 730 to the model 740 may comprise time course data of transmitted light micrographs of live cells, for example, brightfield, phase contrast and DIC images. The live cells may be unstained. In other embodiments, the input 730 may comprise fluorescent images of stained live cells or fixed cells.

The output 750 of the model 740 may comprise one or more of the following: (1) data from the input 730; (2) additional spatially aligned channels (e.g., images of stained cells); (3) a linear transformation of the data from the input channels and the spatially aligned channels via, for example, principal component analysis (PCA); (4) a nonlinear transformation of the data from the input channels and the spatially aligned channels via, for example, t-distributed stochastic neighbor embedding(s) (t-SNE) or Uniform Manifold Approximation and Projection (UMAP), and (5) uncertainty estimates or other meta-predictions regarding (1)-(4). In some embodiments, one or more portions of the output channels may be discarded and therefore, not used for further analysis. In some embodiments, the output 750 may comprise output images as diagrammed. In other embodiments, the output 750 may comprise per-pixel embeddings or per-image embeddings, depending on the instantiation of the model 740.

In some embodiments, the output 750 may be used to build a plurality of cell features. For example, for cells or clusters of cells depicted in the input 730, the model 760 may generate cell features comprising size of the cells, distribution of intensity values of each output channel from the model 740, and one or more spatial features, including a distance between the cell under analysis to its nearest neighboring cell, and the number of neighboring cells within a predetermined distance to the cell under analysis.

The model 760 may further process one or more of the output 750 generated from the model 740 and perform instance segmentation to identify individual cells. In some embodiments, the individual cells may be identified by cell nuclei. In other embodiments, the individual cells may be identified by cell boundaries, and other intracellular or extracellular structures.

The progress predictor model 720 may comprise a machine learning model 770 (model 3) that predicts cellular-level progress, for example, progress through phases of cell differentiation process. The progress predictor model 720 (e.g., model 770) may process embedding(s) generated from the model 740 and optionally, the cell segmentation data and cell features generated from the model 760, and predict cell progress. The cell progress may be represented by one or more differentiation trajectories or other temporal processes such as maturation. In some embodiments, the progress predictor model 720 (e.g., model 770) may predict how much time has elapsed since the beginning of cell differentiation. Alternatively, the progress predictor model 720 (e.g., model 770) may predict one or more functional activities that represent the progress of cell differentiation at single cell-level or cell population-level.

The machine learning model 700 may also comprise a classifier 780 that is trained to classify a cell type of the live cells or clusters of cells depicted in the input. In some embodiments, the classifier 780 may predict a probability of the cells being a specific set of cell types. The classification of cell types may be at cell population-level or single cell-level.

In some embodiments, the machine learning model 700 may be trained via supervised learning. During the training process, the models 740, 760, 770 and 780 may process respective training dataset. For example, the training dataset may comprise one or more of: fluorescent images of stained cells, images of relatively pure populations of cells with given cell types and states, time that has elapsed since the beginning of the cell differentiation, and measurements of cellular activities in a chronological order during cell differentiation.

Figure 8:
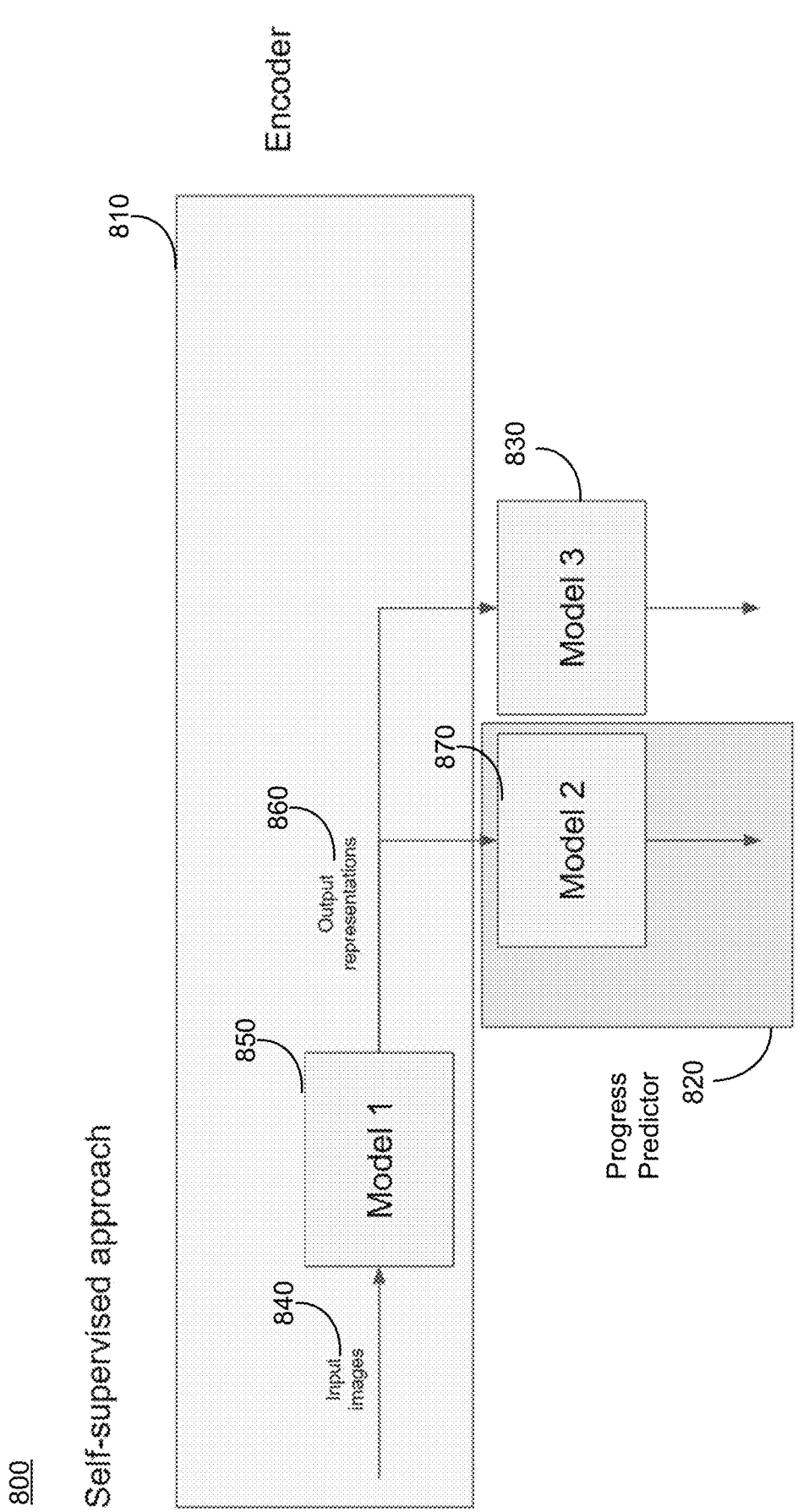
FIG. 8 shows a non-limiting example of machine learning model, in accordance with some embodiments.

FIG. 8 shows a non-limiting example of machine learning model 800. The machine learning model 800 comprises an encoder 810, a progress predictor model 820 and a classifier 830. The encoder 810 comprises a machine learning model 850 (model 1) that processes input 840 and generate output representations 860. In some embodiments, the model 850 may comprise a featurizer model (e.g., featurizer model 620 model in FIG. 6) that processes input 840 and convert it into output representation 860 (e.g., embedding 630 in FIG. 6). The input 840 to the model 850 may comprise time course data of transmitted light micrographs of live cells, for example, brightfield, phase contrast and DIC images. The live cells may be unstained. In other embodiments, the input 840 may comprise fluorescent images of stained live cells or fixed cells. The output representation 860 of the model 850 may comprise mathematical representations of the input images 840. The output representations 860 generated from the model 850 may be aggregated and used for clustering.

The progress predictor model 820 may comprise a machine learning model 870 that predicts cell population-level or single cell-level progress, for example, cell progress through phases of cell differentiation. The progress predictor model 820 (e.g., model 870) may process the output representations 860 generated from the model 850. The cell progress may be represented by one or more differentiation trajectories or other temporal processes such as maturation. In some embodiments, the progress predictor model 820 (e.g., model 870) may predict how much time has elapsed since the beginning of cell differentiation. Alternatively, the progress predictor model 820 (e.g., model 870) may predict one or more functional activities that represent the progress of cell differentiation.

The machine learning model 800 may also comprise a classifier 830 that is trained to classify a cell type of the live cells or clusters of cells depicted in the input. In some embodiments, the classifier 880 may predict a probability of the cells being a specific set of cell types. The classification of cell types may be at cell population-level or single cell-level.

In some embodiments, the machine learning model 800 may be trained via self-supervised learning. Chen, X. and He, K., *Exploring Simple Siamese Representation Learning*, Computer Vision and Pattern Recognition, 2020, arXiv: 2011.10566, incorporated herein by reference. For example, the machine learning model 800 may be trained by processing a pair of related training samples (e.g., images), generating respective output representation for each sample in the pair, and maximizing the similarity between the two output representations. The pair of training images may be sampled from a probability distribution imposed over related images. In some embodiments, the training images may have a spatial relationship, for example, the related images of cells may be captured from different locations or with different focal planes in the same cell culture plate. In other embodiments, the training images may have an experimental relationship, for example, the related images of cells may be captured from different batches of experiments that used identical experimental conditions. In other embodiments, the training images may have a temporal relationship, for example, the related images may be consecutive images that are captured from the same locations in the cell culture plate.

In some embodiments, one or more of the models in FIGS. 7 and 8 may be a convolutional neural network that employs or incorporates one or more convolution layers and dense or densely connected layers. Densely connected layers may learn global patterns in their input feature space. Convolution layers may learn local patterns. As illustrated in FIG. 4, a convolutional neural network may have an architecture that comprises convolution layers, nonlinear layers, and pooling layers. Convolution layers may learn patterns found in small windows or subsets of the input images.

In other embodiments, one or more of the models in FIGS. 7 and 8 may be a recurrent neural network designed to utilize sequential information of input data with cyclic connections among building blocks like perceptrons, long short-term memory units, and gated recurrent units. Additionally or alternatively, one or more of the models in FIGS. 7 and 8 may be other emergent deep neural networks such as deep spatio-temporal neural networks, multi-dimensional recurrent neural networks, and auto-encoders.

Figure 9:
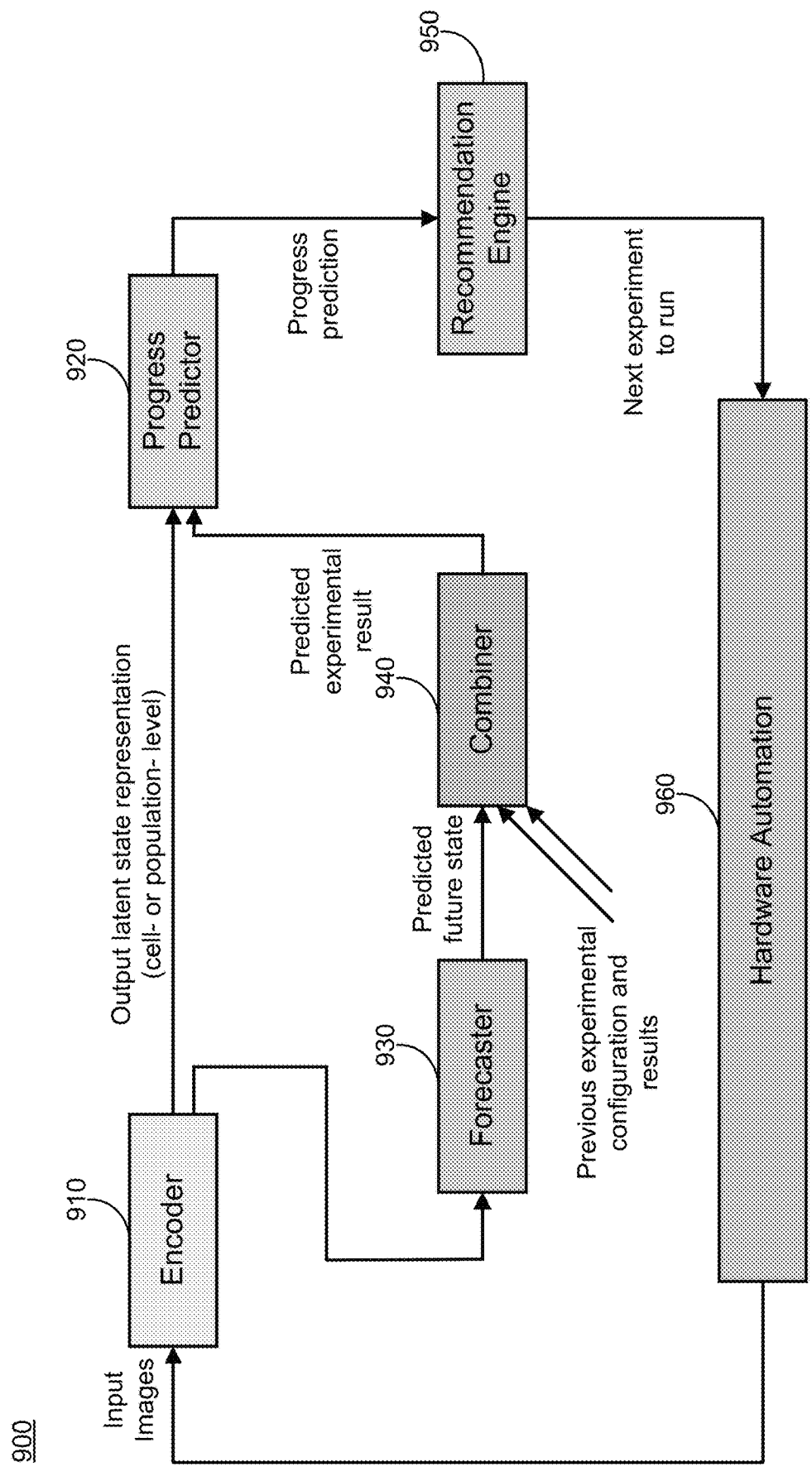
FIG. 9 shows a non-limiting example of combination of machine learning models, in accordance with some embodiments.

FIG. 9 shows a non-limiting example of combination of machine learning models, in accordance with some embodiments. The system 900 comprises an encoder 910, a progress predictor model 920, a forecaster model 930, a combiner model 940, a recommendation engine 950 and hardware automation model 960. The encoder 910 may be one of the encoder 710 illustrated in FIG. 7 or encoder 810 illustrated in FIG. 8. The encoder 910 may process input and generate latent state representation at single cell-level or cell population-level. In some embodiments, the input may comprise cell imaging data comprising at least one transmitted light micrograph.

The progress predictor model 920 may process the latent state representation generated by the encoder 910 and predict the progress of transitions of cell states. The progress predictor model 920 may be one of the progress predictor models 650 in FIG. 6, 720 in FIG. 7 or 820 in FIG. 8. The progress predictor model 920 may predict cell progress through phases of cell differentiation at single cell-level or cell population-level. The progress predictor model 920 may predict the time elapsed in the time course, for example, the time elapsed from the beginning of cell differentiation. The progress predictor model 920 may generate a progress bar that quantifies how far a cell is along a temporal trajectory from one cell state to another.

The forecaster model 930 may process the latent state representation generated by the encoder 910 and predict a future state. In some embodiments, the encoder 910 may process time course data of transmitted light micrographs of live cells captured at timestamp 0, 1, 2, . . . , T, over a time period of cell differentiation, and generate a latent state representation for each timestamp. The forecaster model 930 may analyze these latent state representations and predict a latent representation at a future timestamp T'. By comparing the latent representations at timestamps 0, 1, 2, . . . , T and T', the forecaster model 930 may predict a future state of cell differentiation, and whether and/or when the differentiation process should be terminated.

The combiner model 940 may process the future state predicted by the forecaster model 930 and generate a predicted experimental result. In some embodiments, the combiner model 940 may have access to a database of experimental results of cell differentiation under various experimental conditions/configurations. The combiner model 940 may process the experimental conditions and corresponding results, as well as the latent representations and future state generated by the forecaster model 930, and predict experimental results. For example, the combiner model 940 may process different experimental results of cell differentiation caused by difference in single reagents and generate predicted experimental results on when the single reagents are combined in use. The predicted experimental results may also be used as input by the progress predictor model 920, to improve the accuracy in progress prediction.

The recommendation engine 950 may utilizes one or more of the outputs generated from the encoder 910, the progress predictor model 920, the forecaster model 930, and the combiner model 940. As illustrated in FIG. 9, the recommendation engine 950 may process the progress prediction of transitions of cell states and predict optimized cell differentiation protocols including e.g., reagents, timing, imaging device setup. For example, the recommendation model may generate a candidate set of experimental conditions (e.g., reagent combinations), score each experimental condition and select top scoring candidates as optimized experimental conditions.

The recommended experimental conditions may be used for hardware automation 960. In some embodiments, the recommended experimental conditions may comprise optimized imaging device setup. The hardware automation model 960 may adjust the settings of the device such that it can capture cell images with optimized timing, frequency, and other configurations in future experiments.

FIG. 10A shows a non-limiting example of training a machine learning model to generate an output image of pseudo-stained cells corresponding to a given fluorescent channel. The training dataset 1010, as input to the machine learning model 1020, may comprise transmitted light micrographs of unstained cells and fluorescent images of stained cells. For example, the training dataset may comprise fluorescent images of Hoechst nuclear stained cells corresponding to a given fluorescent channel and transmitted light micrographs of unstained cells. The machine learning model 1020 may process the training dataset 1010 and generate an output image 1030 of pseudo-stained cells corresponding to the given fluorescent channel ("output DNA"). To optimize the weights within each layer, the machine learning model 1020 may compare the inferenced output 1030 and the training dataset 1040 ("actual DNA") and measure an error therebetween. To minimize the training error, a backward pass may use the chain rule to backpropagate error signals and compute gradients with respect to all weights throughout the model. The weight parameters may be updated using optimization algorithms based on stochastic gradient descent or other suitable approaches.

FIG. 10B shows a non-limiting example of training the machine learning model to generate a plurality of output images of pseudo-stained cells corresponding to a plurality of fluorescent channels. The training dataset 1050, as input to the machine learning model 1060, may comprise transmitted light micrographs of unstained cells and fluorescent images of stained cells corresponding to a plurality of fluorescent channels. For example, the training dataset 1050 may comprise images of Hoechst nuclear stained cells corresponding to fluorescent channel 1, images of SOX2-stained cells corresponding to fluorescent channel 2, and images of TBXT-stained cells corresponding to fluorescent channel 3. The machine learning model 1060 may process the training dataset 1050 and generate a plurality of output images 1070, 1072, and 1074 of pseudo-stained cells corresponding to fluorescent channel 1, 2, and 3, respectively ("output {DNA, SOX2, TBXT}"). To optimize the weights within each layer, the machine learning model 1060 may compare the inferenced output 1070, 1072, and 1074 with the given labels of the training dataset 1080, 1082, and 1084 ("actual {DNA, SOX2, TBXT}"), respectively, and measure an error therebetween. For example, output images corresponding to a given fluorescent channel may be compared with given labels of the training dataset corresponding to the same fluorescent channel. To minimize the training error, a backward pass may use the chain rule to backpropagate error signals and compute gradients with respect to all weights throughout the model. The weight parameters may be updated using optimization algorithms based on stochastic gradient descent or other suitable approaches.

EXAMPLES

The following examples describe the use of a machine learning model to monitor cell states and cell types. As described above, the machine learning model may capture states and dynamics of cells during cell differentiation. For example, the featurizer model may process transmitted light micrographs of live cells and generate embedding(s) that are highly specific to the phases of differentiation. The generated embedding(s) may be used by the progress predictor model to predict the progress of differentiation. The following examples demonstrate the trained machine learning model generalizes with a variety of conditions and contexts for cell culturing, proliferation, and differentiation, and generates robust prediction results. These illustrative examples are representative of embodiments of the systems, methods, and platforms described herein and are not meant to be limiting in any way.

Example 1-Evaluation of Machine Learning Model on Cell Visualization During Differentiation Process This example was to evaluate the robustness in the prediction of test dataset with well-to-well and instrument-to-instrument variations. Induced pluripotent stem cells (iPSC) were cultured in a multiple-well plate for one batch of experiment. The iPSC cells were differentiated to NC-like cells following an existing differentiation protocol (Zhang, Y. et al., Directed Differentiation of Notochord-like and Nucleus Pulposus-like Cells Using Human Pluripotent Stem Cells, Cell Reports, 30, 2791-2806 (2020), incorporated by reference herein.) Some of the cells cultured in the multiple-well plate were used as training dataset. Cells cultured in held-out wells of the multiple-well plate were used as test dataset. Two microscopes were used to capture images of the iPSC cells during cell differentiation. The test was performed over the course of about 120 hours. At each timestamp (e.g., 0 h, 20 h, 40 h, 60 h, 80 h, 100 h), multiple images were taken.

For data processing, the images were processed by the featurizer model to generate corresponding embedding. The embeddings were further reduced to two-dimensions for visualization using principal component analysis (PCA). Each data point corresponds to a single image of cells. Thus, a trajectory can be plotted representing the cell differentiation process of iPSC towards NC-like cells over a time period.

Figure 11:
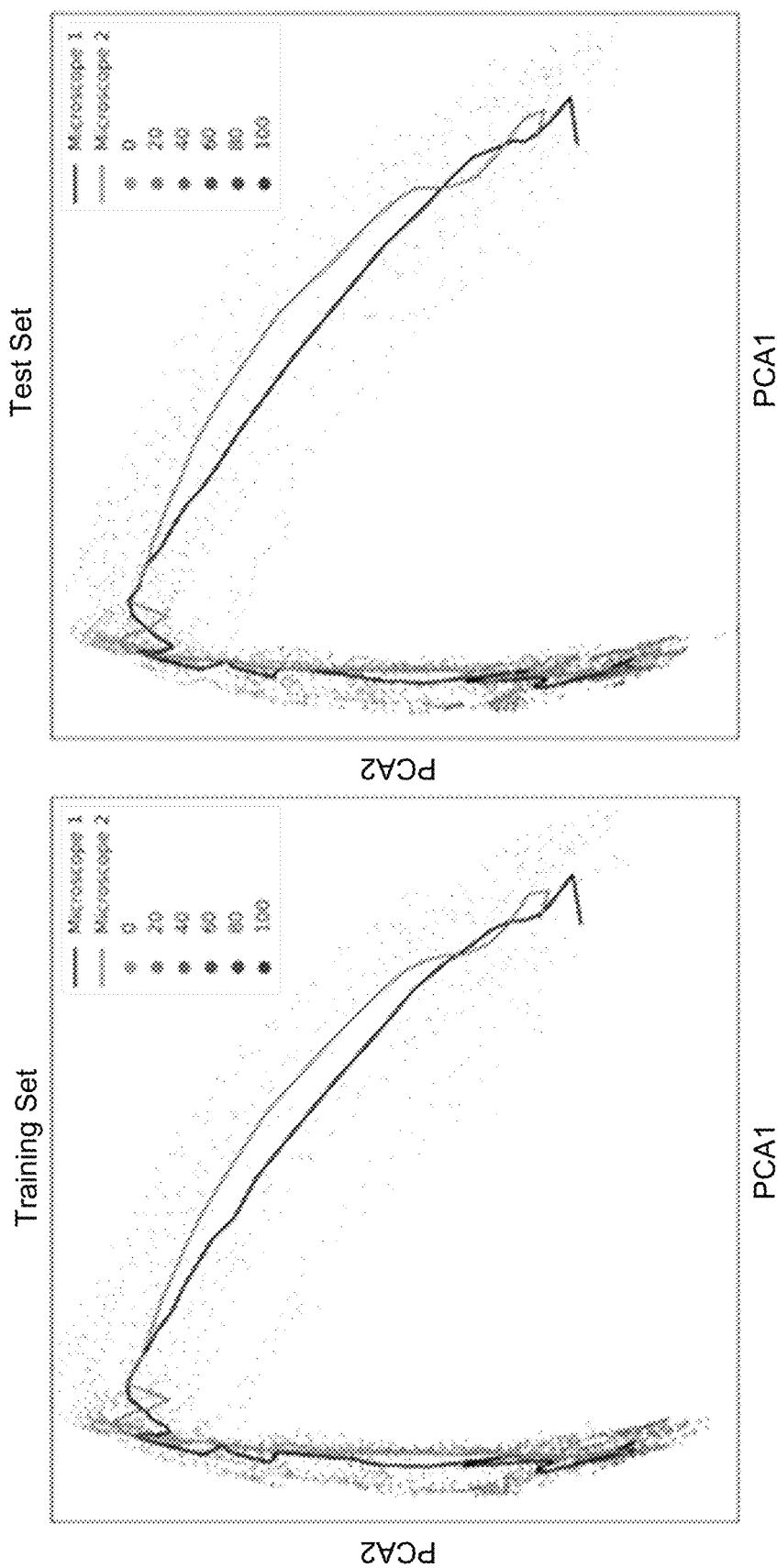
FIG. 11 shows temporal trajectories of training dataset (left) and test dataset (right) of iPSC cells during differentiation process towards NC-like cells, in accordance with some embodiments.

FIG. 11 shows temporal trajectories of training dataset (left) and test dataset (right) of iPSC cells during differentiation process towards NC-like cells. Each datapoint represents an image of cells captured at a given time point during the differentiation process. At each timestamp (e.g., 0 h, 20 h, 40 h, 60 h, 80 h, 100 h) during the differentiation process, multiple images were taken. Each of those images were featurized into an embedding that was further reduced to two dimensions for visualization on PCA plots. The differentiation trajectory for the training dataset (left) is substantially similar to the trajectory for the test dataset (right). Moreover, for both the training and test dataset, the use of different microscopes (black curve for microscope 1 and gray curve for microscope 2) does not cause a substantial discrepancy. These results demonstrate the machine learning model learns generalized features from input images with small well-to-well and instrument-to-instrument variations.

Example 2-Evaluation of Machine Learning Model on Cell Differentiation Progress Prediction This example evaluates the performance of the machine learning model on the prediction of cell progress. As described above and illustrated in FIGS. 6-9, the process predictor model may process the embedding(s) generated from the featurizer model and predict the progress of cell differentiation, for example, how much has time elapsed since the beginning of cell differentiation. In this example, the embedding(s) generated from the featurizer model were fixed. the progress predictor model was trained to predict the progress of cell differentiation, for example, how much time has elapsed since the beginning of the differentiation. When the training dataset was used, the actual time that has elapsed since the beginning of cell differentiation was used as ground truth. By comparing the difference between the predicted time generated from the progress predictor model and ground truth, the parameters (e.g., weights) of the progress predictor model may be optimized. Moreover, because the featurizer model never uses actual elapsed time as input, the prediction generated from the progress predictor model may also indicate how useful the embedding(s) generated from the featurizer model are.

In this example, iPSC cells were cultured in a multiple-well plate during the differentiation, and two microscopes were used to capture images of the cells. Some of the cells cultured in the multiple-well plate were used as training dataset, while others cultured in held-out wells were used as test dataset. For the training dataset, the actual time that elapsed since the beginning of the differentiation was recorded and used as ground truth to train the progress predictor model. For the test dataset, the actual time that elapsed since the beginning of the differentiation process was also recorded, for the purpose of comparing with predicted time generated from the progress predictor model.

FIG. 12A is a non-limiting example of correlation between the actual time measured for the test dataset and predicted time generated from the machine learning model during cell differentiation, where input images were captured using microscope 1. FIG. 12B is a non-limiting example of correlation between the actual time measured for cell differentiation progress using a test dataset of iPSC cells and predicted time generated from the progress predictor model, where input images are captured using microscope 2. The metrics used in this example comprised mean absolute error (MAE) in hours and Pearson correlation (r) between actual time and predicted time. As illustrated in both figures, the predicted time was highly correlated with the actual time measured for the test dataset, where the correlations were rounded up to 1. The observed errors were below 2 hours. The correlation results were consistent across all test dataset of cells cultured in different wells of the multiple-well plate. Moreover, the use of different microscopes did not cause discrepancy. This example demonstrated the progress predictor model can generate reliable predictions on cell progress with small well-to-well and instrument-to-instrument variations.

Example 3—Evaluation of Machine Learning Model on Visualization of Proliferating but Non-differentiating Cells In this example, the machine learning model was evaluated using proliferating but non-differentiating cells and compare the prediction with cells that underwent differentiation. This example was to test whether the machine learning model could pick up general cell density features. Different from Examples 1 and 2, here, the image capture process initiated from 24 hours prior to the differentiation. The machine learning model was trained using the same training dataset as in Examples 1 and 2. Considering the training dataset only included images captured from the beginning of the differentiation process, this example also evaluated how the machine learning model performed when processing test data outside the training domain.

For cells that underwent differentiation, two batches of experiments were performed by culturing cells in multiple-well plates. Some of the cells cultured in the multiple-well plate were used as training dataset. Cells cultured in held-out wells of the multiple-well plate were used as test dataset.

Figure 13:
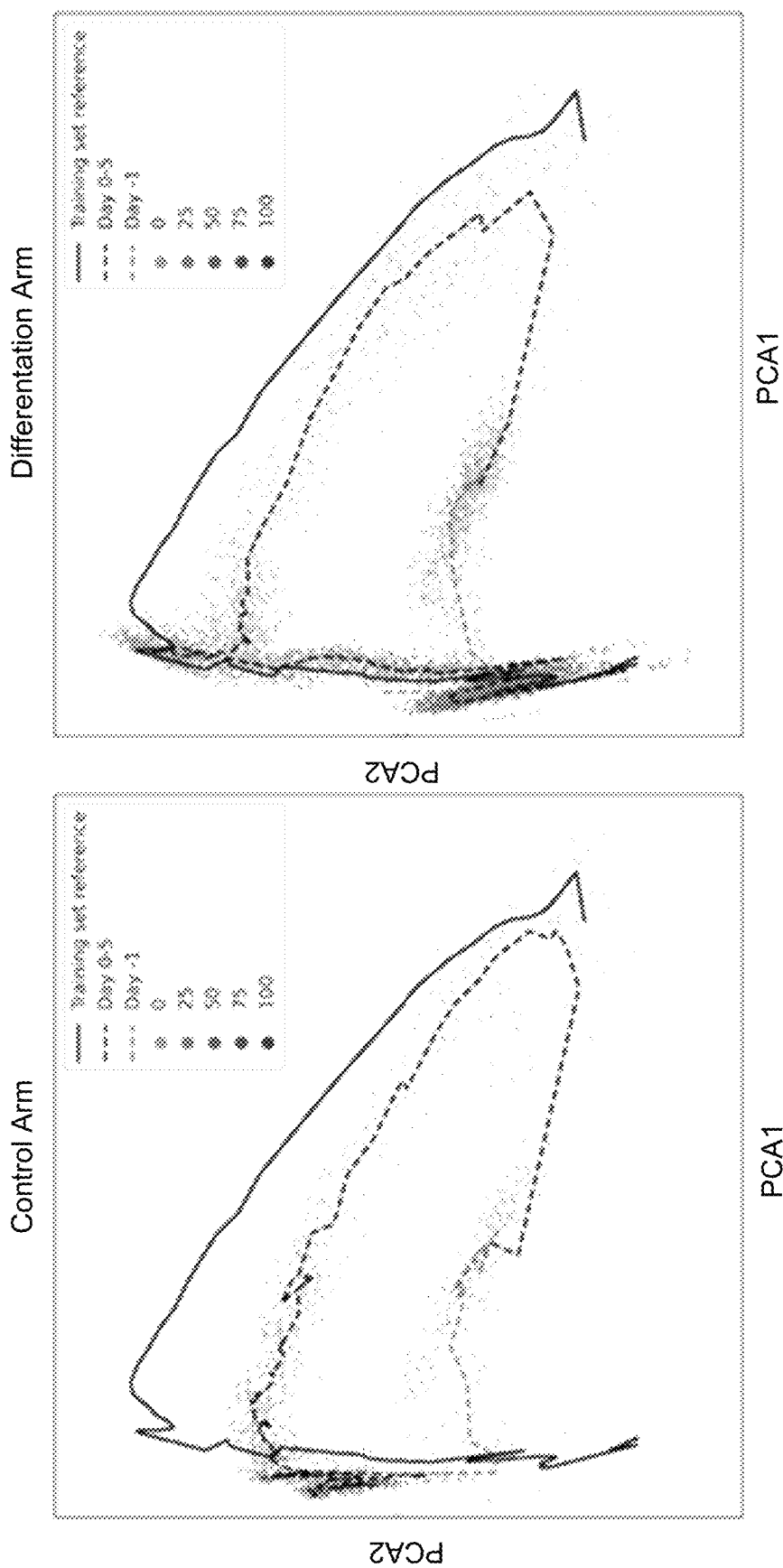
FIG. 13 is a non-limiting example of temporal trajectories of proliferating but non-differentiating cells (left) and differentiating cells (right), in accordance with some embodiments.

FIG. 13 is a non-limiting example of temporal trajectories of proliferating but non-differentiating cells (left, control arm) and differentiating cells (right, differentiation arm). The black dotted line labeled as "Day-1" represents a temporal trajectory of the test dataset of cells from 24 hours prior to the differentiation to the beginning of the differentiation. The gray dotted line labeled as "Day 0-5" represents a temporal trajectory of the test dataset of cells since the beginning of the differentiation process. The black solid line labeled as "Training set reference" represents a temporal trajectory of the training dataset of cells from 24 hours prior to the differentiation. The overall temporal trajectories of the non-differentiating cells ("control arm") and differentiating cells ("differentiation arm") are substantially similar. Nevertheless, the temporal trajectories for both non-differentiating and differentiating cells are shifted compared to the training dataset, indicating the existence of batch effects.

Example 4-Evaluation of Machine Learning Model on Cell Differentiation Progress Prediction of Proliferating but Non-differentiating Cells In this example, the machine learning model was used to predict cell progress of proliferating but non-differentiating cells and compare with differentiating cells. The input images of both non-differentiating and differentiating cells were captured from 24 hours prior to the differentiation process. The machine learning model was trained using the same training dataset as in Examples 1 and 2. Considering the training dataset only included the images captured from the beginning of the differentiation process, this example also evaluated how the machine learning model performed when processing test dataset outside the training domain. For the test dataset (e.g., both non-differentiating and differentiating cells), the actual time that elapsed since the beginning of the differentiation process was also recorded, for the purpose of comparing with the predicted time generated from the progress predictor model.

Figure 14:
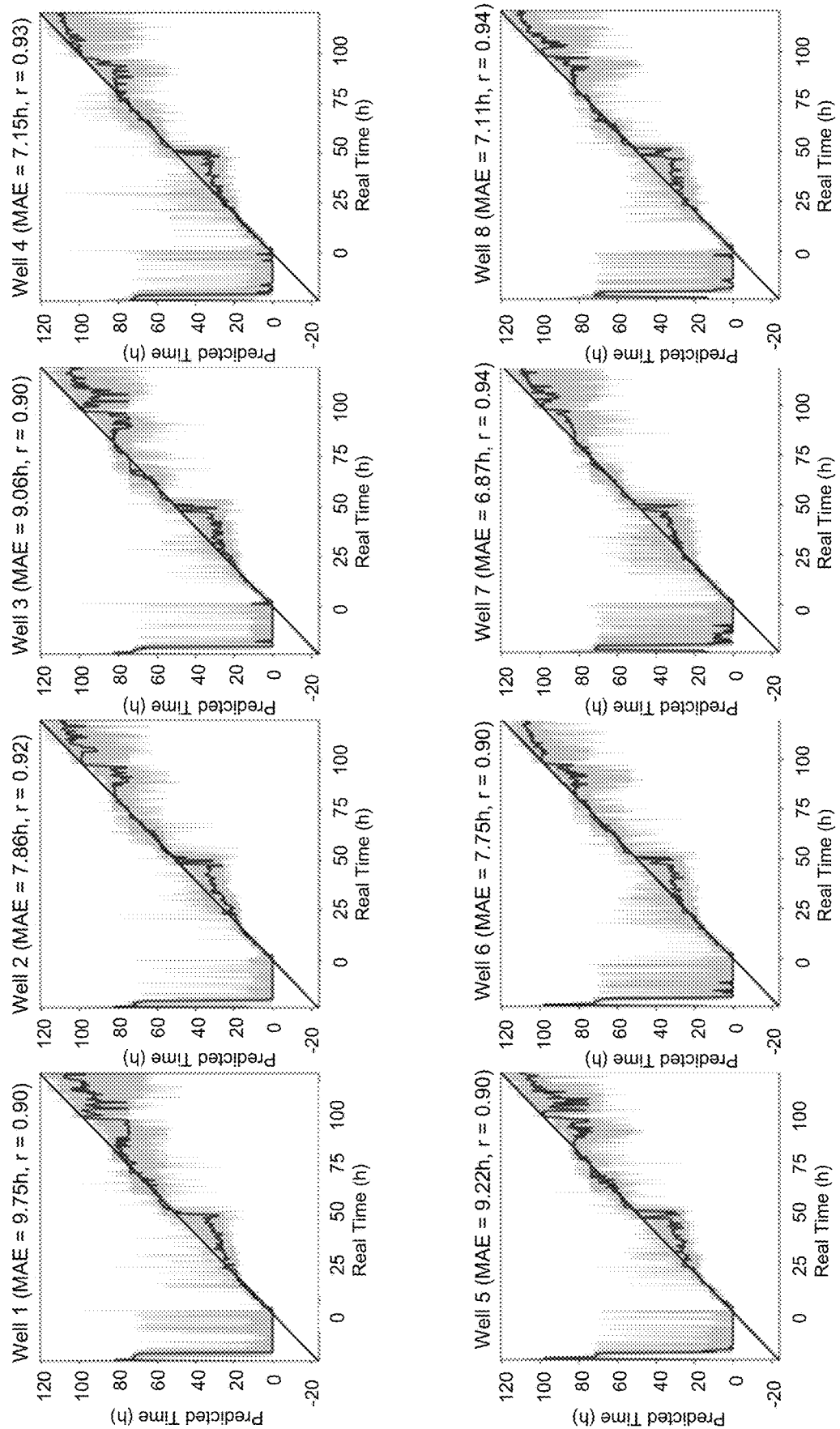
FIG. 14 is a non-limiting example of correlation between the actual time measured for cell differentiation progress using a test dataset of iPSC cells and predicted time generated from the machine learning model, in accordance with some embodiments.

FIG. 14 is a non-limiting example of correlation between the actual time measured for cell differentiation progress using a test dataset of iPSC cells and predicted time generated from the machine learning model. As illustrated, from time 0 to 120 hours, the actual time measured for the differentiation process is highly correlated with predicted time generated from the progress predictor model. For the earliest 24 hours prior to the differentiation (−24-0 hours), because the input images were outside the range of training dataset used by the model, the predicted time did not show good correlation with the actual time.

Figure 15:
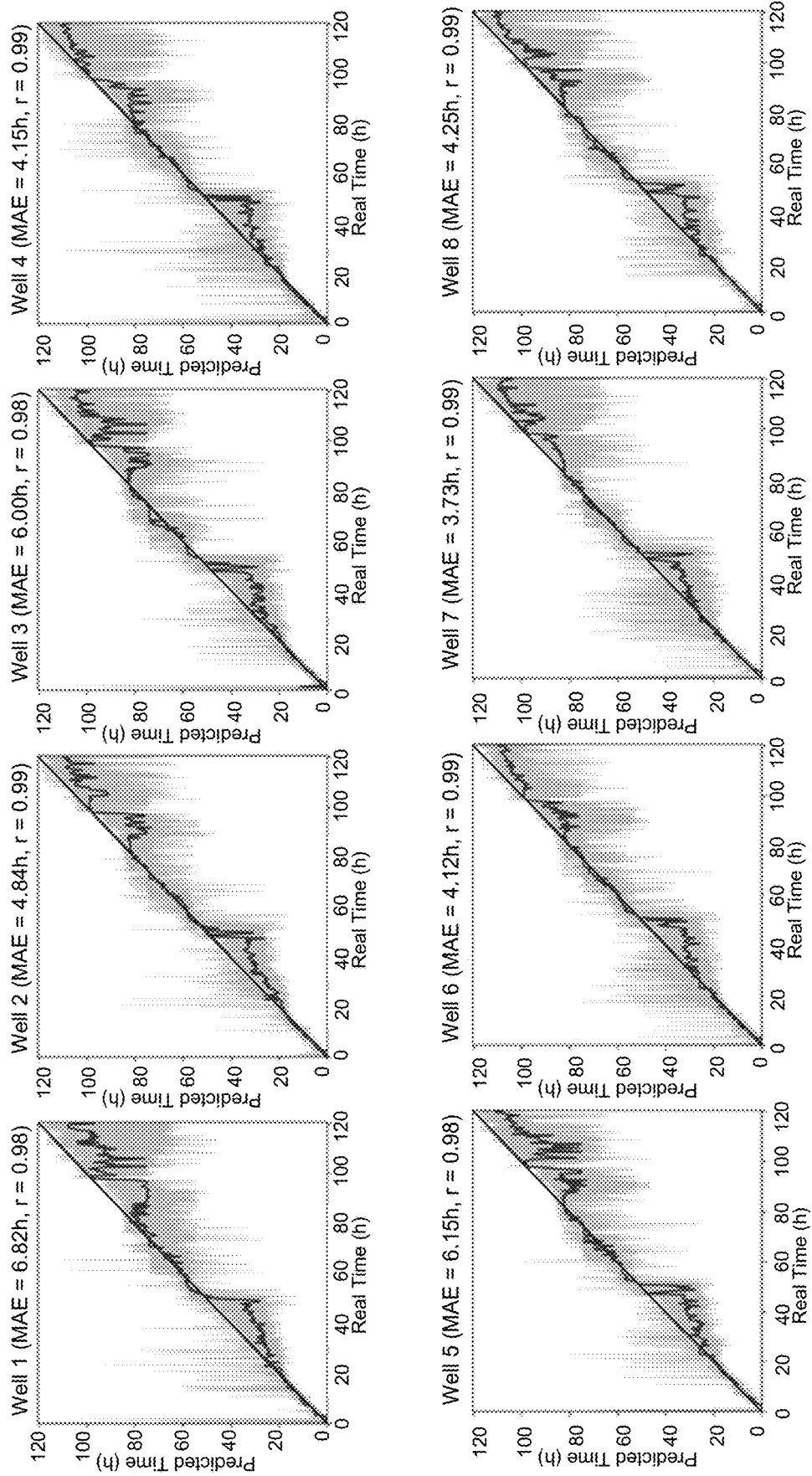
FIG. 15 is a non-limiting example of correlation between the actual time measured for cell differentiation progress using a test dataset of iPSC cells and predicted time generated from the machine learning model, where both the actual and predicted time were calculated from the beginning of the differentiation process, in accordance with some embodiments.

FIG. 15 is a non-limiting example of correlation between the actual time measured for cell differentiation progress using a test dataset of iPSC cells and predicted time generated from the machine learning model during cell differentiation, where both the actual and predicted time were calculated from the beginning of the differentiation process. The actual time measured for the differentiation process was well correlated with predicted time generated from the progress predictor model.

Figure 16:
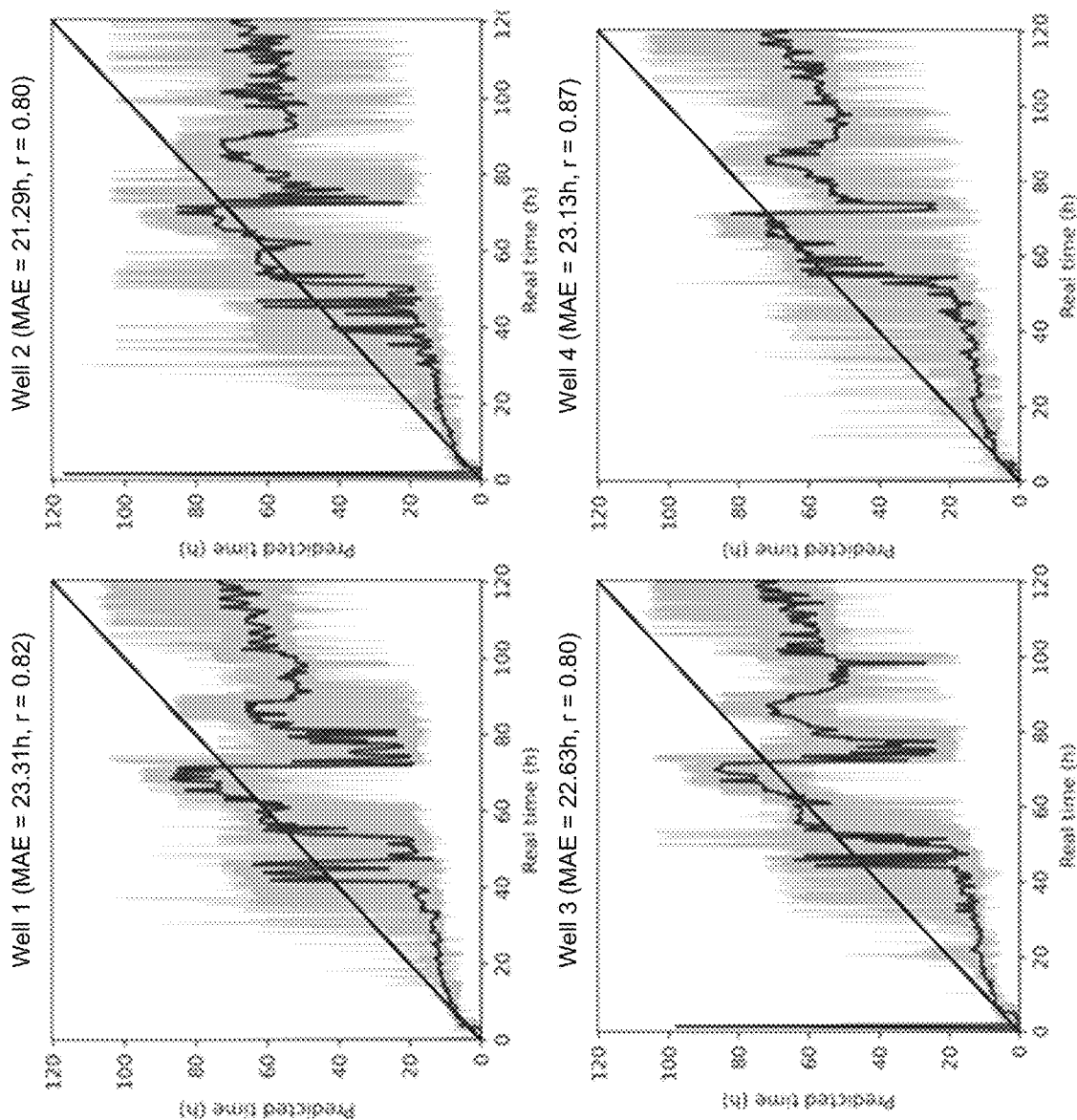
FIG. 16 is a non-limiting example of correlation between the actual time measured for cell differentiation progress using a test dataset of proliferating but non-differentiating cells and predicted time generated from the machine learning model, in accordance with some embodiments.

FIG. 16 a non-limiting example of correlation between the actual time measured for cell differentiation progress using a test dataset of proliferating but non-differentiating cells and predicted time generated from the machine learning model. The machine learning model was expected to have a constant prediction for non-differentiating cells, in other words, to fail the prediction. As illustrated, there was a substantially high degree of uncertainty and error for the correlation between the actual time and the predicted time, indicating the model was not able to generate a prediction for proliferating but non-differentiating cells as expected. Nevertheless, the model still showed some general predictive power, suggesting that the model picked up cell density changes caused by the proliferation.

Example 5-Evaluation of Machine Learning Model on Prediction of Cell Differentiation with a Different Differentiation Protocol Unlike Examples 1-4 where iPSC cells were differentiated to NC-like cells, in this example, iPSC cells were differentiated to endothelial cells using an existing differentiation protocol (Patsch, C. et al., Generation of Vascular Endothelial and Smooth Muscle Cells From Human Pluripotent Stem Cells, *Nature Cell Biology*, 17, pages 994-1003 (2015), incorporated in reference herein.) Brightfield images were collected every 20 minutes for 5 days at a partner site during the differentiation process. Some of the cells cultured in the multiple-well plate were used as training dataset, while others in held-out wells of the plate were used as test dataset. Like Example 1, the embedding(s) generated from the featurizer model were reduced to 2D for visualization using PCA. Each point corresponded to a single image of cells. Hence, a trajectory representing the cell differentiation process over a time period can be plotted.

Moreover, for the training dataset, the actual time that elapsed since the beginning of the differentiation process was recorded and used as ground truth to train the progress predictor model. For the test dataset, the actual time that elapsed since the beginning of the differentiation process was also recorded, for the purpose of comparing with the predicted time generated from the progress predictor model.

Figure 17:
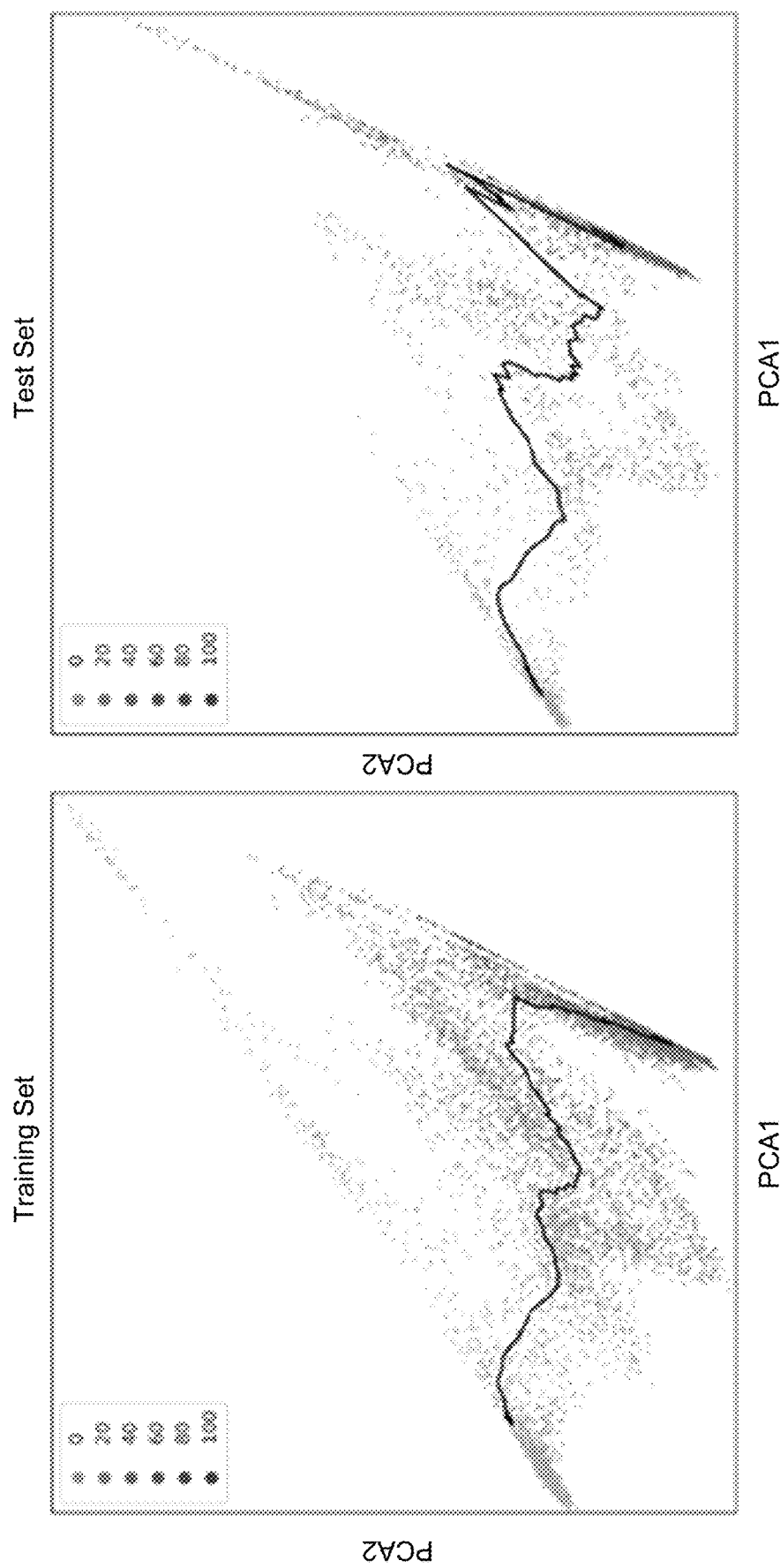
FIG. 17 shows temporal trajectories of training dataset (left) and test dataset (right) of iPSC cells during differentiation process towards endothelial cells, in accordance with some embodiments.

FIG. 17 shows temporal trajectories of training dataset (left) and test dataset (right) of iPSC cells during differentiation process towards endothelial cells. The temporal trajectory of the test dataset (right) is substantially similar to the training set (left), demonstrating that the machine learning model learns robust features that map the trajectory from the beginning of the differentiation process to the end.

Figure 18:
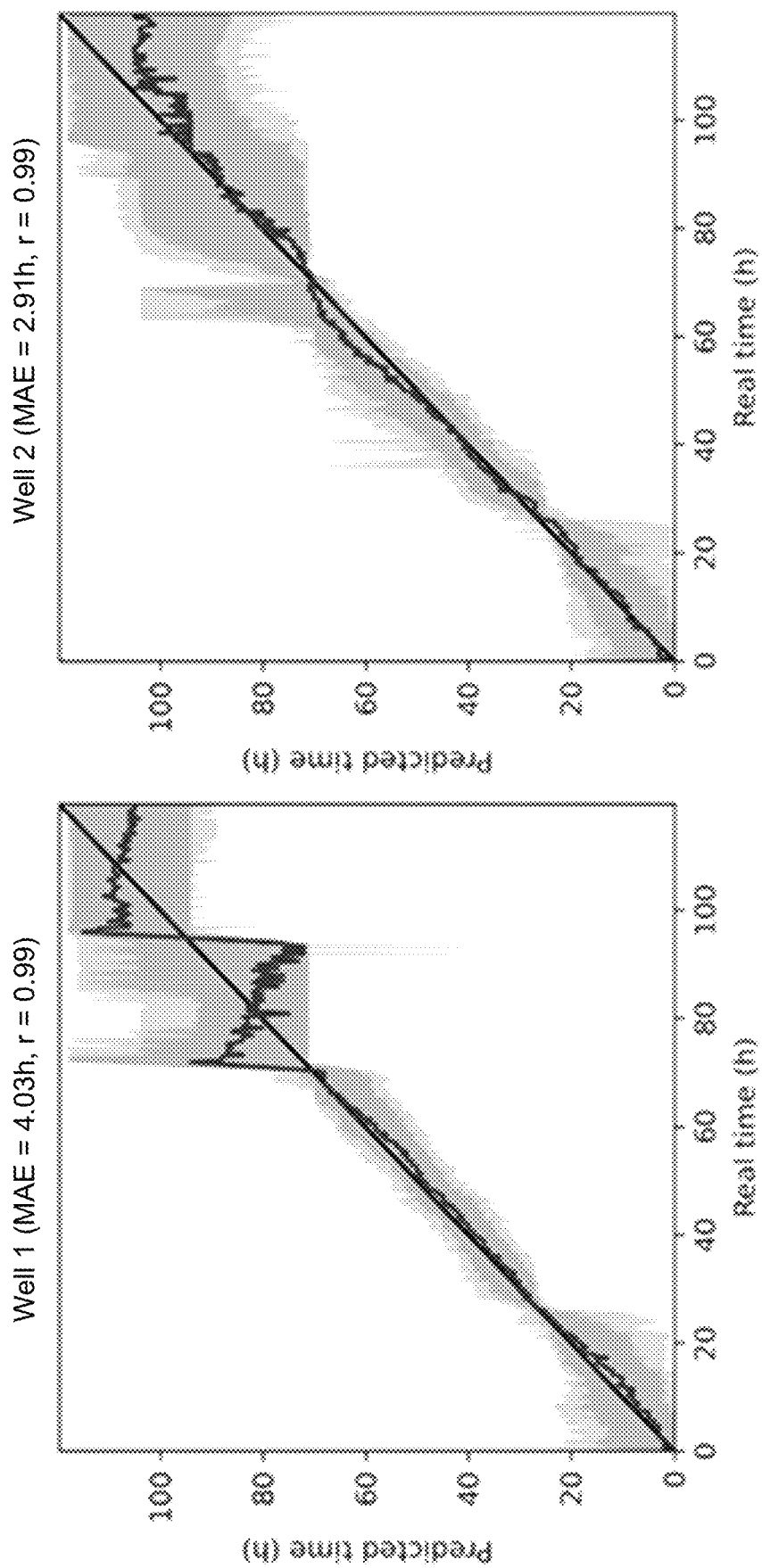
FIG. 18 is a non-limiting example of correlation between the actual time measured for cell differentiation progress towards endothelial cells using a test dataset of iPSC cells and predicted time generated from the machine learning model, in accordance with some embodiments.

FIG. 18 is a non-limiting example of correlation between the actual time measured for cell differentiation progress towards endothelial cells using a test dataset of iPSC cells and predicted time generated from the machine learning model. The predicted time is highly correlated with the actual time, demonstrating the accuracy in predicting the differentiation progress on the test dataset. As shown in FIG. 18, at specific time points (e.g., about 24 h and about 72 h), the culture media was changed. The signal at the time of media change was evidenced by the decrease in the uncertainty at these time points.

Example 6-Evaluation of Machine Learning Model on Nuclei Segmentation

As described above and illustrated in FIG. 7, the machine learning model may comprise a cell segmentation model that processes the embedding(s) generated from the featurizer model and performs instance segmentation to identify individual cells. The individual cells may be identified by cell nuclei. This example evaluates the performance of the machine learning model on cell nuclei segmentation.

Human pluripotent stem cells (hPSCs) were cultured in a multiple-well plate and differentiated to primitive streak cells with APS and AMPS conditions. hPSCs at E8 condition was used to compare with primitive streak cells with APS and AMPS conditions. Some of the cells were used as training dataset, while others in held-out wells of the plate were used as test dataset. For the test dataset, the machine learning model (e.g., cell segmentation model) performed nuclei segmentation to identify individual cells and generated an output image with predicted fluorescent intensities of pseudo nuclei stains.

A threshold fluorescent intensity of nuclei stains was determined and compared with each pixel in each input image. Those pixels with a higher fluorescent intensity than the threshold intensity were determined to be the nuclei area of the cell. The metrics as listed in Table 2 were used to measure the correlation between the actual intensities and predicted intensities. The metrics comprised Jaccard Index (JI, also called intersection over union or IoU) and Dice Similarity Coefficient (DSC, also called F1 score). A low JI or DSC value indicates a low extent of overlap, for example, 0 means no overlap. A high number indicates a high extent of overlap, for example, 1 means a complete or perfect overlap. As shown in Table 2, the actual fluorescent intensities of nuclei-stained cells were substantially correlated with the prediction.

TABLE 2

Correlation between actual intensities of nuclei stains on hPSC and primitive streak cells and predicted intensities generated from the machine learning model.

|  | DNA JI | DNA DSC |
| --- | --- | --- |
| Primitive streak cells (AMPS) | 0.857 | 0.923 |
| Primitive streak cells (APS) | 0.849 | 0.918 |
| hPSC (E8) | 0.853 | 0.920 |

Figure 19:
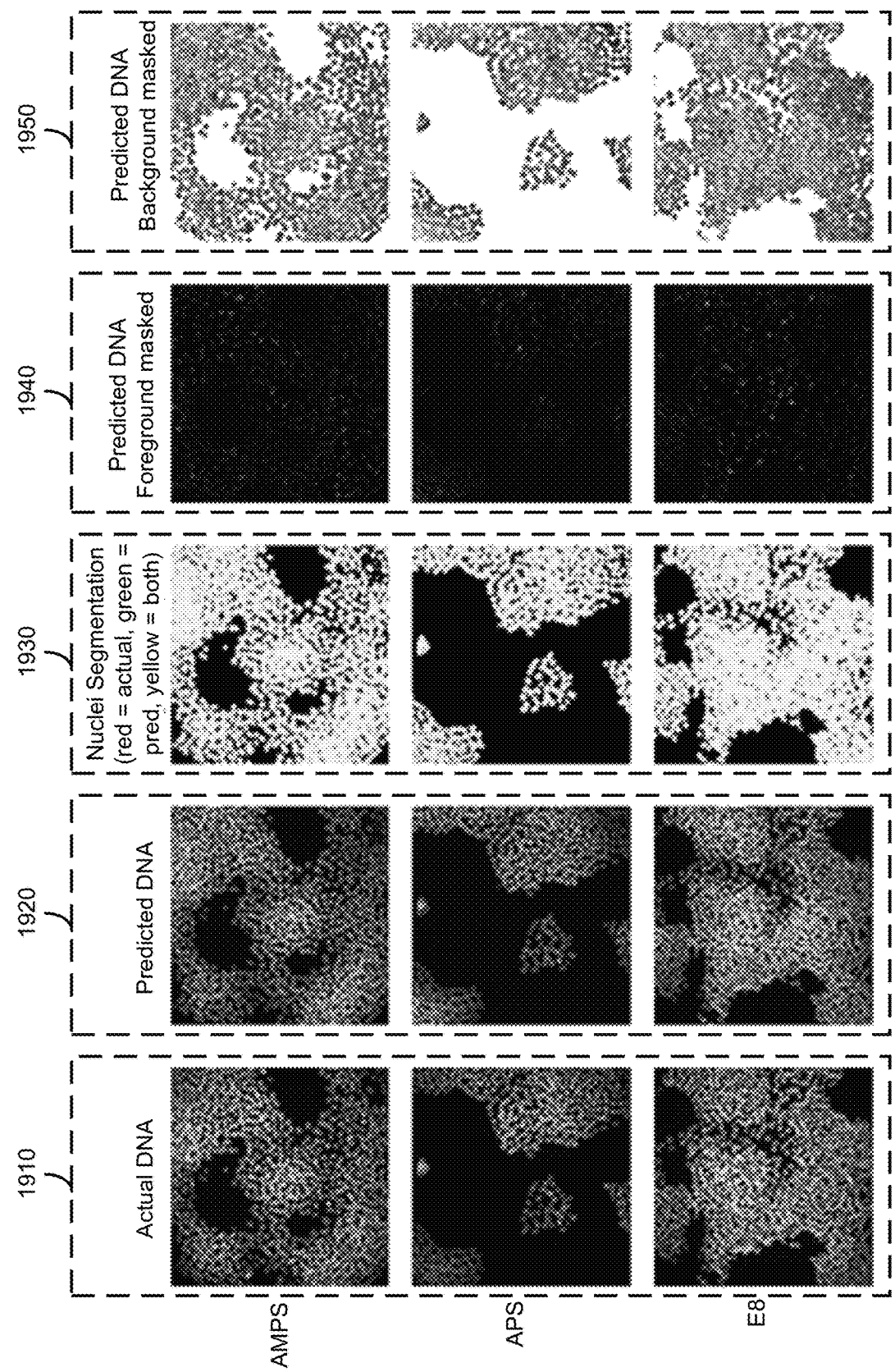
FIG. 19 shows a non-limiting example of output images of cells that undergo differentiation generated from a trained machine learning model, in accordance with some embodiments.

FIG. 19 shows a non-limiting example of output images of cells that undergo differentiation generated from a trained machine learning model. Column 1910 depicts fluorescent images of nuclei-stained primitive streak cells at AMPS condition (top row), APS condition (middle row), and hPSCs at E8 condition (bottom row), respectively. Column 1920 depicts output images of cells generated from the machine learning model, where the nuclei of each individual cell was segmented. Column 1930 shows an overlap between the fluorescent images in column 1910 and predicted output images in column 1920. The nuclei stains in the fluorescent images in column 1910 were shown in red color, while the predicted stains in the output images in column 1920 were shown in green color. The nuclei on the two sets of images, when overlapped, were shown in yellow color. As illustrated in column 1930, the actual nuclei stains were substantially overlapped with the prediction, demonstrating the machine learning model (e.g., cell segmentation model) segmented nuclei of each individual cell. Columns 1940 and 1950 depict output images generated from the machine learning model with foreground (column 1940) and background (column 1950) masked, respectively. As illustrated, the output images with foreground masked in column 1940 showed a minimum fluorescent intensity, indicating a minimum number of cells were added in the output images compared with actual fluorescent images. The output images with background masked in column 1950 showed a minimum number of cells were dropped out from the output images compared with actual fluorescent images. Moreover, the overlap between predicted images and actual fluorescent images was consistent across different cells and cell conditions, indicating the machine learning model generalized the input and performed reliable prediction.

Example 7-Evaluation of Machine Learning Model on Immunofluorescent Marker Prediction In this example, human pluripotent stem cells (hPSCs) were cultured in a multiple-well plate and differentiated to primitive streak cells with APS and AMPS conditions. hPSCs at E8 condition was used to compare with primitive streak cells with APS and AMPS conditions. Some of the cells were used as training dataset, while others in held-out wells of the plate were used as test dataset. For the test dataset, the machine learning model (e.g., cell segmentation model) performed cell segmentation to identify individual cells and generated an output image with predicted fluorescent intensities of pseudo nuclei stains for SOX2 and TBXT.

A threshold fluorescent intensity of stains for each immunofluorescence marker was determined and compared with each pixel in each input image. In addition, the images were masked to include only nuclei regions as determined by the segmentation mask. Masking ensures a reliable comparison. Otherwise, simply predicting no immunofluorescence signal in regions without cells would artificially boost correlation.

The metrics as listed in Table 3 were used to measure the correlation between the actual intensities and predicted intensities. The metrics comprised pixel-wise Pearson correlation (r) between actual intensities and predicted intensities. The actual fluorescent intensities of cells stained for SOX2 and TBXT were substantially correlated with the predicted intensities. FIG. 3 illustrates the comparison between the output images of cells generated by the machine learning model with actual fluorescent images of cells stained for SOX2 and TBXT during differentiation. The predicted output images and actual fluorescent images were highly overlapped, indicating the machine learning model was learned to recognize cell types based on cell features depicted in transmitted light micrographs.

TABLE 3

Correlation between actual intensities of stains for SOX2 and TEXT on hPSC and primitive streak cells and predicted intensities generated from the machine learning model.

|  | SOX2 r | TBXT r |
| --- | --- | --- |
| AMPS | 0.770 | 0.808 |
| APS | 0.722 | 0.794 |
| E8 | 0.812 | 0.716 |

Example 8-Cell Type Classification Using Machine Learning Model

As described above and illustrated in FIG. 7, the machine learning model may comprise a classifier that is trained to classify cell types, for example, to predict a probability of cells being a specific set of cell type. In this example, a classifier was trained using a training dataset comprising cells stained for SOX2 and TBXT. The per-cell mean intensities of SOX2 and TBXT were used as the only features to train the classifier. After the classifier was trained, it was used to classify a test dataset.

In particular, hPSCs cells were cultured in a multiple-well plate. Some of the cells were used as training dataset, by adding SOX2 stains and TBXT stains to the cells and capturing fluorescent images over the course of differentiation. Other cells cultured in held-out wells of the multiple-well plate were used as test dataset.

Figure 20:
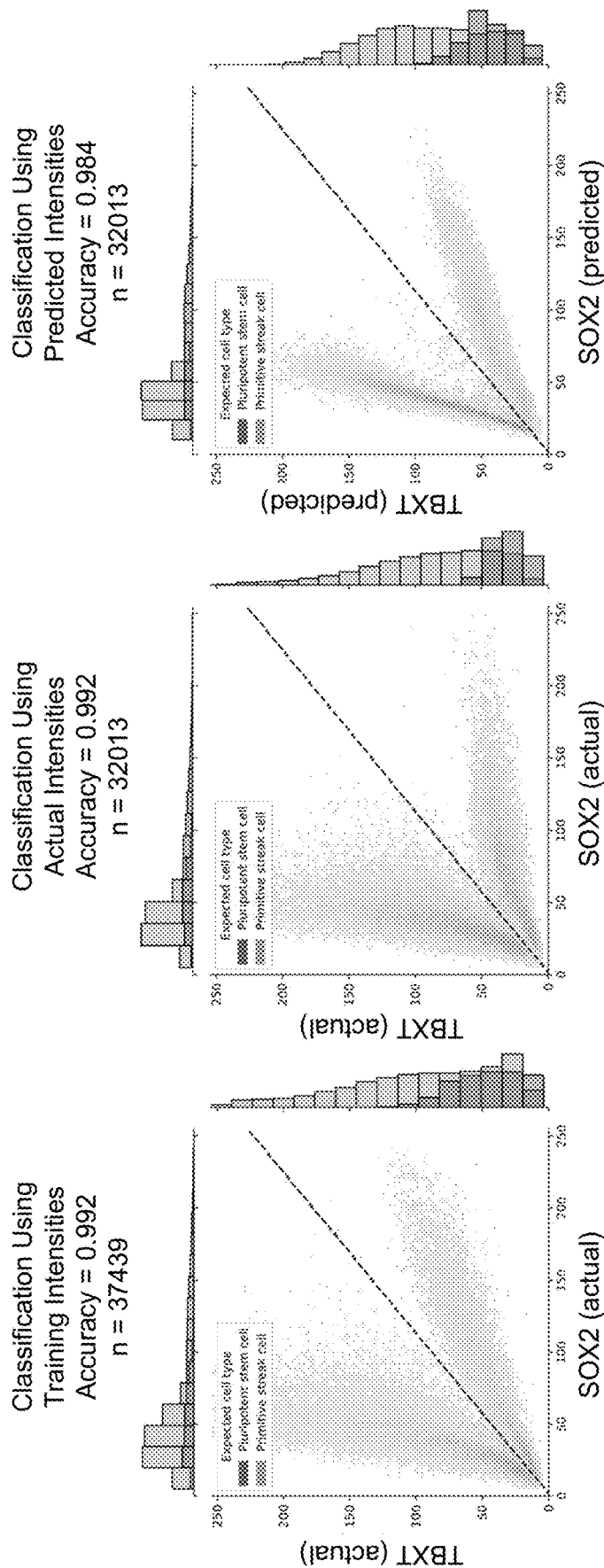
FIG. 20A shows the classification of pluripotent stem cells and primitive streak cells of a training dataset of cells generated from a trained machine learning model, in accordance with some embodiments.
FIG. 20B shows the classification of pluripotent stem cells and primitive streak cells of a test dataset of cells generated from a trained machine learning model, where the model processes fluorescent images of cells stained for SOX2 and TBXT, in accordance with some embodiments.
FIG. 20C shows the classification of pluripotent stem cells and primitive streak cells of a test dataset of cells generated from a trained machine learning model, where the machine learning model processes predicted output images of cells with pseudo stains for SOX2 and TBXT, in accordance with some embodiments.

FIGS. 20A-20C illustrate the classification of cell types using a trained machine learning model. FIG. 20A shows the classification of pluripotent stem cells and primitive streak cells in the training dataset. The machine learning model showed 99.2% accuracy on the classification of the training dataset. The cell population within the same cell type showed a high homogeneity. Moreover, the machine learning model showed a clear separation of phenotypes between two cell types.

FIG. 20B shows the classification of pluripotent stem cells and primitive streak cells of a test dataset of cells generated from a trained machine learning model, where the model processes fluorescent images of cells stained for SOX2 and TBXT. The machine learning model showed 99.2% accuracy on the classification of test dataset, indicating a minimum well-to-well variation. Similar to the classification results of training dataset, the cell population within the same cell type showed a high homogeneity. Moreover, the model showed a clear separation of phenotypes between two cell types.

FIG. 20C shows the classification of pluripotent stem cells and primitive streak cells of a test dataset of cells generated from a trained machine learning model, where the machine learning model processes predicted output images of cells with pseudo stains for SOX2 and TBXT. The machine learning model showed 98.4% accuracy on the classification of test dataset, indicating a minimum loss of signal.

Example 9-Evaluation of Machine Learning Model Using Historical Dataset

This example evaluated the performance of the machine learning model on a test dataset of cells that were cultured and differentiated under experimental conditions that were different from those in previous examples. Moreover, the images of the cells were captured using a different imaging setup. Therefore, this previously collected test dataset, referred as historical dataset, was used to evaluate the generalization ability of the machine learning model across batches of experiments with different experimental and imaging conditions.

Figure 21:
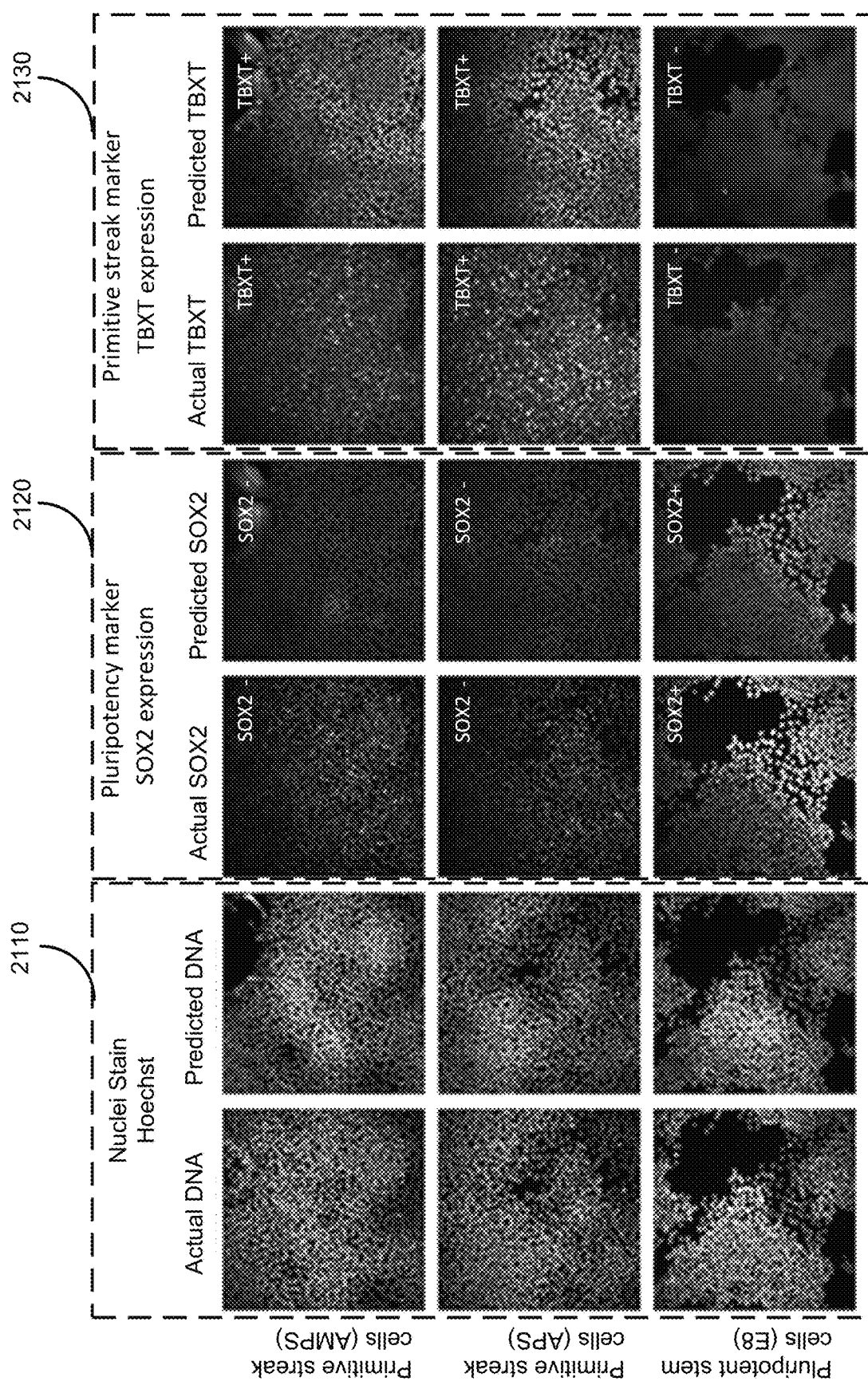
FIG. 21 shows a non-limiting example of output images of pseudo-stained cells during cell differentiation in a historical dataset generated from the machine learning model, in accordance with some embodiments.

FIG. 21 shows a non-limiting example of output images of pseudo-stained cells in a historical dataset during cell differentiation generated from a trained machine learning model. As illustrated, panel 2110 comprises output images generated from the machine learning model, corresponding to Hoechst nuclear staining ("predicted DNA" in the right column of panel 2110) and fluorescent images of nuclear stained cells ("actual DNA" in the left column of panel 2110). The top two rows of images are directed to primitive streak cells with AMPS and APS conditions, respectively. The bottom row of images directed to hPSCs with E8 condition prior to the differentiation. The output images of Hoechst nuclear staining of both hPSCs and primitive streak cells resemble the fluorescent images. Panel 2120 comprises output images generated from the machine learning model, corresponding to SOX2 staining ("predicted SOX2" in the right column of panel 2120) and fluorescent images of stained cells ("actual SOX2" in the left column of panel 2120). The machine learning model accurately predicts the high expression level of SOX2 in hPSCs ("SOX2+") and low/minimum expression level of SOX2 in primitive streak cells ("SOX2-"). Panel 2130 comprises output images generated from the machine learning model, corresponding to TBXT staining ("predicted TBXT" in the right column of panel 2130) and fluorescent images of stained cells ("actual TBXT" in the left column of panel 2130). The machine learning model accurately predicts the low/minimum expression level of TBXT in hPSCs ("TBXT-") and high expression level of TBXT in primitive streak cells ("TBXT+"). Nevertheless, the predicted output images of primitive streak cells with AMPS and APS conditions (see upper right corner of output images in the top row of columns 2110, 2120, and 2130) show discrepancy from actual fluorescent images.

Figure 22B:
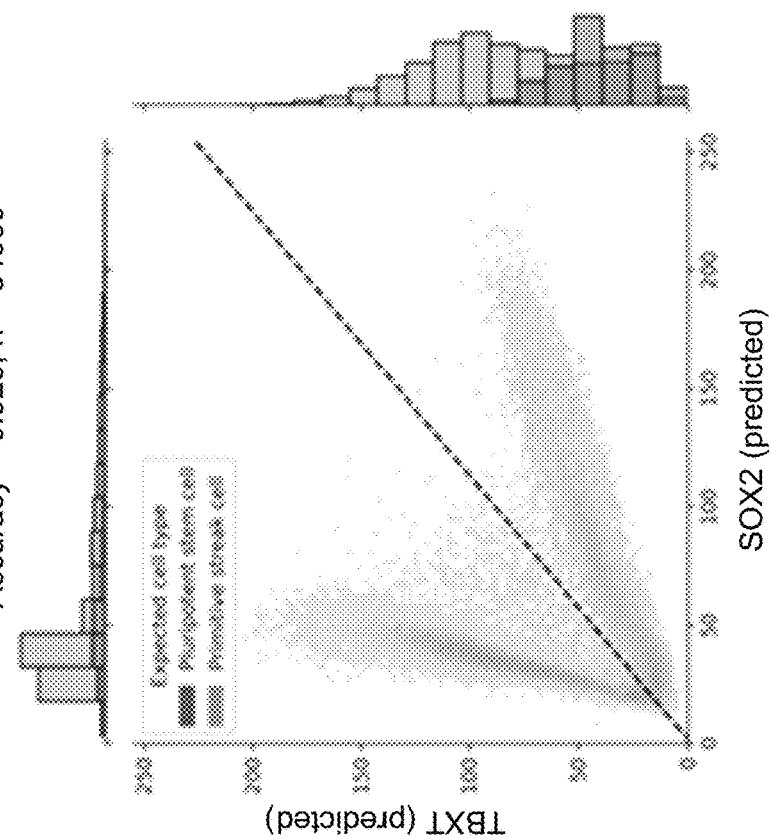
FIG. 22B shows the classification of pluripotent stem cells and primitive streak cells of a historical dataset generated from a trained machine learning model, where the machine learning model processes predicted output images of cells with pseudo stains for SOX2 and TBXT, in accordance with some embodiments.
Figure 22A:
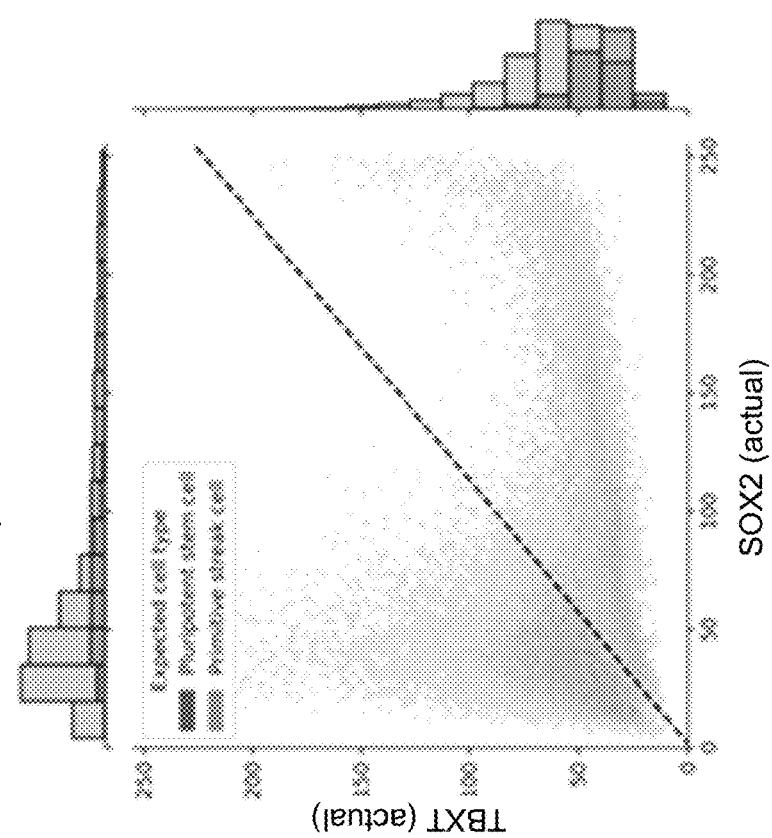
FIG. 22A shows the classification of pluripotent stem cells and primitive streak cells of a historical dataset generated from a trained machine learning model, where the machine learning model processes fluorescent images of cells stained for SOX2 and TBXT, in accordance with some embodiments.

FIG. 22A shows the classification of pluripotent stem cells and primitive streak cells in a historical dataset generated from a trained machine learning model, where the machine learning model processes fluorescent images of cells stained for SOX2 and TBXT. Compared to the accuracy of 99.2% using test dataset as illustrated in FIG. 20B, the accuracy of the classification using the historical dataset is slightly decreased to 90.0%. It is likely caused by variations between the two datasets in experimental conditions (e.g., different antibodies were used) and imaging setup.

FIG. 22B shows the classification of pluripotent stem cells and primitive streak cells in a historical dataset generated from a trained machine learning model, where the machine learning model processes predicted output images of cells with pseudo stains for SOX2 and TBXT. The machine learning model achieved an accuracy of 92.9% when using predicted output images, which is interestingly higher than the accuracy when using actual fluorescent images.

Example 10-Evaluation of Machine Learning Model on a New Cell Line

In this example, a new cell line was evaluated using a trained machine learning model. The experimental conditions in this example were substantially similar to those in previous examples, except a different starting stem cell line (e.g., a differently reprogrammed cell line) was cultured and evaluated. In particular, hPSCs and the new cell line were cultured on the same multiple-well plate. Some of the hPSC cells were used as training dataset to train the machine learning model. Other hPSCs and the new cell lines were used as test dataset to evaluate the performance of the model.

Figures 23A, 23B:
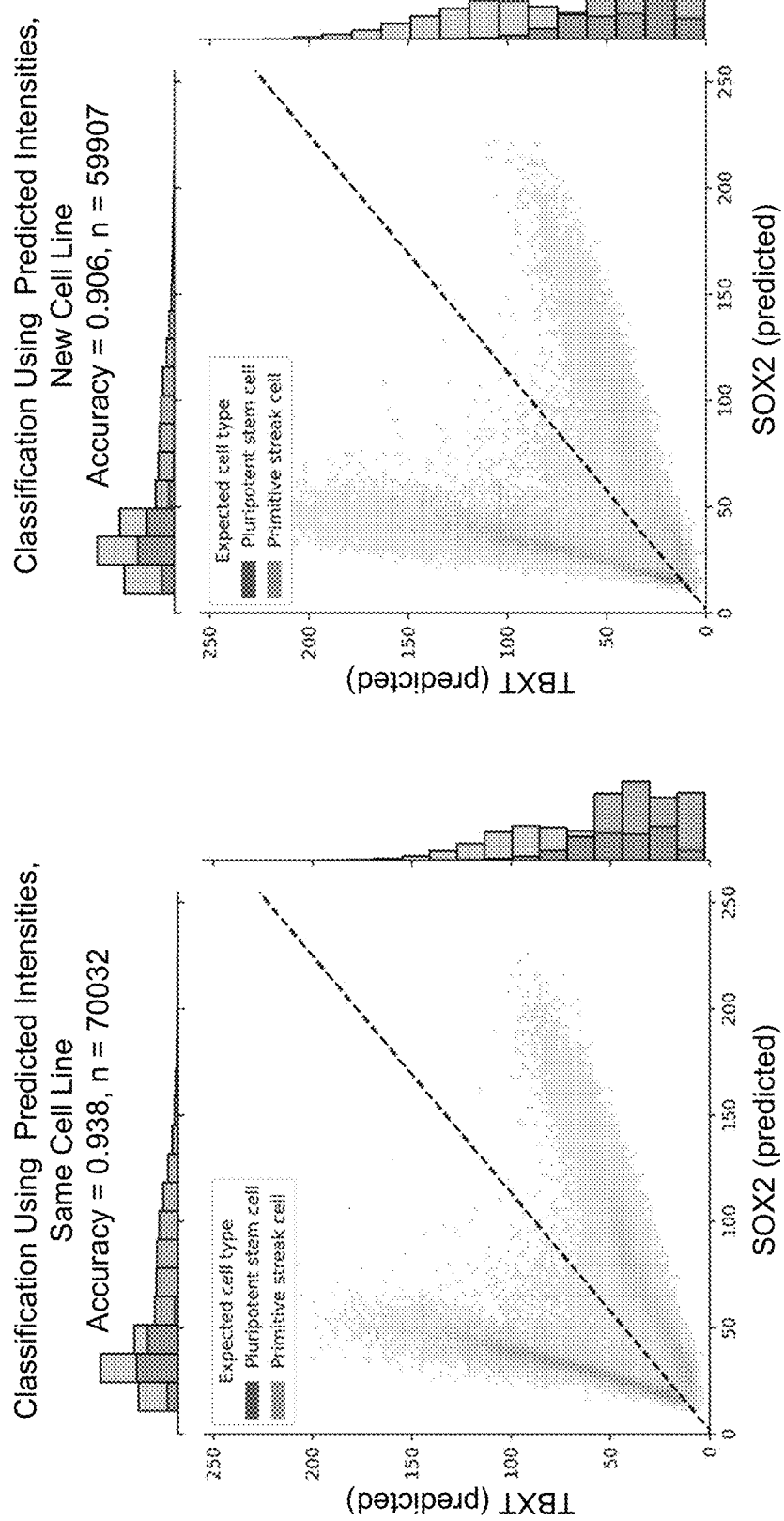
FIG. 23A shows the classification of pluripotent stem cells and primitive streak cells of a test dataset generated from a machine learning model trained and tested using the same cell line, where the machine learning model processes predicted output images of cells with pseudo stains for SOX2 and TBXT, in accordance with some embodiments.
FIG. 23B shows the classification of pluripotent stem cells and primitive streak cells of a test dataset generated from a trained machine learning model using a training dataset from a different cell line, where the machine learning model processes predicted output images of cells with pseudo stains for SOX2 and TBXT, in accordance with some embodiments.

FIG. 23A shows the classification of pluripotent stem cells and primitive streak cells in a test dataset generated from a machine learning model trained and tested using the same cell line, where the machine learning model processes predicted output images of cells with pseudo stains for SOX2 and TBXT. The model was trained using a training dataset of hPSC cells and tested with the same cell line. The model reached an accuracy of 93.8% in cell type classification.

FIG. 23B shows the classification of pluripotent stem cells and primitive streak cells in a test dataset generated from a machine learning model trained with a different cell line, where the machine learning model processes predicted output images of cells with pseudo stains for SOX2 and TBXT. The machine learning model achieved an accuracy of 90.6%. Despite the accuracy was slightly lower than using the test dataset from the same cell line as illustrated in FIG. 23A, the model showed reliable performance in generalizing input from a previously unseen cell line and providing accurate predictions.

Example 11-Evaluation of Machine Learning Model on Monitoring Cell Differentiation As demonstrated in previous examples, the machine learning model showed high accuracy in monitoring cell states and classifying cell types. This example was to evaluate the performance of the model in monitoring cell differentiation in real time. Induced pluripotent stem cells (iPS) were cultured and differentiated using an existing differentiation protocol. Within 24 hours, iPS cells were differentiated to anterior primitive streak (APS) cells, which were further differentiated to definitive endoderm (DE) cells. Definitive endoderm (DE) formation is the first and crucial step in the development of visceral organs such as liver, lung, pancreas, gut, etc. During the cell differentiation, the time course data of transmitted light micrographs was collected at an interval.

The machine learning model processed the time course data of transmitted light micrographs and generated output images identifying different cell states during the differentiation. For example, different cells on the output images may have corresponding pseudo-stains at given fluorescent channels. As the cells with different states express different types and amounts of markers, the corresponding pseudo stains may be used to distinguish cell states. Alternatively, the model may identify cell states and types based on cell features (e.g., morphology) depicted on the transmitted light micrographs, and generate arbitrary color labels based on the corresponding state and type. For example. The model may predict a probability of each cell being iPS, APS or DE, and generate arbitrary colors or color gradients to distinguish cell types.

Figure 24:
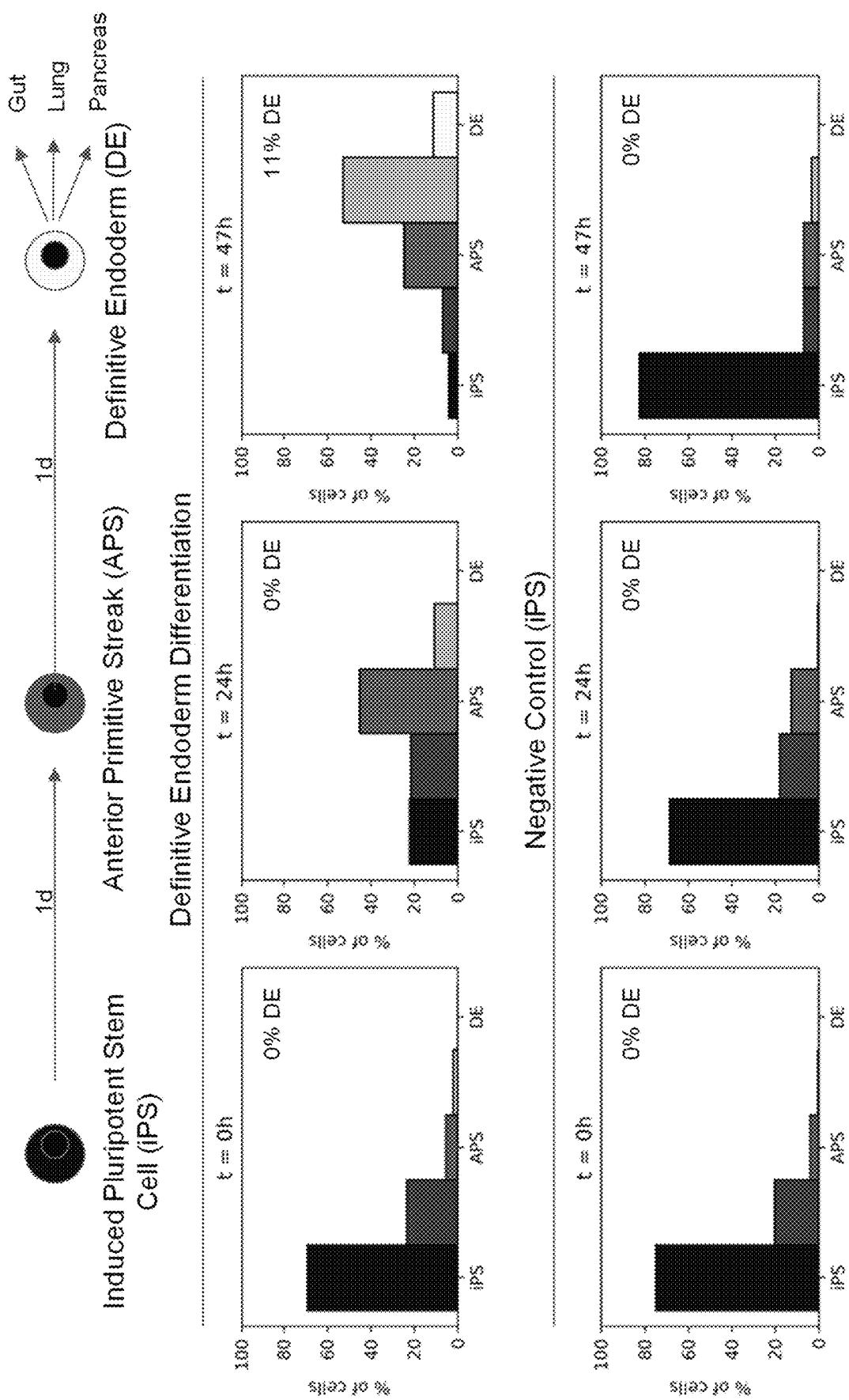
FIG. 24 illustrates cell state prediction of iPS cells during cell differentiation using a trained machine learning model, in accordance with some embodiments.

FIG. 24 illustrates cell state prediction of iPS cells during the cell differentiation using a trained machine learning model. The top row illustrates the timeline of iPS cell differentiation. Within 24 hours, iPS cells were differentiated to APS cells, which further differentiated to DE cells within another 24 hours. The middle row illustrates the quantification of different types of cells during differentiation. At the time stamp of 0 hour, for example, over 60% of the cells were identified by the model as iPS cells. As expected, 0% was identified as DE cells because the differentiation had not occurred. At the time stamp of 24 hours, about 20% of the cells were identified by the model as iPS cells, and 20% as the transition stage between iPS and APS. Over 40% of the cells were identified as APS cells and 0% as DE, demonstrating a majority of the iPS cells was differentiated to APS within 24 hours. At the time stamp of 47 hours, the majority of the iPS cells was differentiated to APS (about 20%), the transition stage between APS and DE (about 50%), and DE cells (about 11%). The bottom row showed negative control where iPS cells were undifferentiated during the same time frame. As expected, the ratio of iPS cells was consistently at 70%-80% during the time course, with no DE cells identified.

Figure 25A:
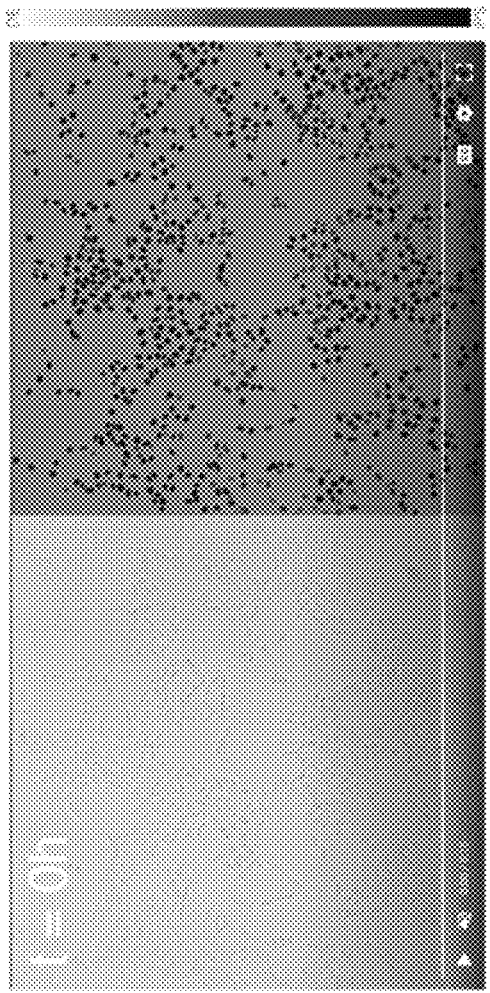
FIG. 25A shows a non-limiting example of time lapse photograph, including a transmitted light micrograph of unstained cells at the timestamp of 0 hour, and a corresponding output image with identified cell states generated from a machine learning model, in accordance with some embodiments.
Figure 25B:
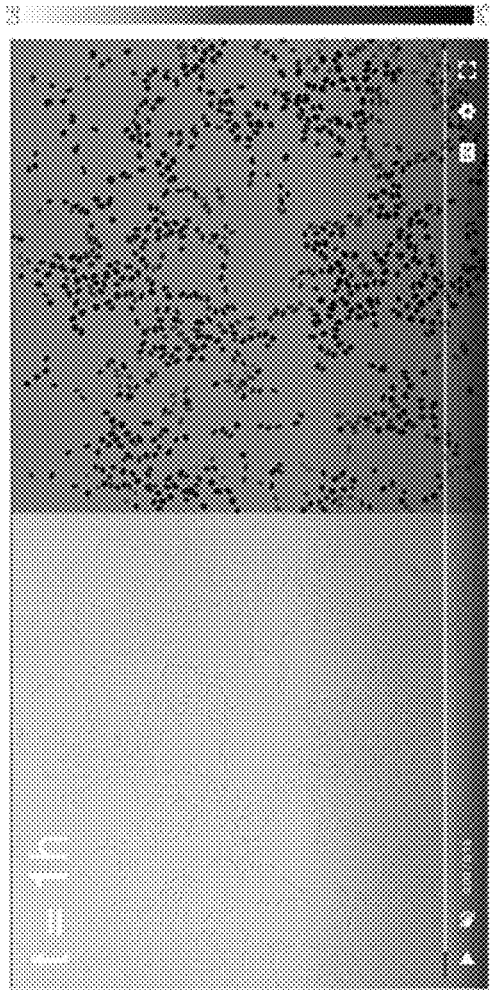
FIG. 25B shows a non-limiting example of time lapse photograph, including a transmitted light micrograph of unstained cells at the timestamp of 1 hour, and a corresponding output image with identified cell states generated from a machine learning model, in accordance with some embodiments.
Figure 25C:
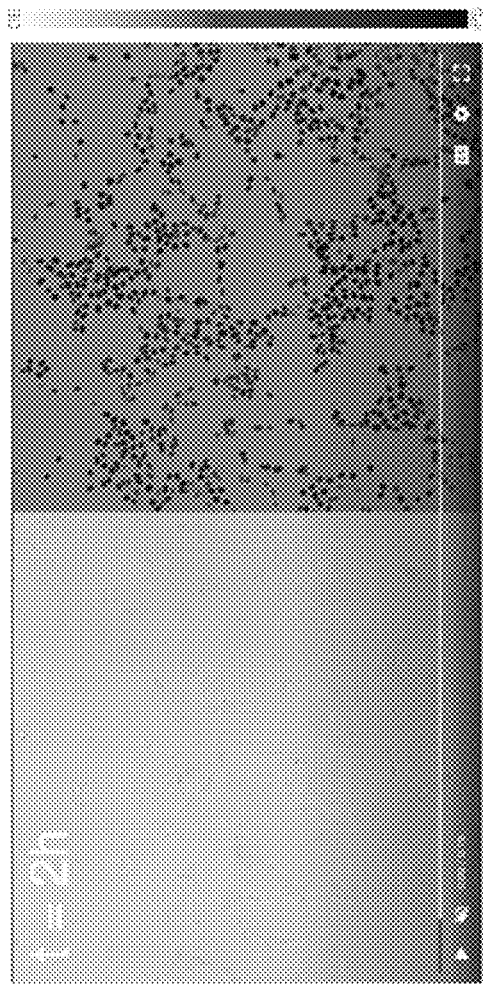
FIG. 25C shows a non-limiting example of time lapse photograph, including a transmitted light micrograph of unstained cells at the timestamp of 2 hours, and a corresponding output image with identified cell states generated from a machine learning model, in accordance with some embodiments.
Figure 25D:
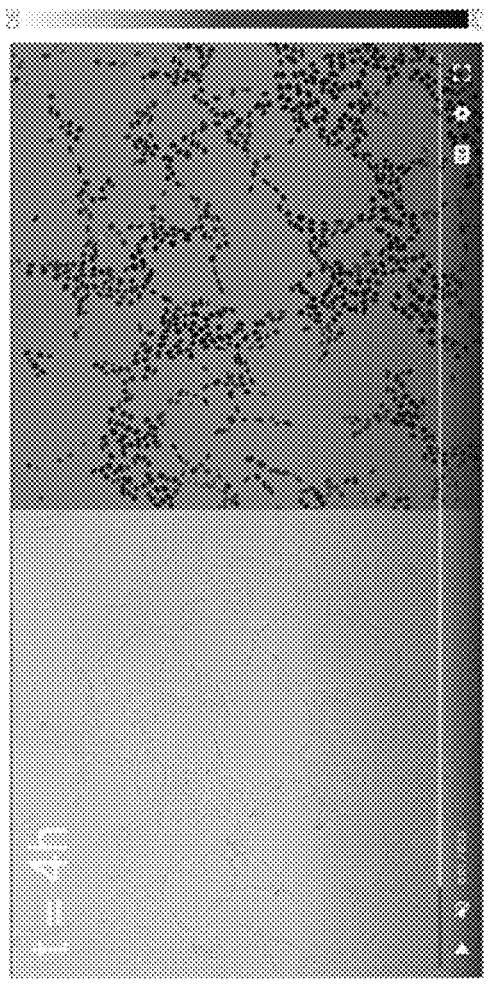
FIG. 25D shows a non-limiting example of time lapse photograph, including a transmitted light micrograph of unstained cells at the timestamp of 4 hours, and a corresponding output image with identified cell states generated from a machine learning model, in accordance with some embodiments.
Figure 25E:
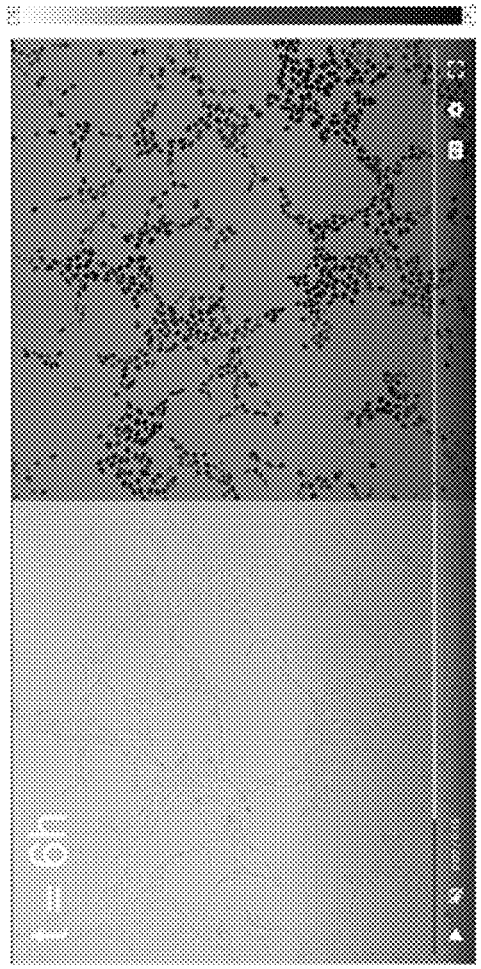
FIG. 25E shows a non-limiting example of time lapse photograph, including a transmitted light micrograph of unstained cells at the timestamp of 6 hours, and a corresponding output image with identified cell states generated from a machine learning model, in accordance with some embodiments.
Figure 25F:
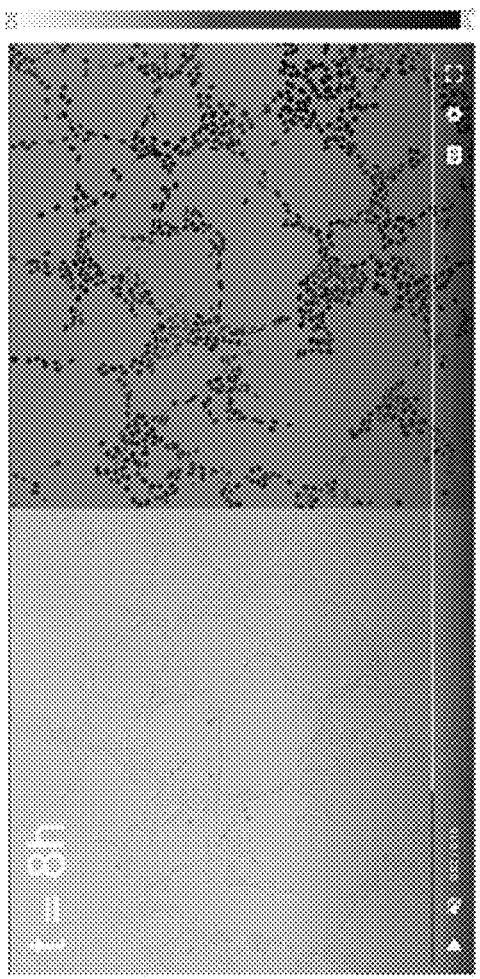
FIG. 25F shows a non-limiting example of time lapse photograph, including a transmitted light micrograph of unstained cells at the timestamp of 8 hours, and a corresponding output image with identified cell states generated from a machine learning model, in accordance with some embodiments.
Figure 25G:
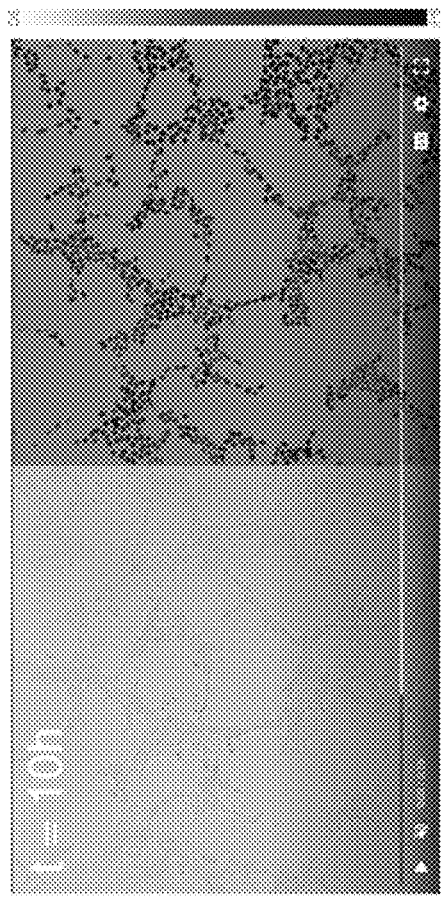
FIG. 25G shows a non-limiting example of time lapse photograph, including a transmitted light micrograph of unstained cells at the timestamp of 10 hours, and a corresponding output image with identified cell states generated from a machine learning model, in accordance with some embodiments.
Figure 25H:
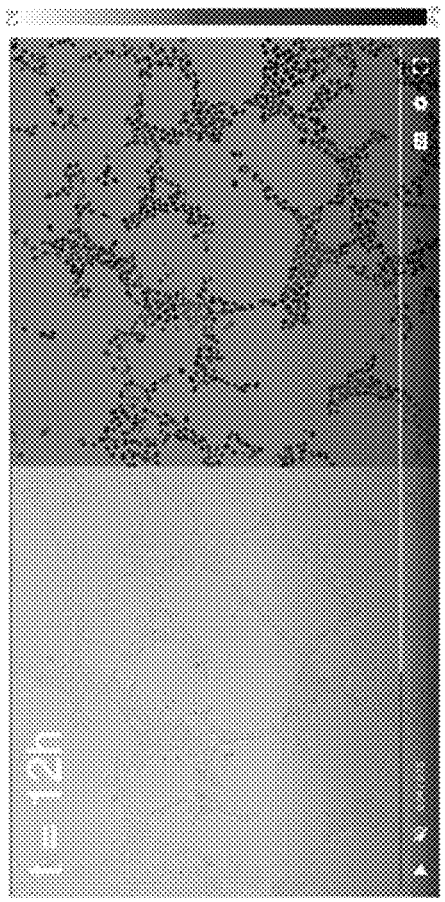
FIG. 25H shows a non-limiting example of time lapse photograph, including a transmitted light micrograph of unstained cells at the timestamp of 12 hours, and a corresponding output image with identified cell states generated from a machine learning model, in accordance with some embodiments.
Figure 25I:
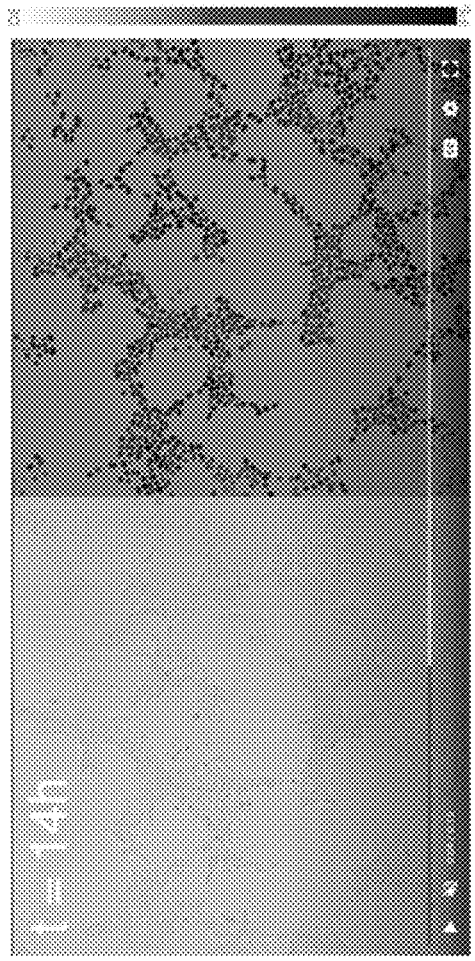
FIG. 25I shows a non-limiting example of time lapse photograph, including a transmitted light micrograph of unstained cells at the timestamp of 14 hours, and a corresponding output image with identified cell states generated from a machine learning model, in accordance with some embodiments.
Figure 25J:
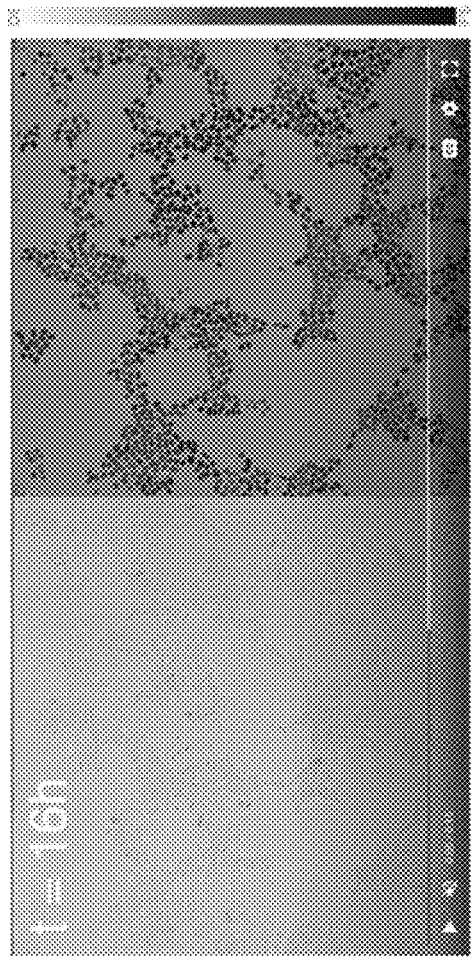
FIG. 25J shows a non-limiting example of time lapse photograph, including a transmitted light micrograph of unstained cells at the timestamp of 16 hours, and a corresponding output image with identified cell states generated from a machine learning model, in accordance with some embodiments.
Figure 25K:
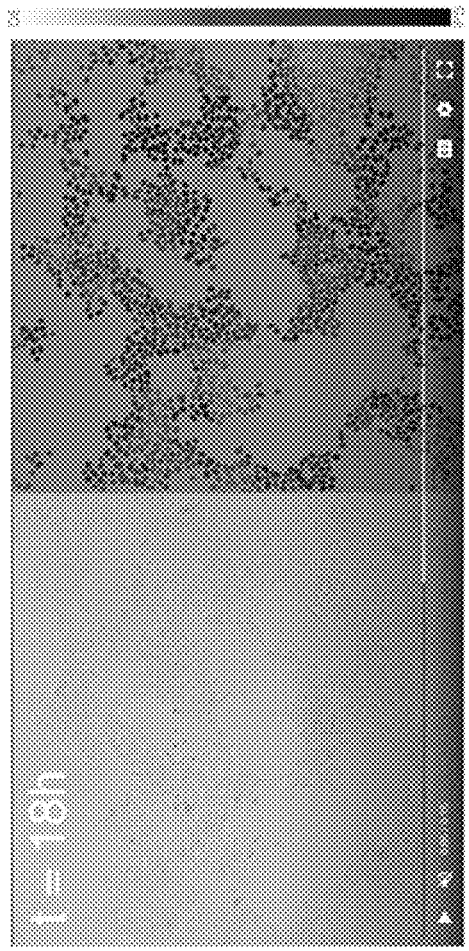
FIG. 25K shows a non-limiting example of time lapse photograph, including a transmitted light micrograph of unstained cells at the timestamp of 18 hours, and a corresponding output image with identified cell states generated from a machine learning model, in accordance with some embodiments.
Figure 25L:
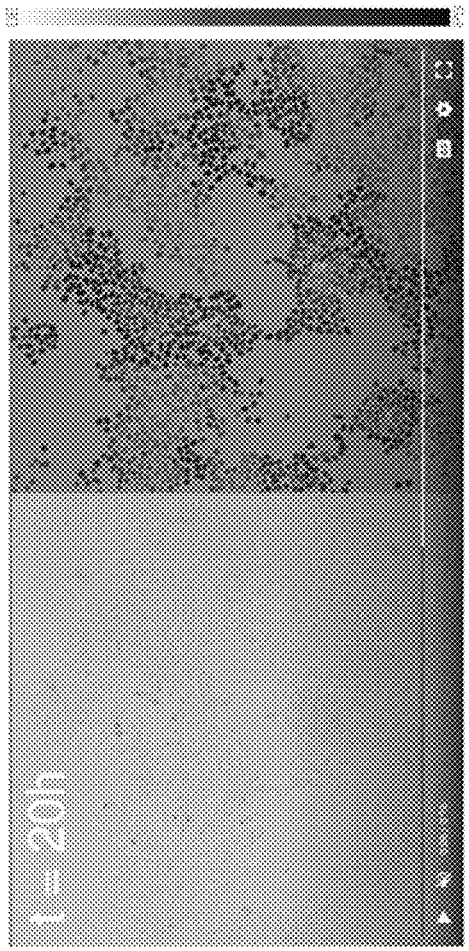
FIG. 25L shows a non-limiting example of time lapse photograph, including a transmitted light micrograph of unstained cells at the timestamp of 20 hours, and a corresponding output image with identified cell states generated from a machine learning model, in accordance with some embodiments.
Figure 25M:
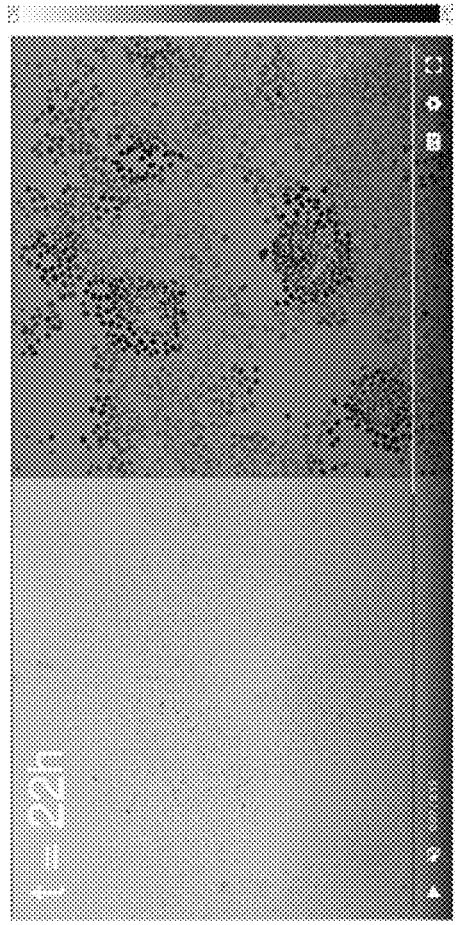
FIG. 25M shows a non-limiting example of time lapse photograph, including a transmitted light micrograph of unstained cells at the timestamp of 22 hours, and a corresponding output image with identified cell states generated from a machine learning model, in accordance with some embodiments.
Figure 25N:
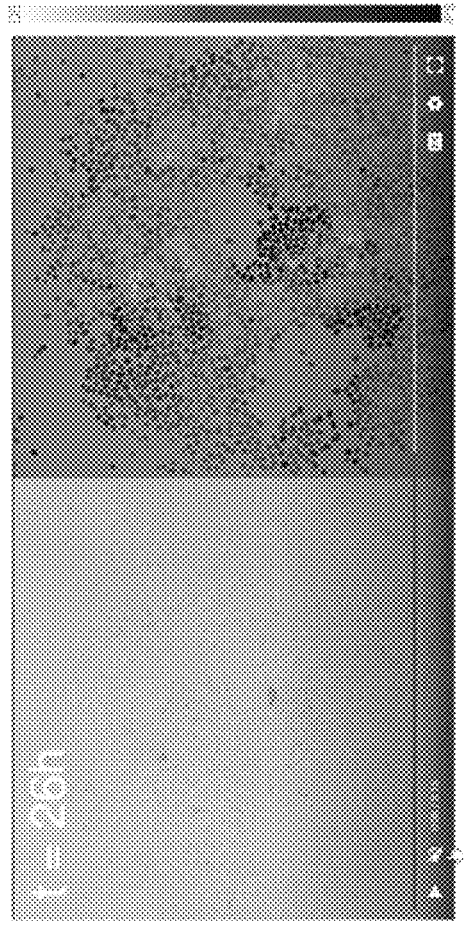
FIG. 25N shows a non-limiting example of time lapse photograph, including a transmitted light micrograph of unstained cells at the timestamp of 26 hours, and a corresponding output image with identified cell states generated from a machine learning model, in accordance with some embodiments.
Figure 25O:
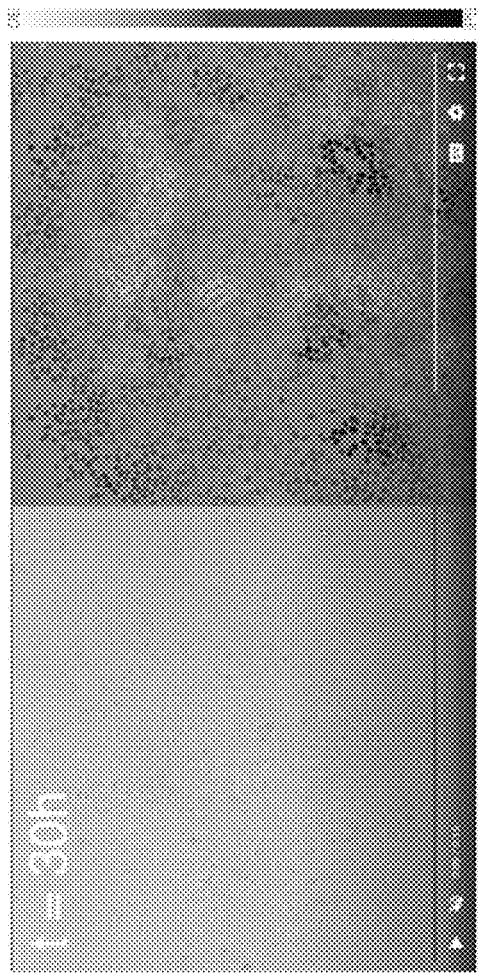
FIG. 25O shows a non-limiting example of time lapse photograph, including a transmitted light micrograph of unstained cells at the timestamp of 30 hours, and a corresponding output image with identified cell states generated from a machine learning model, in accordance with some embodiments.
Figure 25P:
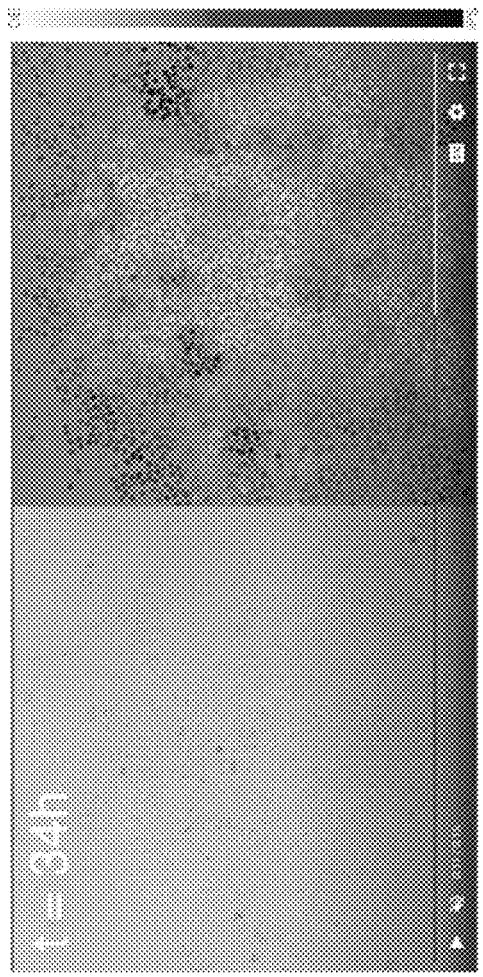
FIG. 25P shows a non-limiting example of time lapse photograph, including a transmitted light micrograph of unstained cells at the timestamp of 34 hours, and a corresponding output image with identified cell states generated from a machine learning model, in accordance with some embodiments.
Figure 25Q:
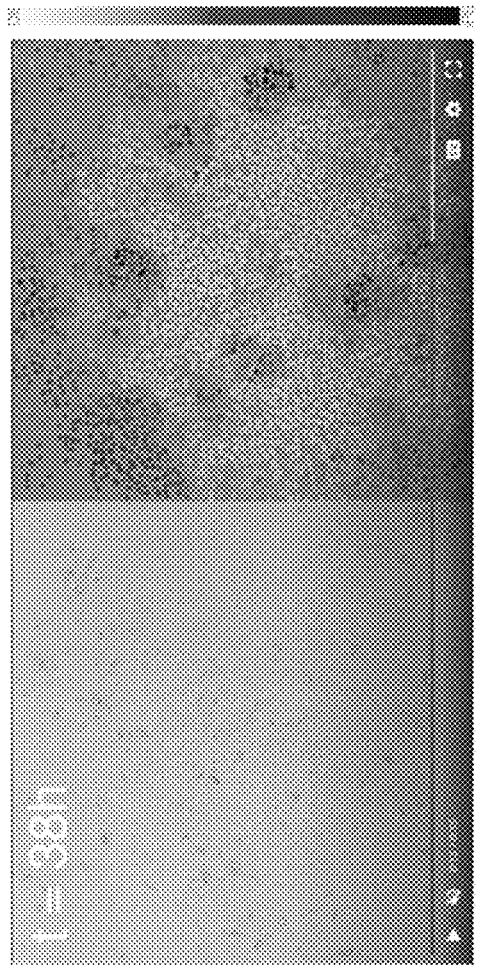
FIG. 25Q shows a non-limiting example of time lapse photograph, including a transmitted light micrograph of unstained cells at the timestamp of 38 hours, and a corresponding output image with identified cell states generated from a machine learning model, in accordance with some embodiments.
Figure 25R:
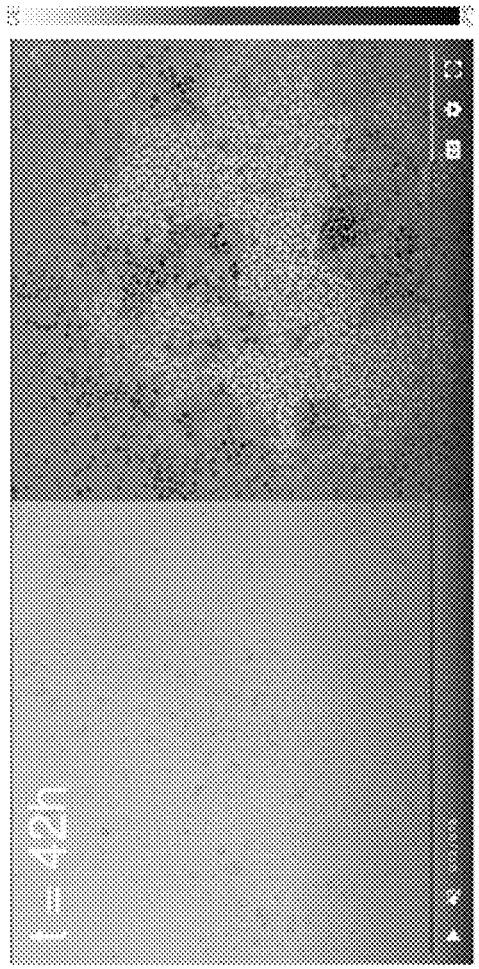
FIG. 25R shows a non-limiting example of time lapse photograph, including a transmitted light micrograph of unstained cells at the timestamp of 42 hours, and a corresponding output image with identified cell states generated from a machine learning model, in accordance with some embodiments.
Figure 25S:
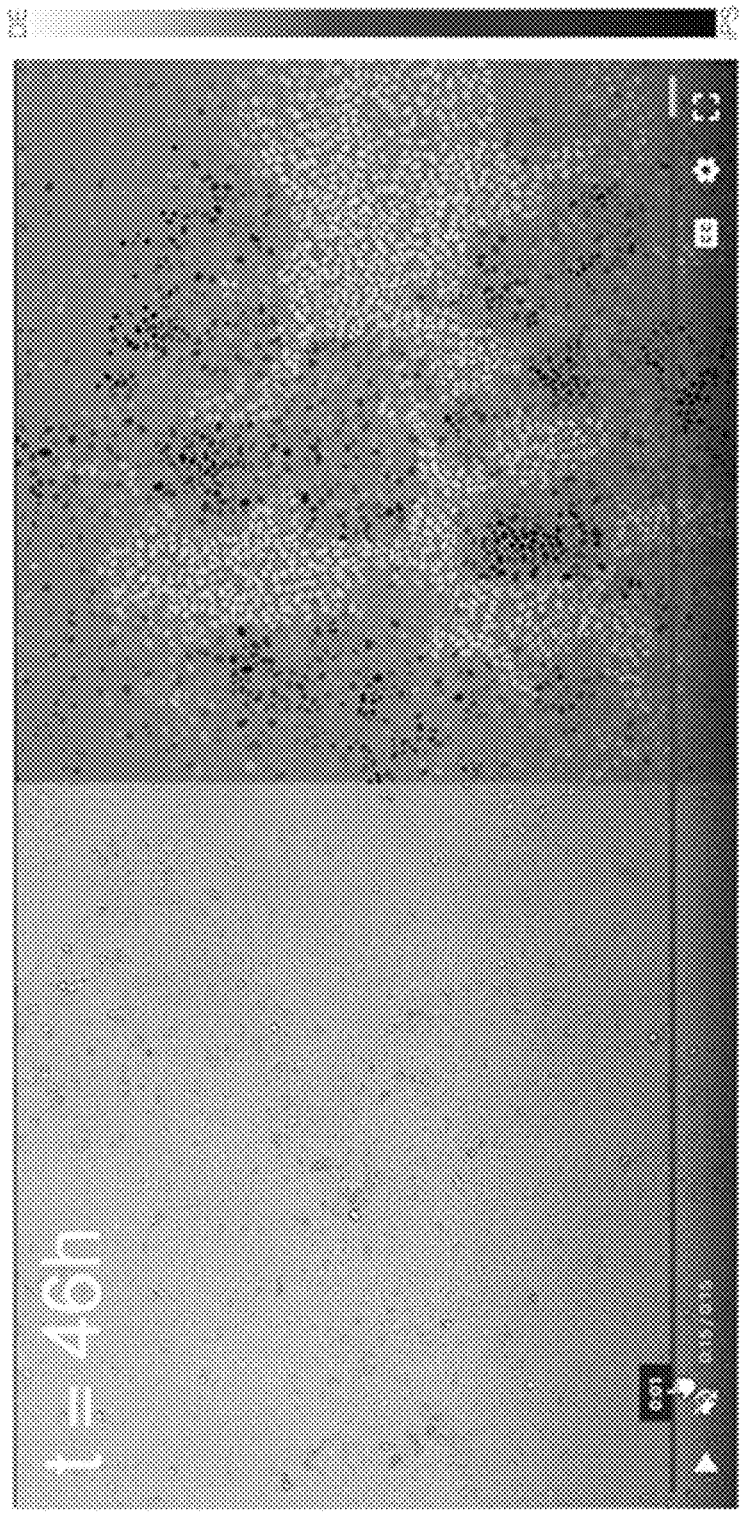
FIG. 25S shows a non-limiting example of time lapse photograph, including a transmitted light micrograph of unstained cells at the timestamp of 46 hours, and a corresponding output image with identified cell states generated from a machine learning model, in accordance with some embodiments.

As the machine learning model was able to process time course data of transmitted light micrographs and identify the state of individual cells, it allows real-time monitoring of cell states over the course of differentiation. FIGS. 25A-25S show non-limiting examples of time lapse photographs, including transmitted light micrographs of unstained cells at different timestamps, and corresponding output images with identified cell states generated from a machine learning model, in particular, every one hour to four hours from the beginning of cell differentiation to 46 hours. In each of FIGS. 25A-25S, the transmitted light micrograph was shown on the left. Live cells were unstained and cultured in normal physiological conditions for differentiation. The output image labeled with cell states generated from the machine learning model was shown on the right. The darker the labeling of a cell, the higher probability that the cell being iPS. The lighter the labeling, the higher probability that the cell being DE.

As illustrated in FIG. 25A, at the time stamp of 0 hour, most cells were identified and labeled by the machine learning model as iPS. Along the course of differentiation, at e.g., timestamps of 2 hours, 4 hours, 6 hours, 8 hours, 10 hours, and 12 hours (see FIGS. 25B, 25C, 25D, 25E, 25F, 25G, and 25H, respectively), a majority of the cells were predicted as APS cells by the model. At the timestamp of 12 hours illustrated in FIG. 25H, more than half of the cells in the transmitted light micrograph were identified as APS cells, a small percentage of the cells identified as at the transition stage from APS to DE. Along the course of differentiation, for example, at 14 hours, 16 hours, 18 hours, 20 hours, 22 hours, 26 hours, 30 hours, 34 hours, 38 hours, 42 hours, 46 hours, (see FIGS. 25I, 25J, 25K, 25L, 25M, 25N, 25O, 25P, 25Q, 25R, and 25S, respectively), more cells were differentiated towards DE cells.

Figure 26:
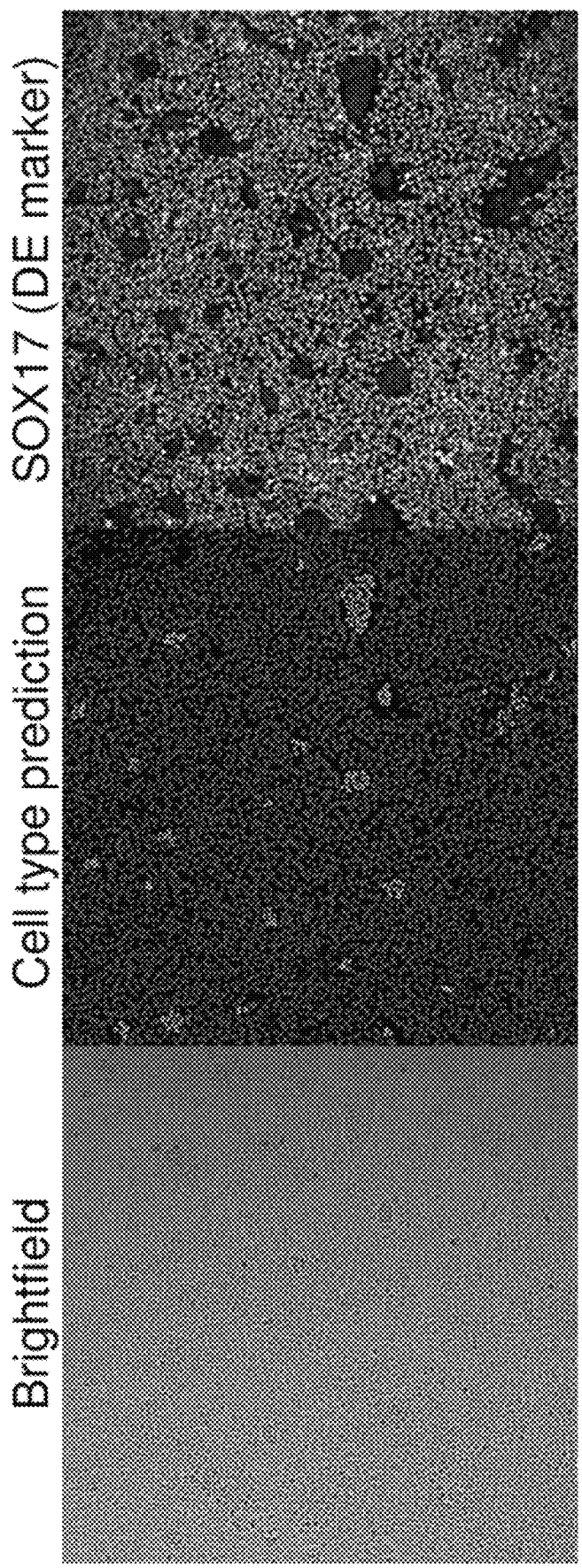
FIG. 26 illustrates a brightfield image depicting a mixture of iPS cells, DE cells and APS cells, an output image depicting cell type prediction generated from the machine learning model, and a corresponding fluorescent image.

The machine learning model as described may distinguish cell types in real time at single-cell resolution. FIG. 26 illustrates a brightfield image depicting a mixture of iPS cells, DE cells and APS cells, cell type prediction generated from the machine learning model, and corresponding fluorescent image. The brightfield image ("brightfield") was used as input to the machine learning model, which predicts cell types at single-cell level. The output image ("cell type prediction") generated from the model depicts pseudo-stained cells indicating different cell types, where DE cells are labeled as red color, APS cells as blue color and iPS cells as green. For comparison, the same cells were fluorescently labeled for SRY-Box Transcription Factor 17 (SOX17), a biomarker for DE cells. The machine learning model can correctly identify pockets of iPS cells amid a sea of DE cells and a small portion of APS cells.

Figure 27:
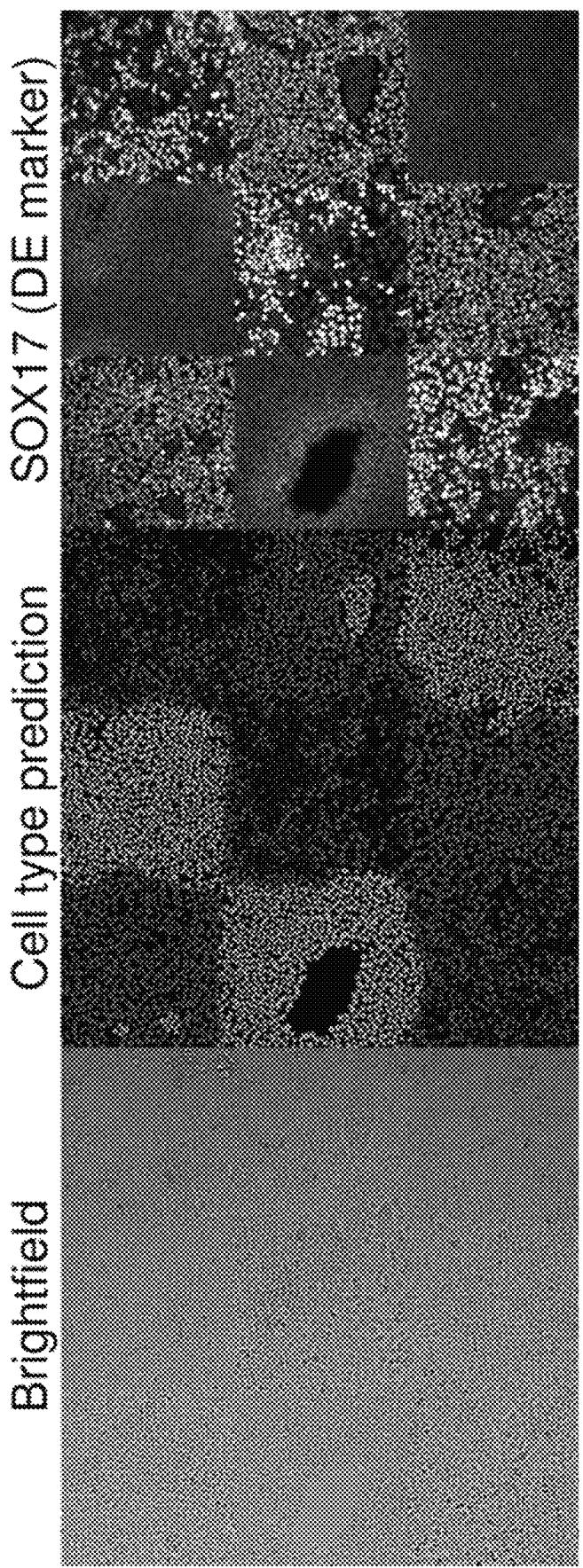
FIG. 27 illustrates a brightfield image depicting a mixture of iPS cells, DE cells and APS cells, an output image depicting cell type prediction generated from the machine learning model, and a corresponding fluorescent image.

FIG. 27 illustrates a brightfield image depicting a mixture of iPS cells, DE cells and APS cells, cell type prediction generated from the machine learning model, and corresponding fluorescent image. iPS cells, DE cells and APS cells were cultured in different sections of the cell culture plate, and some of the sections comprised more than one cell type. The brightfield image ("brightfield") was used as input to the machine learning model, which predicts cell types at single-cell level. The output image ("cell type prediction") generated from the model depicts pseudo-stained cells indicating different cell types, where DE cells are labeled as red color, APS cells as blue color and iPS cells as green. For comparison, the same cells were fluorescently labeled for SOX17. Under the artificially challenging condition with mixtures of different cell types, the machine learning model can still correctly identify cell types at single-cell resolution.

Example 12-Evaluation of Machine Learning Model on Cell Counting Accuracy

This example was to evaluate the performance of the machine learning model on the cell counting accuracy. Various types of cells were cultured at different densities, comprising anterior primitive streak (APS) cells, cardiac mesoderm (CM) cells, definitive endoderm (DE) cells, lateral mesoderm (LM) cells, mid primitive streak (MPS) cells, and posterior foregut (PF) cells. The machine learning model was trained to process the transmitted light micrographs of cells and determine the numbers of cells. In a parallel experiment, APS cells, DE cells, and iPS cells were cultured and fluorescently labeled with Hoechst stains. Brightfield and fluorescent images were captured.

Figure 28:
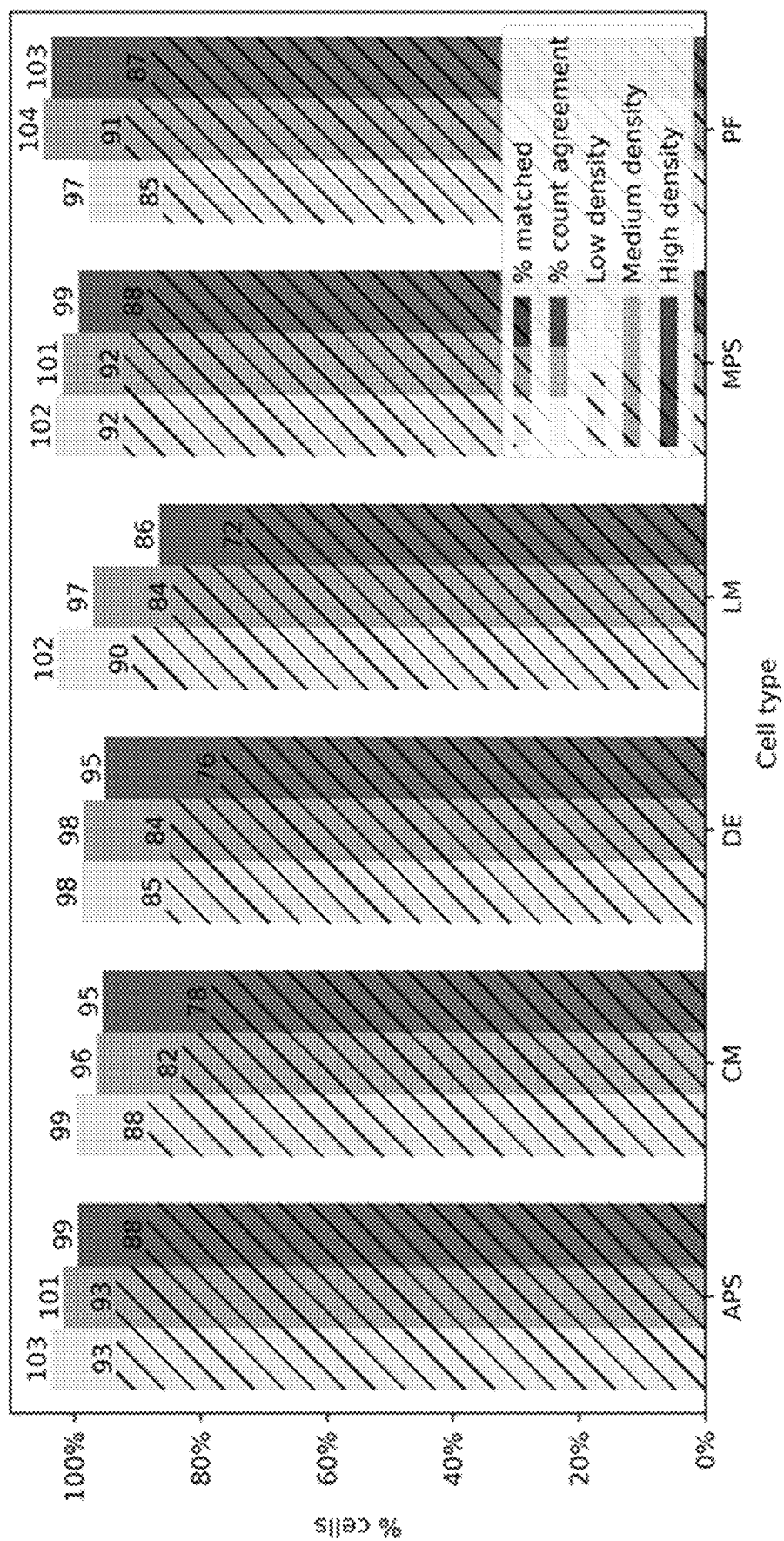
FIG. 28 illustrates cell counting results generated from the machine learning model.

FIG. 28 illustrates the cell counting results generated from the machine learning model. Compared with standard cell counting techniques, the machine learning model shows a high accuracy for different cell types and densities. For APS cells, for example, the cell counting results generated from the machine learning model show a high match rate and count agreement compared with standard cell counting results at low, medium, and high cell densities.

Figure 29:
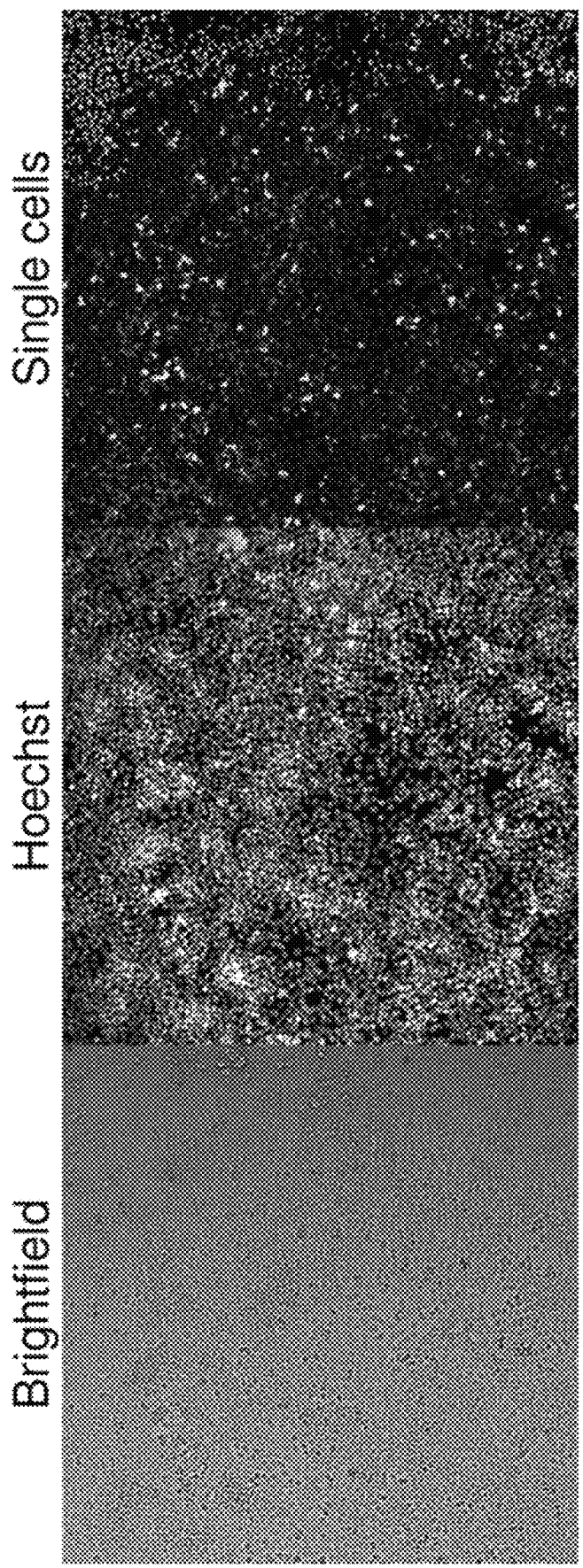
FIG. 29 illustrates a brightfield image of APS cells, a corresponding fluorescent image, and comparison thereof for cell counting.

FIG. 29 illustrates a brightfield image of APS cells, a corresponding fluorescent image, and comparison thereof for cell counting. The brightfield image ("brightfield") was used as input to the machine learning model for cell counting, and the fluorescent image ("Hoechst") depicts the same cells in the brightfield image but with Hoechst stains. The color image ("single cells") is the comparison between the results generated from the machine learning model and the corresponding fluorescent image. Blue color shows a cell identified by the model that matches a corresponding cell in the fluorescent image, red color shows a cell that is missed by the model, and green color shows a cell added by the model. The cell counting results generated from the machine learning model show 91%±8% count agreement with fluorescent labeling. In particular, the cells identified by the machine learning model show 79%±4% match with fluorescent labeling. There are 21%±4% of the cells that are missed by the model and 12%±4% of the cells that are added.

Figure 30:
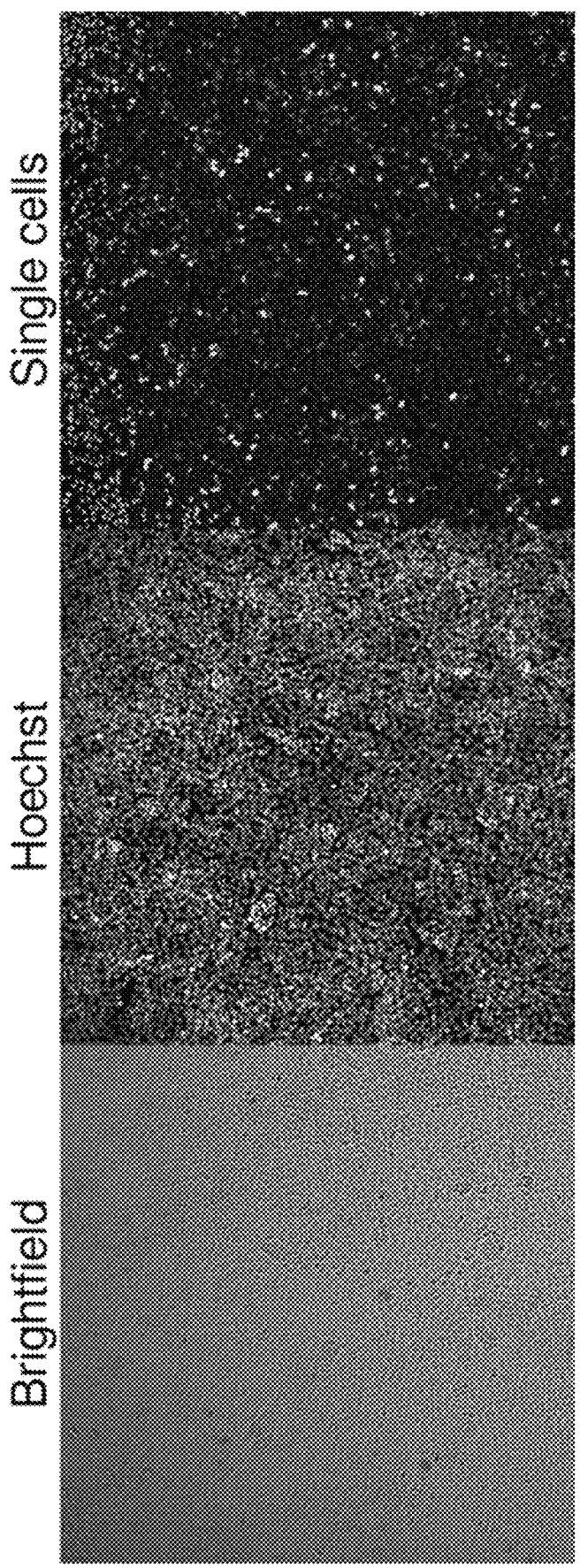
FIG. 30 illustrates a brightfield image of DE cells, a corresponding fluorescent image, and comparison thereof for cell counting.

FIG. 30 illustrates a brightfield image of DE cells, a corresponding fluorescent image, and comparison thereof for cell counting. The cell counting results generated from the machine learning model show 95%±4% count agreement with fluorescent labeling. In particular, the cells identified by the machine learning model show 84%±3% match with fluorescent labeling. There are 16%±3% of the cells that are missed by the model and 10%±4% of the cells that are added.

Figure 31:
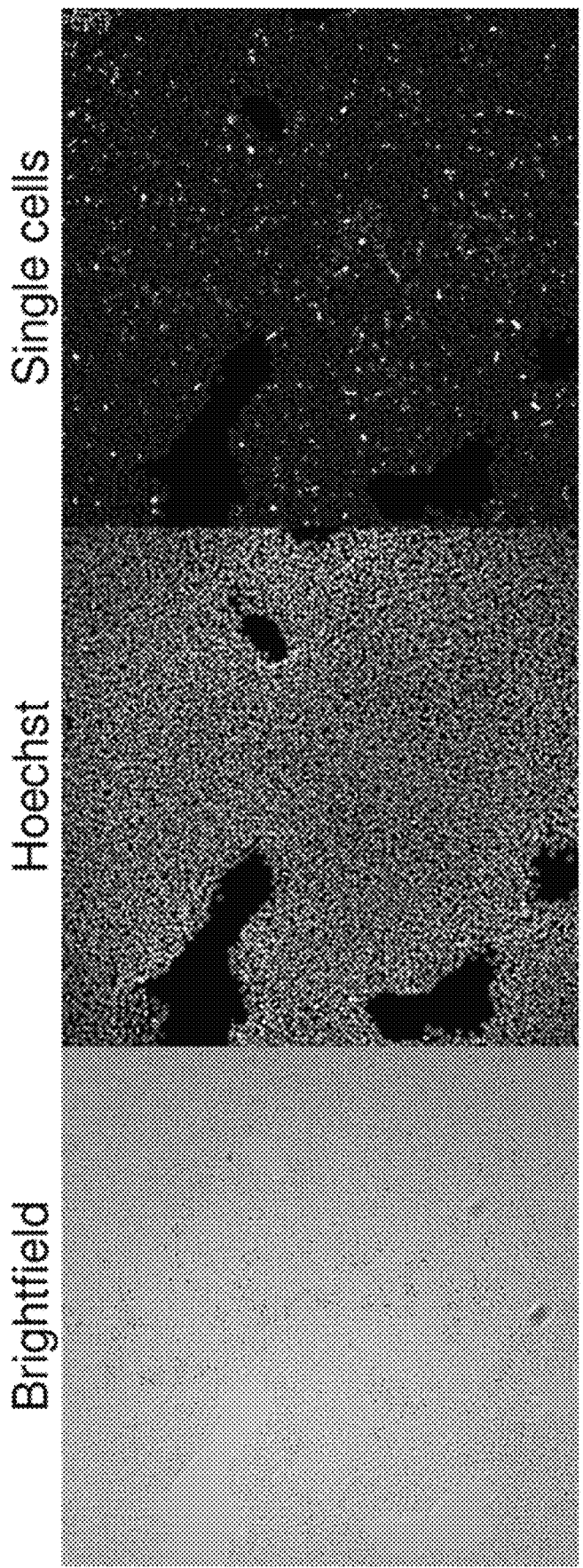
FIG. 31 illustrates a brightfield image of iPS cells, a corresponding fluorescent image, and comparison thereof for cell counting.

FIG. 31 a brightfield image of iPS cells, a corresponding fluorescent image, and comparison thereof for cell counting. The cell counting results generated from the machine learning model show 98%±4% count agreement with fluorescent labeling. In particular, the cells identified by the machine learning model show 93%±3% match with fluorescent labeling. There are 7%±3% of the cells that are missed by the model and 5%±2% of the cells that are added.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

Computing System

Figure 32:
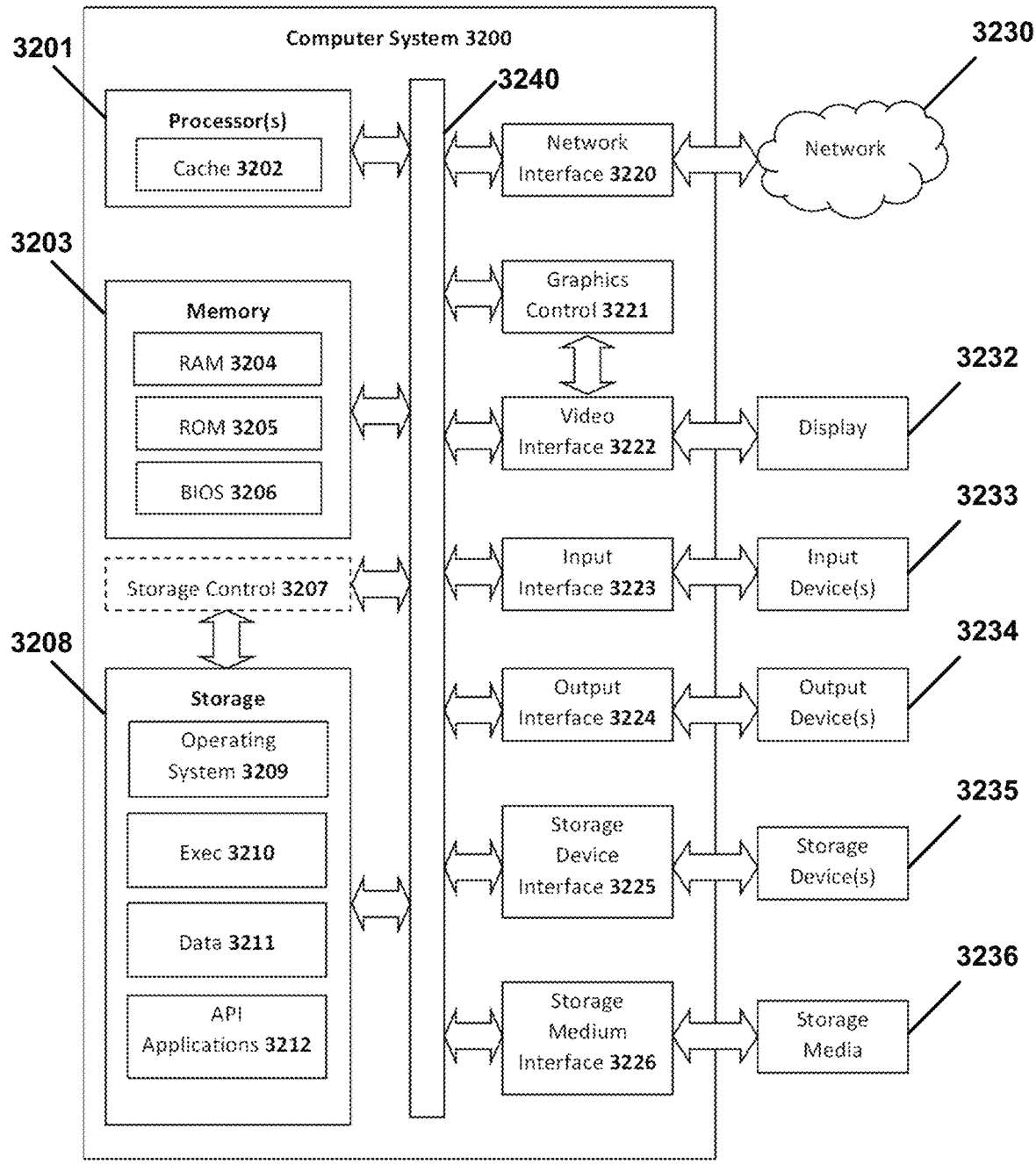
FIG. 32 shows a non-limiting example of a computing device; in this case, a device with one or more processors, memory, storage, and a network interface.

Referring to FIG. 32, a block diagram is shown depicting an exemplary machine that includes a computer system 3200 (e.g., a processing or computing system) within which a set of instructions can execute for causing a device to perform or execute any one or more of the aspects and/or methodologies for static code scheduling of the present disclosure. The components in FIG. 32 are examples only and do not limit the scope of use or functionality of any hardware, software, embedded logic component, or a combination of two or more such components implementing particular embodiments.

Computer system 3200 may include one or more processors 3201, a memory 3203, and a storage 3208 that communicate with each other, and with other components, via a bus 3240. The bus 3240 may also link a display 3232, one or more input devices 3233 (which may, for example, include a keypad, a keyboard, a mouse, a stylus, etc.), one or more output devices 3234, one or more storage devices 3235, and various tangible storage media 3236. All of these elements may interface directly or via one or more interfaces or adaptors to the bus 3240. For instance, the various tangible storage media 3236 can interface with the bus 3240 via storage medium interface 3226. Computer system 3200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 3200 includes one or more processor(s) 3201 (e.g., central processing units (CPUs), general purpose graphics processing units (GPGPUs), or quantum processing units (QPUs)) that carry out functions. Processor(s) 3201 optionally contains a cache memory unit 3202 for temporary local storage of instructions, data, or computer addresses. Processor(s) 3201 are configured to assist in execution of computer readable instructions. Computer system 3200 may provide functionality for the components depicted in FIG. 32 as a result of the processor(s) 3201 executing non-transitory, processor-executable instructions embodied in one or more tangible computer-readable storage media, such as memory 3203, storage 3208, storage devices 3235, and/or storage medium 3236. The computer-readable media may store software that implements particular embodiments, and processor(s) 3201 may execute the software. Memory 3203 may read the software from one or more other computer-readable media (such as mass storage device(s) 3235, 3236) or from one or more other sources through a suitable interface, such as network interface 3220. The software may cause processor(s) 3201 to carry out one or more processes or one or more steps of one or more processes described or illustrated herein. Carrying out such processes or steps may include defining data structures stored in memory 3203 and modifying the data structures as directed by the software.

The memory 3203 may include various components (e.g., machine readable media) including, but not limited to, a random access memory component (e.g., RAM 3204) (e.g., static RAM (SRAM), dynamic RAM (DRAM), ferroelectric random access memory (FRAM), phase-change random access memory (PRAM), etc.), a read-only memory component (e.g., ROM 3205), and any combinations thereof. ROM 3205 may act to communicate data and instructions unidirectionally to processor(s) 3201, and RAM 3204 may act to communicate data and instructions bidirectionally with processor(s) 3201. ROM 3205 and RAM 3204 may include any suitable tangible computer-readable media described below. In one example, a basic input/output system 3206 (BIOS), including basic routines that help to transfer information between elements within computer system 3200, such as during start-up, may be stored in the memory 3203.

Fixed storage 3208 is connected bidirectionally to processor(s) 3201, optionally through storage control unit 3207. Fixed storage 3208 provides additional data storage capacity and may also include any suitable tangible computer-readable media described herein. Storage 3208 may be used to store operating system 3209, executable(s) 3210, data 3211, applications 3212 (application programs), and the like. Storage 3208 can also include an optical disk drive, a solid-state memory device (e.g., flash-based systems), or a combination of any of the above. Information in storage 3208 may, in appropriate cases, be incorporated as virtual memory in memory 3203.

In one example, storage device(s) 3235 may be removably interfaced with computer system 3200 (e.g., via an external port connector (not shown)) via a storage device interface 3225. Particularly, storage device(s) 3235 and an associated machine-readable medium may provide non-volatile and/or volatile storage of machine-readable instructions, data structures, program modules, and/or other data for the computer system 3200. In one example, software may reside, completely or partially, within a machine-readable medium on storage device(s) 3235. In another example, software may reside, completely or partially, within processor(s) 3201.

Bus 3240 connects a wide variety of subsystems. Herein, reference to a bus may encompass one or more digital signal lines serving a common function, where appropriate. Bus 3240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 3200 may also include an input device 3233. In one example, a user of computer system 3200 may enter commands and/or other information into computer system 3200 via input device(s) 3233. Examples of an input device(s) 3233 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 3233 may be interfaced to bus 3240 via any of a variety of input interfaces 3223 (e.g., input interface 3223) including, but not limited to, serial, parallel, game port, USB, FIREWIRE, THUNDERBOLT, or any combination of the above.

In particular embodiments, when computer system 3200 is connected to network 3230, computer system 3200 may communicate with other devices, specifically mobile devices and enterprise systems, distributed computing systems, cloud storage systems, cloud computing systems, and the like, connected to network 3230. Communications to and from computer system 3200 may be sent through network interface 3220. For example, network interface 3220 may receive incoming communications (such as requests or responses from other devices) in the form of one or more packets (such as Internet Protocol (IP) packets) from network 3230, and computer system 3200 may store the incoming communications in memory 3203 for processing. Computer system 3200 may similarly store outgoing communications (such as requests or responses to other devices) in the form of one or more packets in memory 3203 and communicated to network 3230 from network interface 3220. Processor(s) 3201 may access these communication packets stored in memory 3203 for processing.

Examples of the network interface 3220 include, but are not limited to, a network interface card, a modem, and any combination thereof. Examples of a network 3230 or network segment 3230 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 3230, may employ a wired and/or a wireless mode of communication. In general, any network topology may be used.

Information and data can be displayed through a display. Examples of a display 3232 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 3232 can interface to the processor(s) 3201, memory 3203, and fixed storage 3208, as well as other devices, such as input device(s) 3233, via the bus 3240. The display 3232 is linked to the bus 3240 via a video interface 3222, and transport of data between the display 3232 and the bus 3240 can be controlled via the graphics control 3221. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 3232, computer system 3200 may include one or more other peripheral output devices 3234 including, but not limited to, an audio speaker, a printer, a storage device, and any combinations thereof. Such peripheral output devices may be connected to the bus 3240 via an output interface 3224. Examples of an output interface 3224 include, but are not limited to, a serial port, a parallel connection, a USB port, a FIREWIRE port, a THUNDER-BOLT port, and any combinations thereof.

In addition or as an alternative, computer system 3200 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, netbook computers, netpad computers, handheld computers, Internet appliances, mobile smartphones, and tablet computers. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD, Linux, Apple Mac OS X Server, Oracle Solaris, Windows Server, and Novell NetWare. Those of skill in the art will recognize that suitable personal computer operating systems include, by way of non-limiting examples, Microsoft Windows, Apple Mac OS X, UNIX, and UNIX-like operating systems such as GNU/Linux. In some embodiments, the operating system is provided by cloud computing.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft SQL Server, mySQL, and Oracle. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash ActionScript, JavaScript, or Silverlight. In some embodiments, a web application is written to some extent in a server-side coding language such as Active Server Pages (ASP), ColdFusion, Perl, Java, JavaServer Pages (JSP), Hypertext Preprocessor (PHP), Python, Ruby, Tcl, Smalltalk, WebDNA, or Groovy. In some embodiments, a web application is written to some extent in a database query language such as Structured Query Language (SQL). In some embodiments, a web application integrates enterprise server products such as IBM Lotus Domino. In some embodiments, a web application includes a media player element. In various further embodiments, a media player element utilizes one or more of many suitable multimedia technologies including, by way of non-limiting examples, Adobe Flash, HTML 5, Apple QuickTime, Microsoft Silverlight, Java, and Unity.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java, JavaScript, Pascal, Object Pascal, Python, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android SDK, BlackBerry SDK, BREW SDK, Palm OS SDK, Symbian SDK, webOS SDK, and Windows Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java, Lisp, Python, Visual Basic, and VB.NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, by way of examples, image, cell state, protocol, and culture condition information. In various embodiments, suitable databases include, by way of non-limiting examples, relational databases, non-relational databases, object-oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
   a) receiving cell imaging data comprising at least one training transmitted light micrograph;
   b) generating a cell imaging dataset comprising time course data of transmitted light micrographs comprising cells having a cell state representing at least one phase of a cell differentiation process collected at an interval over a time period, wherein the transmitted light micrographs comprise at least one of a brightfield micrograph, a phase contrast micrograph, or a differential interference contrast (DIC) micrograph;
   c) applying a machine learning model configured to analyze the cell imaging dataset to generate mathematical representations of the transmitted light micrographs, build a plurality of profiles predictive of at least one cell state, and generate a trajectory of transition of the cells from the at least one cell state to another cell state; and
   d) determining the presence of one or more cells having the at least one cell state and how far the one or more cells are along the trajectory in an experimental transmitted light micrograph based on the plurality of profiles and mathematical representations of the experimental transmitted light micrograph.

2. The method of claim 1, wherein the cell imaging data comprises live-cell imaging data, and the cell imaging dataset comprises a live-cell imaging dataset.

3. The method of claim 1, further comprising sending one or more instructions to a transmitted light microscopy apparatus.

4. The method of claim 1, wherein the interval is about 10 minutes, 20 minutes, 30 minutes, 40 minutes, 50 minutes, 60 minutes, 70 minutes, 80 minutes, 90 minutes, 100 minutes, 110 minutes, 120 minutes, 130 minutes, 140 minutes, 150 minutes, 160 minutes, 180 minutes, 360 minutes, 720 minutes, or 1440 minutes.

5. The method of claim 1, wherein the time period is about 1 day, 2 days, 3 days, 4 days, 5 days, 6 days, 7 days, 8 days, 9 days, or 10 days.

6. The method of claim 1, wherein the machine learning model comprises a featurizer model.

7. The method of claim 6, wherein the featurizer model is applied to each micrograph of the cell imaging dataset to generate an embedding specific to the cell state.

8. The method of claim 7, further comprising evaluating the embeddings qualitatively and quantitatively.

9. The method of claim 8, wherein the qualitative evaluation comprises dimensionality reduction and visualization.

10. The method of claim 8, wherein the quantitative evaluation comprises predicting time elapsed in the time course.

11. The method of claim 1, further comprising applying a classifier to classify a cell type of the cells.

12. The method of claim 1, wherein the cell state is a phase of a stem cell differentiation process.

13. The method of claim 12, further comprising predicting cell progress through phases of the stem cell differentiation process.

14. The method of claim 13, wherein predicting cell progress comprises generating a synthetic image of at least one subsequent phase in the stem cell differentiation process.

15. The method of claim 13, wherein predicting cell progress comprises predicting nuclei of the cells.

16. The method of claim 13, wherein predicting cell progress comprises predicting presence and distribution of one or more biomarkers of the cells.

17. The method of claim 13, wherein predicting cell progress comprises predicting a cell type classification of the cells.

18. The method of claim 13, wherein predicting cell progress comprises predicting a future cell state.

19. The method of claim 13, wherein predicting cell progress comprises predicting an experimental result of the stem cell differentiation process.

20. The method of claim 12, further comprising monitoring the cell state.

21. The method of claim 20, further comprising monitoring cell progress through phases of the stem cell differentiation process.

22. The method of claim 12, further comprising recommending a cell culture condition based on the cell state.

23. The method of claim 12, further comprising recommending a stem cell differentiation protocol based on the cell state, optimizing the stem cell differentiation protocol based on the cell state, or a combination thereof.

24. The method of claim 1, wherein the method does not kill or alter the cells.

25. The method of claim 1, wherein the method does not comprise fluorescence activated cell sorting (FACS), fluorescent tagging, or immunofluorescence staining.

26. The method of claim 1, wherein the determining the presence of one or more cells having the at least one cell state does not comprise generating a fluorescent image of pseudo-stained cells.

27. The method of claim 1, wherein the at least one cell state comprises a future cell state of cell differentiation.

28. The method of claim 27, wherein the machine learning model is further configured to analyze the cell imaging dataset to generate mathematical representations of the transmitted light micrographs at the plurality of timepoints and at a future timepoint, and build a plurality of profiles predictive of the future cell state of cell differentiation.

29. The method of claim 1, wherein the trajectory is a temporal trajectory representing the cell differentiation process, including transition of the cells from the at least one cell state to another cell state, over the time period.

30. A computer-implemented system comprising at least one processor and instructions executable by the at least one processor to cause the at least one processor to perform operations comprising:
   a) receiving cell imaging data comprising at least one training transmitted light micrograph;
   b) generating a cell imaging dataset comprising time course data of transmitted light micrographs comprising cells having a cell state representing at least one phase of a cell differentiation process collected at an interval over a time period, wherein the transmitted light micrographs comprise at least one of a brightfield micrograph, a phase contrast micrograph, or a differential interference contrast (DIC) micrograph;
   c) applying a machine learning model configured to analyze the cell imaging dataset to generate mathematical representations of the transmitted light micrographs, and build a plurality of profiles predictive of at least one cell state, and generate a trajectory of transition of the cells from the at least one cell state to another cell state; and
   d) determining the presence of one or more cells having the at least one cell state and how far the one or more cells are along the trajectory in an experimental transmitted light micrograph based on the plurality of profiles and mathematical representations of the experimental transmitted light micrograph.

31. The system of claim 30, wherein the cell imaging data comprises live-cell imaging data, and the cell imaging dataset comprises a live-cell imaging dataset.

32. Non-transitory computer-readable storage media encoded with instructions executable by one or more processors to create an application comprising:
   a) a software module configured to receive cell imaging data comprising at least one training transmitted light micrograph;
   b) a software module configured to generate a cell imaging dataset comprising time course data of transmitted light micrographs comprising cells having a cell state representing at least one phase of a cell differentiation process collected at an interval over a time period, wherein the transmitted light micrographs comprise at least one of a brightfield micrograph, a phase contrast micrograph, or a differential interference contrast (DIC) micrograph;
   c) a software module configured to apply a machine learning model configured to analyze the cell imaging dataset to generate mathematical representations of the transmitted light micrographs, and build a plurality of profiles predictive of at least one cell state, and generate a trajectory of transition of the cells from the at least one cell state to another cell state; and
   d) a software module configured to determine the presence of one or more cells having the at least one cell state and how far the one or more cells are along the trajectory in an experimental transmitted light micrograph based on the plurality of profiles and mathematical representations of the experimental transmitted light micrograph.

33. A platform comprising:
   a) an automated transmitted light microscopy apparatus; and
   b) a computing system, communicatively coupled to the automated transmitted light microscopy apparatus, and comprising at least one processor configured to perform operations comprising:
      i) receiving, from the automated transmitted light microscopy apparatus, cell imaging data comprising at least one training transmitted light micrograph;
      ii) generating a cell imaging dataset comprising time course data of transmitted light micrographs comprising cells having a cell state representing at least one phase of a cell differentiation process collected at an interval over a time period, wherein the transmitted light micrographs comprise at least one of a brightfield micrograph, a phase contrast micrograph, or a differential interference contrast (DIC) micrograph;
      iii) applying a machine learning model configured to analyze the cell imaging dataset to generate mathematical representations of the transmitted light micrographs, and build a plurality of profiles predictive of at least one cell state, and generate a trajectory of transition of the cells from the at least one cell state to another cell state; and
      iv) determining the presence of one or more cells having the at least one cell state and how far the one or more cells are along the trajectory in an experimental transmitted light micrograph based on the plurality of profiles and mathematical representations of the experimental transmitted light micrograph.

34. The platform of claim 33, wherein the cell imaging data comprises live-cell imaging data, and the cell imaging dataset comprises a live-cell imaging dataset.

* * * * *